(12) United States Patent  (10) Patent No.: US 7,774,335 B1
Scofield et al.  (45) Date of Patent: Aug. 10, 2010

(54) METHOD AND SYSTEM FOR DETERMINING INTEREST LEVELS OF ONLINE CONTENT NAVIGATION PATHS

(75) Inventors: Christopher L. Scofield, Greater Seattle, WA (US); Elmore Eugene Pope, Sammamish, WA (US); Brad E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 684 days.

(21) Appl. No.: 11/321,890

(22) Filed: Dec. 29, 2005

Related U.S. Application Data

(60) Provisional application No. 60/728,923, filed on Oct. 21, 2005, provisional application No. 60/710,549, filed on Aug. 23, 2005.

(51) Int. Cl.
  *G06F 17/30* (2006.01)
(52) U.S. Cl. .................................. 707/709; 707/748
(58) Field of Classification Search ................. 707/705, 707/709, 710, 713, 736, 748, 750, 751
  See application file for complete search history.

(56) References Cited

U.S. PATENT DOCUMENTS

| | | | |
|---|---|---|---|
| 6,134,244 | A | 10/2000 | Van Renesse et al. |
| 6,185,558 | B1 | 2/2001 | Bowman et al. |
| 6,233,571 | B1 | 5/2001 | Egger et al. |
| 6,266,649 | B1 | 7/2001 | Linden et al. |
| 6,411,967 | B1 | 6/2002 | Van Renesse |
| 6,438,579 | B1 * | 8/2002 | Hosken ....................... 709/203 |
| 6,529,953 | B1 | 3/2003 | Van Renesse |
| 6,721,744 | B1 | 4/2004 | Naimark et al. |
| 6,724,770 | B1 | 4/2004 | Van Renesse |
| 6,738,678 | B1 | 5/2004 | Bharat et al. |
| 6,757,682 | B1 | 6/2004 | Naimark et al. |

(Continued)

FOREIGN PATENT DOCUMENTS

WO  01/25947  4/2001

OTHER PUBLICATIONS

Montgomery et al., Modeling Online Browsing and Path Analysis Using Clickstream Data, 2002, pp. 1-34.*

(Continued)

*Primary Examiner*—Fred I Ehichioya
(74) *Attorney, Agent, or Firm*—Robert C Kowert; Meyertons, Hood, Kivlin, Kowert & Goetzel, P.C.

(57) ABSTRACT

A method and system for determining interest levels of online content navigation paths. A method may include determining each of a plurality of navigation paths among a plurality of online content sources, and for each of the navigation paths, determining a corresponding path weight, where a given corresponding path weight is indicative of user activity along a corresponding navigation path. The method may further include identifying a particular aggregate path within the online content sources, where the particular path includes some of the navigation paths, where an aggregate path weight corresponding to the particular path is dependent upon the path weights corresponding to the navigation paths included in the particular path, and where the aggregate path weight satisfies an optimization criterion relative to other aggregate paths. A given navigation path included in the particular aggregate path may correspond to a possible user traversal from a first to a second online content source.

45 Claims, 21 Drawing Sheets

U.S. PATENT DOCUMENTS

| | | | |
|---|---|---|---|
| 6,842,737 B1* | 1/2005 | Stiles et al. | 705/6 |
| 6,871,202 B2 | 3/2005 | Broder | |
| 6,912,505 B2 | 6/2005 | Linden et al. | |
| 7,660,815 B1 | 2/2010 | Scofield et al. | |
| 2003/0040850 A1* | 2/2003 | Najmi et al. | 701/1 |
| 2004/0236736 A1* | 11/2004 | Whitman et al. | 707/3 |
| 2005/0154701 A1 | 7/2005 | Parunak et al. | |
| 2005/0182755 A1* | 8/2005 | Tran | 707/3 |
| 2005/0210008 A1* | 9/2005 | Tran et al. | 707/3 |
| 2005/0289140 A1* | 12/2005 | Ford et al. | 707/5 |
| 2006/0026153 A1 | 2/2006 | Soogoor | |
| 2006/0085447 A1* | 4/2006 | D'Urso | 707/100 |
| 2006/0190852 A1 | 8/2006 | Sotiriou | |

OTHER PUBLICATIONS

U.S. Appl. No. 10/864,288, filed Jun. 9, 2004.
U.S. Appl. No. 11/186,357, filed Jul. 21, 2005.
U.S. Appl. No. 11/012,880, filed Dec. 15, 2004.
Brin, et al., "Anatomy of a large-scale hypertextual web search engine," Proceedings of the 7th International World Wide Web Conference, 1998, 20 pages.
MyBlogLog FAQs, http://web.archive.org/web/20050307012413/www.mybloglog.com/help/, 2005, 2 pages.
IMNMotion Behavior Monitor, www.whitefrost.com/projects/mousetrax, 2003, 2 pages.
Touchgraph Amazon Browser V1.01, http://web.archive.org/web/20050104085346/www.touchgraph.com/TGAmazonBrowser.html, 2005, 2 pages.
Jeanson, et al., "Pheromone trail decay rates on different substrates in the Pharaoh's ant, *Monomorium pharaonis*," Physiological Entomology v. 28, 2003, 7 pages.
Martin, et al., "The privacy practices of web browser extensions," Privacy Foundation, Dec. 6, 2000, 61 pages.
Menkov, et al., "AntWorld: A collaborative web search tool," Proceedings of Distributed Communities on the Web, Third International Workshop, 2000, 10 pages.
Kantor, et al., "The information question: A dynamic model of user's information needs," Proceedings of the 62nd Annual Meeting of the American Society for Information Science, 1999, 10 pages.
Dorigo, et al., "The ant system: Optimization by a colony of cooperating agents," IEEE Transactions on Systems, Man, and Cybernetics, Part B, vol. 26, No. 1, 1996, 26 pages.
Mute: How ants find food, http://web.archive.org/web/20041209082357/mute-net.sourceforge.net/howAnts.shtml, 2004, 9 pages.
Levy, "In the new game of tag, all of us are it," Newsweek, Apr. 18, 2005, 2 pages.
Harth, et al., "Collaborative filtering in a distributed environment: an agent-based approach," Technical report, University of Applied Sciences Wurzburg, Germany, Jun. 2001, 7 pages.
Shapira, et al., "The effect of extrinsic motivation on user behavior in a collaborative information finding system," Journal of the American Society of Information Science and Technology, 2001, 27 pages.
Panait, et al., "A pheromone- based utility model for collaborative foraging," Proceedings of the 2004 International Conference on Autonomous Agents and Multiagent Systems, 8 pages.
Theraulaz, et al., "The formation of spatial patterns in social insects: from simple behaviors to complex structures," Philosophical Transactions of the Royal Society of London A, 2003, 20 pages.
Andersson, et al., "Admission control of the Apache web server," Proceedings of Nordic Teletraffic Seminar 2004, 12 pages.
Andersson, et al., "Modeling and design of admission control mechanisms for web servers using non-linear control theory," Proceedings of ITCOM 2003, 12 pages.
Alexa Web Search, "About the Alexa traffic rankings," http://web.archive.org/web/20050527223452/pages.alexa.com/prod_serv/traffic_learn_more.html, 2005, 3 pages.
Alexa Web Information Service, http://web.archive.org/web/20041231034354/http://pages.alexa.com/prod_serv/WebInfoService.html, 2004, 2 pages.
Dowdell, "BlogPulse New & Improved Blog Search Engine," Marketing Shift blog, http://www.marketingshift.com/2005/7/blogpulse-new-improved-blog-search.cfm, Jul. 20, 2005, 55 pages.
Technorati Tour, "How Technorati Works," http://web.archive.org/web/20050702025310/http://www.technorati.com/tour/page2.html, 2005, 1 page.
Technorati, "About Us," http://web.archive.org/web/20050703012613/www.technorati.com/about/, 2005, 1 page.
Fry, About Anemone: http://web.archive.org/.web.20041209174809/http://acg.media.mit.edu/people/fry/anemone/about/, 2004, 4 pages.
Fry, "Organic Information Design," Master's Thesis, Massachusetts Institute of Technology, http://acg.media.mit.edu/people/fry/thesis/thesis-0522d.pdf, May 2000, 97 pages.
O'Reilly Radar—About, http://web.archive.org/web/20050421173629/radar.oreilly.com/about/, 2005, 3 pages.
About Stumbleupon, http://web.archive.org/web/20050107011918/www.stupmbleupon.com/about.html, 2004, 2 pages.
Van Renesse, et al., "Astrolabe: A robust and scalable technology for distributed system monitoring, management, and data mining," ACM Transactions on Computer Systems, May 2003, 43 pages.
Erinaki, et al., "SEWeP: Using site semantics and a taxonomy to enhance the web personalization process," Proceedings of the Ninth ACM SIGKDD International Conference on Knowledge Discovery and Data Mining, Aug. 2003, 10 pages.
Wilson, "Pheromones," Scientific American v. 208, 1963.
Forney, "The Viterby algoritm," Proceedings of the IEEE, v. 61, No. 3, 1973, 11 pages.
Rocchio, "Relevance Feedback in Information Retrieval," in Salton, ed., "The Smart System—experiments in automatic document processing," pp. 313-323, 1971, 13 pages.
Salton, et al., "Term weighting approaches in automatic text retrieval," Information Processing and Management, v.24, No. 5, 1988, 11 pages.
Salton, "Search and retrieval experiments in real-time information retrieval," Cornell University Technical Report No. 68-8, 1968, 34 pages.
Amazon.com, "What are statistically improbable phrases?," http://web.archive.org/web/20050416181614/http://www.amazon.com/gp/search-inside/sipshelp.heml, 2005, 1 page.
U.S. Appl. No. 10/910,457, filed Aug. 3, 2004.
U.S. Appl. No. 11/479,225, filed Jun. 30, 2006.
U.S. Appl. No. 11/238,079, filed Sep. 28, 2005.
U.S. Appl. No. 11/611,696, filed Dec. 15, 2006.
U.S. Appl. No. 11/321,895, filed Dec. 29, 2005.
U.S. Appl. No. 11/321,697, filed Dec. 29, 2005.
U.S. Appl. No. 11/478,919, filed Jun. 30, 2006.
U.S. Appl. No. 11/238,070, filed Sep. 28, 2005.
BlogPulse FAQs, www.blogpulse.com/about.html, 2005, 8 pages.
Net Applications, "Are all web site statistics reports created equal?", Feb. 2005, 3 pages.
Net Applications, "How to maximize the ROI from your web site," Feb. 2005, 4 pages.
Visitorville, "How it works (in a nutshell)," 2005, 3 pages.
Alexa Company Info—History, http://web/archive.org/web/20060830003300/www.alexa.com/site/company/history, 2005, 2 pages.
Alexa Company Info—Technology, http://web.archive.org/web/20060830034439/www.alexa.com/site/company/technology, 2005, 2 pages.
Vara, "New Search Engines Help Users Find Blogs," Wall Street Journal Online, Sep. 7, 2005.
del.icio.us—About, http://del.icio.us/about/, 2008, 2 pages.

* cited by examiner

Last Updated: 10:05:26

Top Destinations

| Weight | Link | |
|---|---|---|
| 38/10 | Phone Directory : Sara Jones | (drilldown) |
| 38/10 | Phone Directory : Carol Roberts | (drilldown) |
| 28/10 | Phone Directory : John Smith | (drilldown) |
| 28/20 | Wiki : CompanyTeams | (drilldown) |
| 28/10 | Phone Directory : Rob Thomas | (drilldown) |
| 28/20 | Phone Directory : Search Results | (drilldown) |
| 26/10 | Phone Directory : Kent Brockman | (drilldown) |
| 23/10 | Phone Directory : Steve Young | (drilldown) |
| 18/10 | Phone Directory : Joe Graziano | (drilldown) |
| 18/10 | Phone Directory : John Strubie | (drilldown) |
| 18/10 | Phone Directory : Mike Stadtler | (drilldown) |

*FIG. 12A*

Last Updated: 10:07:16

Top Destinations

| Weight | Link | |
|---|---|---|
| 62/10 | Phone Directory : Jerry Adams | (drilldown) |
| 43/10 | Order Entry | (drilldown) |
| 37/10 | Wiki : WebServicesUserManual | (drilldown) |
| 25/10 | Wiki : MarketingManual | (drilldown) |
| 22/10 | Phone Directory : Lynn Krebs | (drilldown) |
| 18/10 | Phone Directory : Tim Weber | (drilldown) |
| 18/10 | Graphs: QueryLog: inventory-latency | (drilldown) |
| 18/10 | Graphs: QueryLog: manager-summary | (drilldown) |
| 18/10 | Graphs: QueryLog: customer-summary | (drilldown) |
| 18/10 | Phone Directory : Anthony Gardener | (drilldown) |
| 18/10 | Phone Directory : Chuck Brown | (drilldown) |

*FIG. 12B*

Last Updated: 10:10:47

Top Destinations

| Weight | Link | |
|---|---|---|
| 171/10 | Wiki : Wiki Home | (drilldown) |
| 60/10 | Graphs: WebServUtilizationApp | (drilldown) |
| 32/10 | Phone Directory : Les Johnson | (drilldown) |
| 32/10 | Phone Directory : Deb Greco | (drilldown) |
| 30/20 | Wiki : CatalogFrameworkTools | (drilldown) |
| 20/10 | Phone Directory : Joe Cross | (drilldown) |
| 20/10 | Phone Directory : Gaylord Brantz | (drilldown) |
| 20/10 | Phone Directory : Ed McCaffrey | (drilldown) |
| 20/10 | Phone Directory : Mitch Moran | (drilldown) |
| 20/10 | Phone Directory : Sheryl Wilson | (drilldown) |
| 20/10 | Phone Directory : Ivan Claussen | (drilldown) |

*FIG. 12C*

Last Updated: 10:08:22

Wiki : Wiki Home

Destinations:

| Weight (l/g) | URL | |
|---|---|---|
| 0/190 | Wiki : Wiki | (drilldown) |
| 21/21 | Wiki : Search for 'Java' | (drilldown) |
| 16/20 | Wiki : Search for 'codereview' | (drilldown) |
| 9/18 | Wiki : Search for 'hitcount' | (drilldown) |
| 7/14 | Wiki : Search for 'gettext' | (drilldown) |
| 0/10 | Wiki : Search for 'crash' | (drilldown) |
| 1/10 | http://wiki.company.com/?VNC | (drilldown) |
| 0/9 | Wiki : Promotions | (drilldown) |
| 0/8 | Wiki : Media | (drilldown) |
| 4/8 | Wiki : Search for 'conference' | (drilldown) |

Referrers:

| Weight | URL | |
|---|---|---|
| 0/190 | Wiki : Wiki | (drilldown) |
| 0/0 | Wiki : by owner: asmith | (drilldown) |
| 2/0 | http://auth.company.com/jones/sign-in | (drilldown) |
| 0/0 | http://internal.company.com/ | (drilldown) |
| 0/0 | http://user121.company.com/cgi-bin/home.cgi | (drilldown) |
| 0/0 | Wiki : CatalogTools | (drilldown) |
| 0/0 | http://int.company.com/search/results.mhtml?query=wiki | (drilldown) |
| 0/0 | http://wiki.company.com/?TicketSubmit | (drilldown) |
| 0/0 | Wiki : MoveLogistics | (drilldown) |
| 0/0 | Wiki : TransactionalEvents | (drilldown) |

*FIG. 12D*

METHOD AND SYSTEM FOR DETERMINING INTEREST LEVELS OF ONLINE CONTENT NAVIGATION PATHS

PRIORITY CLAIM

This application claims benefit of priority to U.S. Provisional Patent Application No. 60/710,549, filed Aug. 23, 2005 and entitled "Method And System For Determining Interest Levels Of Online Content Based On Rates Of Change Of Content Access," and to U.S. Provisional Patent Application No. 60/728,923, filed Oct. 21, 2005 and entitled "Method And System For Determining Interest Levels Of Online Content Navigation Paths," each of which is hereby incorporated by reference herein in its entirety.

BACKGROUND OF THE INVENTION

1. Field of the Invention

This invention relates to computing systems and, more particularly, to identifying the level of interest in computer-accessed content according to usage patterns associated with that content.

2. Description of the Related Art

As the reach and accessibility of computer networks such as the Internet increase, the amount of information accessible via such networks has grown exponentially. For example, as commercial enterprises increasingly embrace electronic commerce techniques, numerous websites offering information and purchasing opportunities for various products and services have appeared. Major media outlets commonly provide web-based versions of content previously available only through print or broadcast channels, and in some instances generate considerable volumes of content exclusively for web-based distribution. The reduction of cost, complexity and other barriers to entry into web-based content publishing has also facilitated the generation and dissemination of content by individual creators. This phenomenon is perhaps best illustrated by the increasing number and popularity of individually-authored web logs or "blogs," which offer content in a wide range of topics, styles and perspectives ranging from objective journalism to near-real-time autobiography.

As the amount of online content increases, the difficulty of locating content that is of general or specific interest also increases. Unlike libraries, which may employ standardized systems of content classification such as the Library of Congress System or the Dewey Decimal System, no standard for organizing and representing web-based content exists. Numerous search engines have evolved to attempt to index web pages according to the page contents (e.g., as given by the textual content actually displayed by the page when loaded into a browser or client, or by concealed metadata such as tags associated with or embedded within the page). Such search engines have further attempted to qualify the relevance of a given indexed page using other features of the page, such as its age and/or the number of links to the given indexed page from other indexed pages. For example, for a given keyword search, a page that satisfies the search criteria and is linked to from many sources may be considered a more relevant search result than a page having fewer external references.

As discussed in U.S. Provisional Application No. 60/710, 549, entitled "Method and System for Determining Interest Levels of Online Content Based on Rates of Change of Content Access" and filed Aug. 23, 2005, conventional index-based approaches to organizing online content suffer from a number of limitations. For example, such approaches are relatively static. Typical search engines gather information for indexing by "crawling" through web pages over periods of days or weeks, which may be insufficient to capture fast-moving or transient content. Further, numerous sources of content may be excluded from the indexing process, rendering the excluded content inaccessible to users of that search engine. For example, content hosts may deliberately refuse access to web-crawling tools, or a host may simply be too new or insufficiently relevant (e.g., according to absolute number of visitors or number of inbound links to content) to warrant indexing according to a search engine's indexing policy or strategy. Thus, users unaware of how to directly access excluded content (e.g., via a specific Uniform Resource Locator, or URL), may never be able to locate it.

Additionally, conventional approaches for determining the relevance of content may not correlate well with the actual usage of content. As described above, a given web page that is conventionally indexed may be assigned a high degree of relevance if there are a large number of links to that page from other pages. However, if few users actually navigate those links to reach the given page, the significance of the links in determining relevance is questionable. In fact, it is a commonplace tactic to distort the overall relevance of a particular web page by widely distributing specious links to that page across the Internet, thus elevating the ranking of the page within search results despite content that might not otherwise justify such a ranking.

SUMMARY

Various embodiments of a method and system for determining interest levels of online content navigation paths are disclosed. According to one embodiment, a method may include determining each of a plurality of navigation paths among a plurality of online content sources, and for each of the plurality of navigation paths, determining a corresponding path weight, where a given one of the corresponding path weights is indicative of user activity along a corresponding navigation path. The method may further include identifying a particular one of a plurality of aggregate paths within the plurality of online content sources, where the particular aggregate path includes one or more of the navigation paths, where an aggregate path weight corresponding to the particular aggregate path is dependent upon the path weights corresponding to the navigation paths included in the particular aggregate path, and where the aggregate path weight satisfies an optimization criterion relative to other ones of the aggregate paths within the online content sources. A given one of the navigation paths included in the particular aggregate path may correspond to a possible user traversal from a first one of the online content sources to a second one of the online content sources.

BRIEF DESCRIPTION OF THE DRAWINGS

FIGS. 12A-D illustrate one example of a type of content interest data display and the evolution of displayed content interest data over time.

Figure 1:
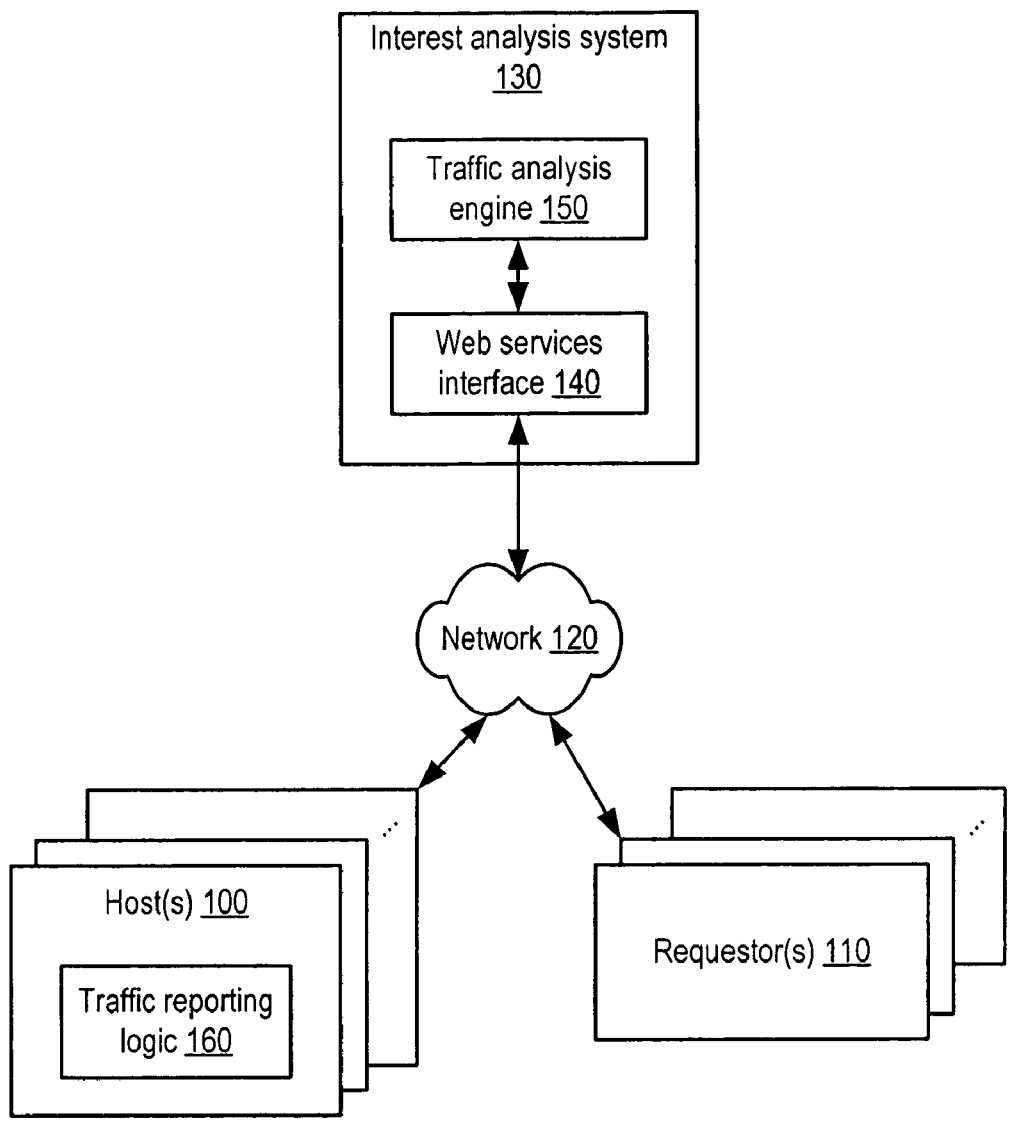
FIG. 1 is a block diagram illustrating one embodiment of a system configured for distribution of online content.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As noted above, conventional schemes for indexing online content, e.g., by exhaustively crawling through such content, and statically ranking content relevance, e.g., by noting the degree of connectivity to content, may both overlook certain content and inaccurately represent its real interest to users. As an alternative approach, the interest level of online content may be determined on the basis of actual user access to such content. For example, content that is frequently requested by users (e.g., via a web browser or other type of device or interface) may be considered more interesting than content that that has many inbound links but few actual user requests. By associating a measure of content interest with actual user behavior relative to content, content interest may be determined dynamically. Indicated content interest may then rise and fall according to content access patterns that may reflect emergent properties of a networked community of users. It is noted that in some instances, the interest level of content may be a factor in or a proxy for the relevance of such content to a given user.

In some embodiments, content interest associated with online content may be determined according to the behavior of users or consumers of that content, as distinct from an owner or generator of the content, or an agent that may attempt to access online content with no interest or intent grounded in the content itself. For example, content interest may be associated with the general interest of a broad or narrow community of users for whom at least some degree of initial or continuing desire or curiosity for making use of online content is implicit in their acts of accessing such content. By contrast, the actions of an owner or generator of content may not be indicative of interest in the owned or generated content per se, but rather in the availability of such content for users. For example, the attempts of a web site owner to access his own site's content for debugging purposes may not indicate interest in the content itself, but rather some aspect of how the content appears or is conveyed. Similarly, a bad actor may maliciously attempt to access online content with the intention not of using the content but of creating a deleterious effect, such as a denial of service attack or a distortion of content usage metrics (e.g., "click fraud").

Sheer volume of user access requests to a given source of online content may not be the best indicator of interest, however. For example, the websites of major online retailers, media outlets, etc. process consistently large numbers of content requests through their home pages every day, with relatively minor and/or predictable fluctuations in request traffic relative to overall traffic volume. By contrast, a little-known website might suddenly see its traffic grow tenfold, perhaps due to media coverage, word of mouth, etc. If content interest were purely a function of the number of content access requests, the high-volume site with relatively consistent request traffic would continually be ranked as more interesting than the little-known site that exhibits considerable variance in request traffic. This may act to impair the discovery of new and potentially interesting sources of content. That is, determining content interest solely from access request volume (e.g., number of requests per hour, day, etc.) may be biased in favor of preserving the level of interest of already highly-ranked content sources at the expense of obscuring the level of interest of less-requested sources.

In some cases, such a bias may be overcome by defining a measure of content interest to account for a time rate of change of content request traffic, rather than simply the magnitude of the content request traffic. (Such a measure may be referred to interchangeably herein as a level or indication of interest, as content interest or simply as interest.) Considering the previous example, the overall rate of change of request traffic for high-volume sites may be relatively small at any given time. By contrast, traffic to a little-known website may exhibit a large rate of change, relative to its overall traffic volume, in a short period of time during a spike in traffic. By highlighting the rate of change of content request traffic, the burgeoning interest in the little-known website may be brought to the attention of users who otherwise may have never become aware of the content available at that site.

In the following sections, the behavior of an exemplary network-based system for requesting and conveying online content is discussed. Various methods for determining the level of interest of online content based on rate-of-change behavior of content request traffic are explored. Additionally, techniques for collecting and reporting request traffic as well as displaying the resulting interest analysis of such traffic are considered, and an exemplary computer system that may be configured to implement content request traffic data collection, analysis and/or reporting functions is discussed.

Overview of Online Content Distribution System

One embodiment of a system configured to facilitate the distribution of online content is illustrated in FIG. 1. In the illustrated embodiment, a number of hosts 100 are configured to receive requests for online content from a number of content requestors 110 via a network 120. Additionally, an interest analysis (IA) system 130 including a web services (WS) interface 140 and a traffic analysis (TA) engine 150 is configured to communicate with hosts 100 via network 120. As noted below in conjunction with the description of FIG. 11, in some embodiments some or all of the components illustrated in FIG. 1 may be partially or entirely implemented as computer-executable instructions and data stored via a computer-accessible medium.

Generally speaking, hosts 100 may be instances of online content sources, where an online content source may encompass any suitable type of data that may be conveyed over a network, including but not limited to text documents, still image data, page image data, audio data, video data, metadata such as markup language tags, communication protocol data such as content preambles/epilogues, and so forth. In many embodiments, hosts 100 may be configured to provide online content to requestors 110 via web-based data request and transport protocols. For example, hosts 100 may be configured to host web sites implementing Uniform Resource Locators (URLs) corresponding to web pages, documents or other online content, and to receive requests for access to particular URLs formatted in a version of the Hypertext Transport Protocol (HTTP) data transport protocol. In response to such requests, hosts 100 may be configured to access the content corresponding to the requested URL and to provide it to the requestor 110 in accordance with the HTTP protocol. It is contemplated that in some embodiments, application layer data transport protocols other than or in addition to HTTP may be used to convey requests for content and the resulting content to and from hosts 100. For example, a secure, authenticated version of HTTP may be employed, as may a version of File Transfer Protocol (FTP) or any other suitable protocol. Hereinafter, an online content source may be referred to simply as a content source, although it is understood that the content of a content source may be conveyed or accessed via some type of communication network.

In some embodiments, a given host 100 may be configured as a self-contained, standalone web server that both stores online content and receives and processes requests for stored content. In other embodiments, a given host 100 may be included within a complex content server architecture. For example, host 100 may be configured as an application or content server that does not actually store content, but is instead configured to retrieve requested content from a database or other repository (not shown) that may not be directly connected to network 120.

Content requestors 110 in general may encompass any device, system or software application that may be configured to request online content. For example, a requestor 110 may include a general purpose computing system configured to implement a web browser such as a version of Microsoft® Internet Explorer®, Firefox®, Opera™, or another suitable web browser or client application. Requestor 110 may also include functionality defined by scripts, such as JavaScript modules, configured to execute in a standalone environment or an execution environment provided by a web browser. Requestor 110 may alternatively be configured to host a syndicated content aggregator that may use a publish/subscribe protocol such as RSS to notify users of the existence of new or updated online content. In some embodiments, a requestor 110 may include mobile devices such as cellular phone or wireless devices configured to request online content via embedded clients. A requestor 110 may further encompass other types of network-attached devices such as television set-top boxes, digital video recorders, etc.

Network(s) 120 may include any suitable data network or combination of networks configured for communicating content requests and online content between requestors 110 and hosts 100. For example, network 120 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 120 may encompass the network infrastructure commonly referred to as the Internet. In other embodiments, network 120 may be entirely contained within an enterprise and not directly accessible from the Internet. For example, network 120 may be configured as an enterprise intranet where hosts 100 and requestors 110 are local to an enterprise.

Generally speaking, content requestors 110 may request and receive content from hosts 100 via network 120. In some instances, the pattern of such requests may be indicative of the relative interest of requested content. For example, if many different requestors 110 generate requests for one content source over a period of time, while fewer requests are directed to a second content source during the same period of time, the request data may indicate that the first content source is of greater interest to users than the second content source during the time period in question. As described in greater detail in subsequent sections, in one embodiment, IA system 130 may be configured to receive reports of content request traffic generated by or on behalf of requestors 110, and to perform various types of analysis on such reports. Such analyses may variously be configured to determine, for example, relative levels of user interest of individual content sources as well as path relationships among content sources evidenced by user navigation.

While online content hosted by hosts 100 may often conform to a web-based model in which content may be requested via URLs and delivered to a web browser or other web client, this is not a requirement for the methods and techniques described below. Broadly speaking, hosts 100 may host any type of online content and may interact with requestors 110 according to any suitable request/response model to provide the hosted content. For example, in some embodiments, hosts 100 may be configured as databases, file systems, or other types of data repositories accessible by protocols other than web-based protocols.

Content Request Traffic Data Collection

As described above, a host 100 may receive content request traffic from various requestors 110 that is directed to online content hosted by host 100. For example, a host 100 may receive HTTP GET requests directed to a particular URL, or a different type of content request according to a different data transport protocol. In the illustrated embodiment, hosts 100 may be instrumented with traffic reporting logic 160, which in various embodiments may include scripts, code or hard-wired logic configured to report content request traffic to interest analysis system 130.

Figure 2:
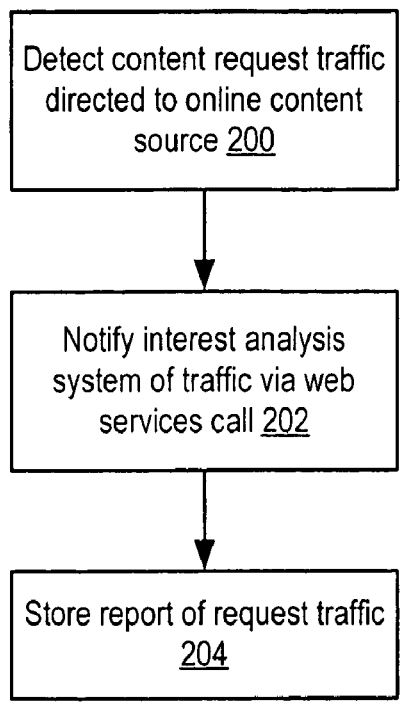
FIG. 2 is a flow diagram illustrating one embodiment of a method of reporting an occurrence of content request traffic via a web services interface.

In one embodiment, traffic reporting logic 160 may be configured to invoke one or more web services (WS) calls targeting the WS interface 140 of IA system 130 as the service endpoint. One embodiment of a method of operation of traffic reporting logic 160 is illustrated in FIG. 2. Referring collectively to FIGS. 1-2, operation begins in block 200 where content request traffic directed to online content sourced by host 100 is detected. For example, host 100 may detect an incoming HTTP GET request specifying a given URL. In response, IA system 130 may be notified of the content request traffic via a web services call (block 202) and the reported request traffic may be stored, e.g., by IA system 130 (block 204). For example, traffic reporting logic 160 may be configured to issue a web services call according to the following format:

http://<endpoint>/xml?Operation=AddPheromone
    &Url=<valid URL>
    &Referrer1=<valid referrer URL>
    &Referrer2=<valid referrer URL>
    &ResponseType=<valid response type> where <endpoint> corresponds to the Internet address of WS interface 140, in name or numeric form, and where <valid URL> denotes the requested or targeted URL. In the illustrated embodiment, two referrer URLs may also be supplied. The first referrer URL may correspond to the URL from which the request for the targeted URL originated. For example, the request may have been generated by a user selecting (e.g., clicking) a link or otherwise executing a navigation operation on some other web page, in which case the first referrer URL may include the URL of that other web page. Similarly, the second referrer URL may include the URL of the site, page or other resource that referred to the first referrer URL (e.g., the URL that is two links previous to the targeted URL in the navigation history of the requestor). More or fewer referrers may be provided in various embodiments. Also, additional or different parameters may be used in the web services call in various embodiments. For example, date and/or time information associated with the occurrence of the content request may be embedded by the host within the web services call used to report the content request. Alternatively, such information may be recorded by IA system 130 when it receives such a report. It is contemplated that over time, different hosts 100 may report content request traffic to IA system 130 via traffic reporting logic 160, e.g., according to the method of FIG. 2. As a result, over time IA system 130 may accumulate a body of data indicative of content request traffic from many different requesters 110 to many different content sources associated with hosts 100. Such data may serve as the basis for content source interest analysis and navigation path analysis, as described in subsequent sections.

The additional parameter ResponseType may be used in some embodiments to return data to host 100 from IA system 130. For example, different values for the ResponseType may cause IA system 130 to return data such as the top URLs referring to or from the target URL or the top URLs of all URLs known to IA system 130 (e.g., ranked according to content request traffic analysis as described below). Other ResponseType values may cause the original web services request to be echoed back to host 100, or may cause a different response or no response at all to be returned. If URL data is returned, it may be processed by host 100 as described below in conjunction with the description of FIG. 9 to report content request traffic and retrieve content source interest data.

It is noted that in some embodiments, when a user navigates away from content on a particular host 100 to a different content source (e.g., a URL hosted by a different host 100), the particular host 100 may be configured to detect the outgoing transition. In some such embodiments, hosts 100 may be configured to report such outgoing content request traffic to IA system 130 via traffic reporting logic 160 in addition to incoming content request traffic. Since navigation away from one content source typically implies navigation towards another, even if the target host is not instrumented to report content request traffic data (e.g., with an instance of traffic reporting logic 160), in some circumstances content request traffic data may still be captured by the host from which the user is navigating away.

In the example web services call shown above, the specified operation AddPheromone may indicate to IA system 130 that the supplied content request traffic information should be recorded and processed as described in greater detail below. Generally speaking, recording information regarding the navigational path taken by a user to a content source (e.g., the target URL as well as its referrers) may be conceptually similar to an insect marking its path with a pheromone. If a sufficient number of users navigate to a particular content source through a certain set of paths, those paths may be distinguished from other paths (e.g., random paths) via the accumulation of "pheromone" (e.g., recorded traffic information). It is noted, however, that the use of the term "pheromone" in this context is purely illustrative or metaphorical and that some characteristics of biological pheromones may not be directly applicable to analysis of content request traffic as described herein.

It is noted that in various embodiments, traffic reporting logic 160 may be configured to invoke WS interface 140 in any of a number of suitable ways. The example just given may be representative of a web services invocation in a Representational State Transfer (REST)-style web services architecture. Alternatively, host 100 may communicate with WS interface 140 using a document- or message-oriented architecture, for example by formatting the web services request as an eXtensible Markup Language (XML) document, encapsulating such a document using a version of the Simple Object Access Protocol (SOAP), and conveying the resulting encapsulated document to WS interface 140 for processing. In either case, different numbers or types of parameters for communicating information about content request traffic targeting host 100 may be employed in various embodiments. It is also contemplated that in some embodiments, hosts 100 may communicate with interface 140 using protocols other than web services-related protocols. For example, such communication may take place using protocols such as Telnet, Remote Procedure Call (RPC), or other standard or proprietary protocols. Also, in some embodiments it is contemplated that a host 100 may combine and report information for multiple distinct content requests as part of a single web services transaction with WS interface 140.

An administrator of a host 100 may integrate traffic reporting logic 160 directly within the other functionality of host 100 that is configured to process content requests and provide content. However, in some embodiments, traffic reporting logic 160 may be configured as a self-contained, platform-independent software module that may be downloaded, remotely invoked or otherwise obtained from a third party (e.g., the party providing IA system 130) and implemented by an administrator of a host 100 with minimal alteration to the configuration of host 100. For example, traffic reporting logic 160 may be implemented as a JavaScript module or a software module coded in another suitable language. Upon activation, traffic reporting logic 160 may be configured to generate the appropriate web services calls to report content request traffic to IA system 130 in a manner that is generally transparent to the other operations performed by host 100. Traffic reporting logic 160 may be implemented to have minimal impact on content request throughput. For example, if traffic reporting logic 160 cannot contact WS interface 140 to report a particular content request, the request may still be allowed to complete.

Although in some embodiments, traffic reporting logic 160 may execute on host 100, in other embodiments it may be implemented as a module such as a JavaScript module that is delivered by host 100 to a requestor 110 along with the requested content. Traffic reporting logic 160 may then be executed by the requestor, rather than the host, in order to report the request. In other embodiments, traffic reporting logic 160 may be implemented on a proxy server that may be located between requestor 110 and host 100. The general function of traffic reporting logic 160 may be similar regardless of whether the logic is implemented for host-side, client-side or proxy server execution.

Through the reporting of instances of content request traffic by hosts 100, IA system 130 may gather data indicative of both the global traffic behavior among hosts 100 as well as traffic behavior relative to a subset of hosts 100 or within an individual host 100 (e.g., among the different URLs hosted by a particular host 100). In some embodiments, IA system 130 may store each traffic report received from a host 100 as an individual data record, while in other embodiments IA system 130 may be configured to aggregate or consolidate traffic records in various ways. For example, IA system 130 may aggregate content request traffic data into time slots according to intervals of time such as seconds, minutes, hours, days or other suitable intervals. Those data points falling within a given time slot may be aggregated for the purposes of analysis.

Filtering and Manipulation of Collected Data

In various embodiments, IA system 130 may manipulate the received URLs within content request traffic data in various ways. For example, to avoid accumulating sensitive or personally identifying user data (e.g., out of privacy concerns), IA system 130 may be configured to strip query parameters, session information, or any other potentially personally identifying information such as cookies, passwords, etc. from a target URL or a referrer URL (e.g., by stripping any information following the first occurrence of '?' within the URL). IA system 130 may also be configured to transform URLs into a canonical format, for example by truncating them or eliminating internal levels of hierarchy. Additionally, IA system 130 may be configured to perform unification of different URLs. In one embodiment, certain different URLs may refer to content that is sufficiently similar to warrant tracking as a single content source. For example, a host 100 may be configured to dynamically generate content by augmenting existing content with personalization information before delivering the content to the requestor 110. Alternatively, a URL may reflect session or state information associated with a particular requestor 110 that may be transparent with respect to the content actually delivered to the requestor. Unification of distinct URLs may include determining that the URLs refer to the same underlying content or subset of content, and subsequently tracking the URLs as common rather than distinct. It is contemplated that in some embodiments, some or all aggregation, unification or other manipulation of reported URLs may be performed by traffic reporting logic 160 within a host 100 rather than by IA system 130. Further, it is contemplated that content request traffic reporting, aggregation and analysis may be performed at any suitable level of content granularity. For example, in embodiments where content sources correspond to various URLs, reporting and/or analysis of content request traffic may be performed on the level of individual web page URLs, site URLs, or any other suitable portion of a URL obtainable by extraction, truncation, unification, or any other type of transformation.

In some embodiments, reports of content request traffic may be filtered according to various criteria before further analysis occurs (e.g., a rate of change analysis as described below). For example, in some circumstances a requestor 110 may attempt to deliberately manipulate the traffic associated with a given content source by issuing spurious requests to that source. Such manipulation may be detected in a number of ways. For example, a unique identifier associated with a requestor 110 such as its Internet Protocol (IP) addresses or another suitable identifier (e.g., an irreversible hash of an IP address, browser key or other suitable combination of requestor information) may be tracked, and requests to a content source in excess of a given threshold or pattern may be considered questionable and subsequently filtered. Alternatively, collected traffic data may be filtered to remove traffic received from or directed to potentially objectionable sources, such as sources of pornographic content, phishing sites, spamming sites, or other sources complicit or implicit in the delivery of malicious or undesirable software (e.g., spyware or adware). Other motivations for filtering content request traffic are possible and contemplated.

Criteria for determining when filtering should be performed may vary in various embodiments. For example, as mentioned above, a substantial number of content requests originating from a single requestor 110 during a given period of time may be indicative that such requests are possibly being automatically generated. If such requests are directed to one or a small number of content sources, this behavior may be suggestive of an attempt to manipulate content interest indications of those sources. More generally, certain patterns of content request traffic may be identified to be suspicious or manipulative. For example, if content request traffic directed to a content source from one or more requestors 110 is highly cyclical or exhibits other predictable behavior with less variation than would be expected from a stochastic process, the traffic may be considered to exhibit a manipulative pattern and therefore be a candidate for filtering. It is noted that filtering may be implemented as a heuristic process rather than a deterministic process. Accordingly, in some embodiments, filtering may include flagging, marking or otherwise indicating suspicious data instead of permanently removing the data. In such embodiments, whether or not to use suspicious data may be selected as an operating parameter (e.g., by specifying a desired confidence level in the content interest weights).

The actual filtering of content request traffic may occur at a number of different points between requestor 110 and IA system 130. For example, IA system 130 may be configured to store all content request traffic reports received from hosts 100 as such reports arrive, and to subsequently remove records of reports deemed to be spurious or from undesirable sources. Alternatively, IA system 130 may be configured to perform filtering as reports are received and to discard or flag questionable reports. In other embodiments, traffic reporting logic 160 may be configured to evaluate content requests for filtering, and may either discard a questionable request without reporting it to IA system 130 or may report it with prejudice, e.g., by explicitly indicating that it may be questionable. In some embodiments, different criteria for filtering content request traffic may be applied to different content sources according to parameters specified by users of content request traffic data (including the interest analysis procedures described below). In such embodiments, raw content request traffic may be filtered at the time it is retrieved or analyzed rather than when it is initially received or stored.

In one embodiment, IA system 130 may be configured to perform load shedding under certain circumstances. For example, if the combination of incoming reports of content request traffic data from hosts 100 and outgoing content interest data (e.g., to badges, plugins or other users of content interest data as described below) exceeds a threshold volume of processing activity, the performance (e.g., response time) of IA system 130 may degrade. In such circumstances, IA system 130 may be configured to reduce its processing load by discarding incoming reports in order to preserve performance with respect to outgoing data, or vice versa. In other embodiments, other load management schemes are possible and contemplated. For example, IA system 130 may be configured to offload some of its processing tasks to other systems, or may employ flow-control protocols to negotiate the frequency or quantity of reporting it receives from hosts 100.

IA system 130 may be configured to store received content request traffic data using any suitable format or methodology. For example, IA system 130 may store such data in arrays, tables, trees, databases, hashed structures or other suitable data structures, either internal to IA system 130 or distributed among one or several external systems (not shown) such as database systems, file systems, etc. In some embodiments, IA system 130 may store historical content request traffic data for arbitrary periods of time, while in other embodiments data older than a threshold age (e.g., days, months, etc.) may be automatically purged or moved to secondary storage.

Content Request Traffic Data Analysis

The content request traffic data collected by IA system 130 for URLs hosted by a given host 100 may be generally representative of request traffic behavior over time for the given host 100. For example, the collected data may form a time series of data points corresponding to content request traffic at discrete points in time, or during various intervals of time. In some embodiments, IA system 130 may be configured to use curve-fitting techniques to develop an analytical function that is generally descriptive of the collected data within a certain level of error (e.g., by determining coefficients of a power series or Fourier series, or applying any other suitable curve-fitting technique). In such embodiments, parameters characterizing the analytical function (e.g., polynomial coefficients) may be stored in place of the collected data points themselves.

As mentioned previously, in some circumstances the magnitude of content request traffic corresponding to a particular URL may not be an optimal indication of the interest level of that URL. Rather, the rate of change in content request traffic may be a more effective measure for detecting emerging or developing trends in actual online content usage behavior, from which changes in content interest may be inferred. Particular examples of content request traffic data illustrating this phenomenon are shown in FIGS. 3A-B.

Figure 3A:
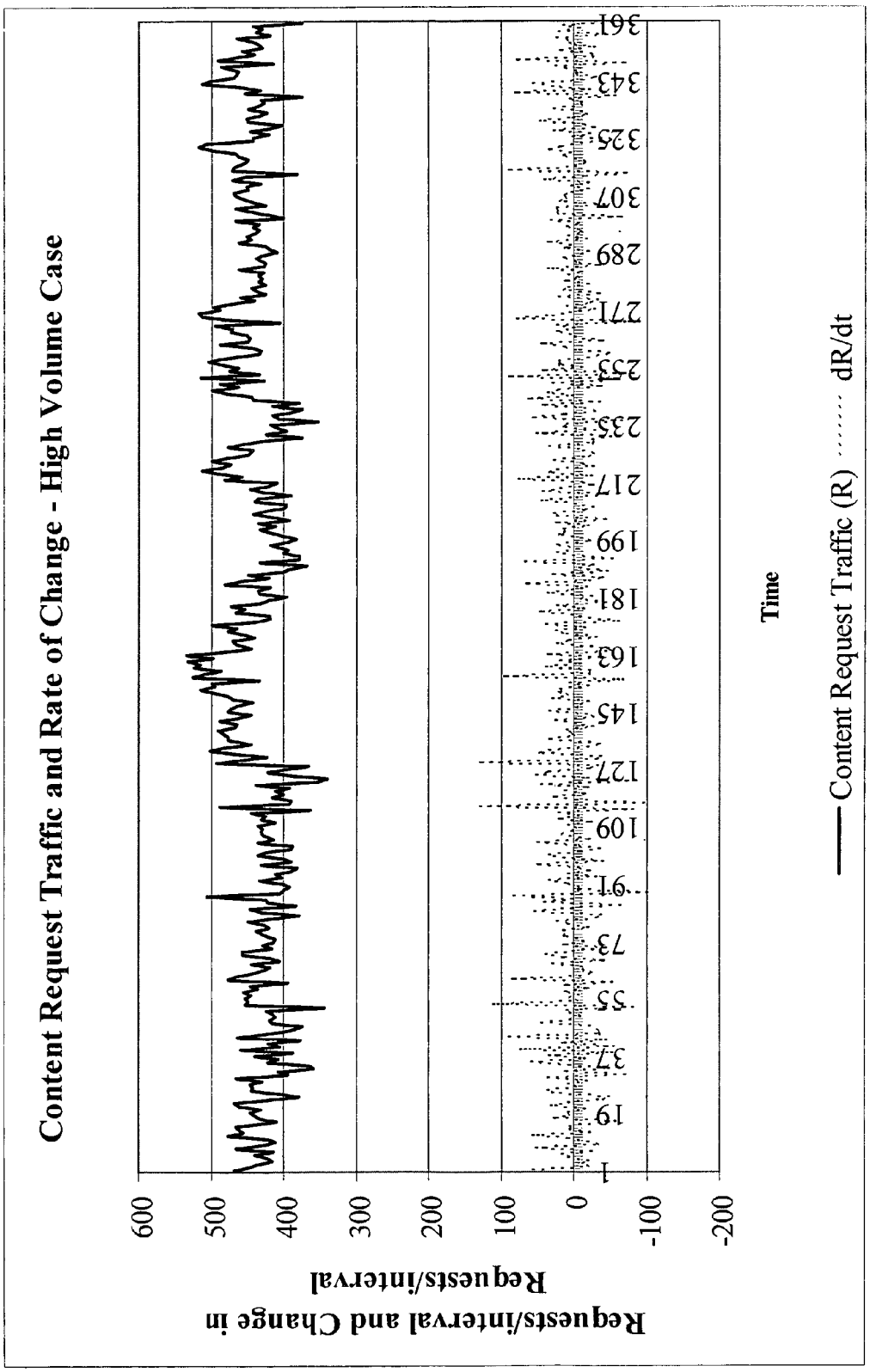
FIGS. 3A-D are graphs illustrating exemplary sets of time-series content request traffic data for contrasting content access traffic volume scenarios.

In FIG. 3A, content request traffic over a period of time is illustrated for an exemplary content source having a relatively high volume of requests. For example, the illustration may apply to a content source corresponding to a large, popular website, such as a retail website. As shown by the heavy solid line, content request traffic R for the high-volume source ranges between approximately 350 and 550 requests during any given interval of measurement. FIG. 3A also illustrates the first time derivative of content request traffic, dR/dt. As shown by the dotted line, the time rate of change of content request traffic generally falls within a range of +100 to 100 requests per unit of time.

Figure 3B:
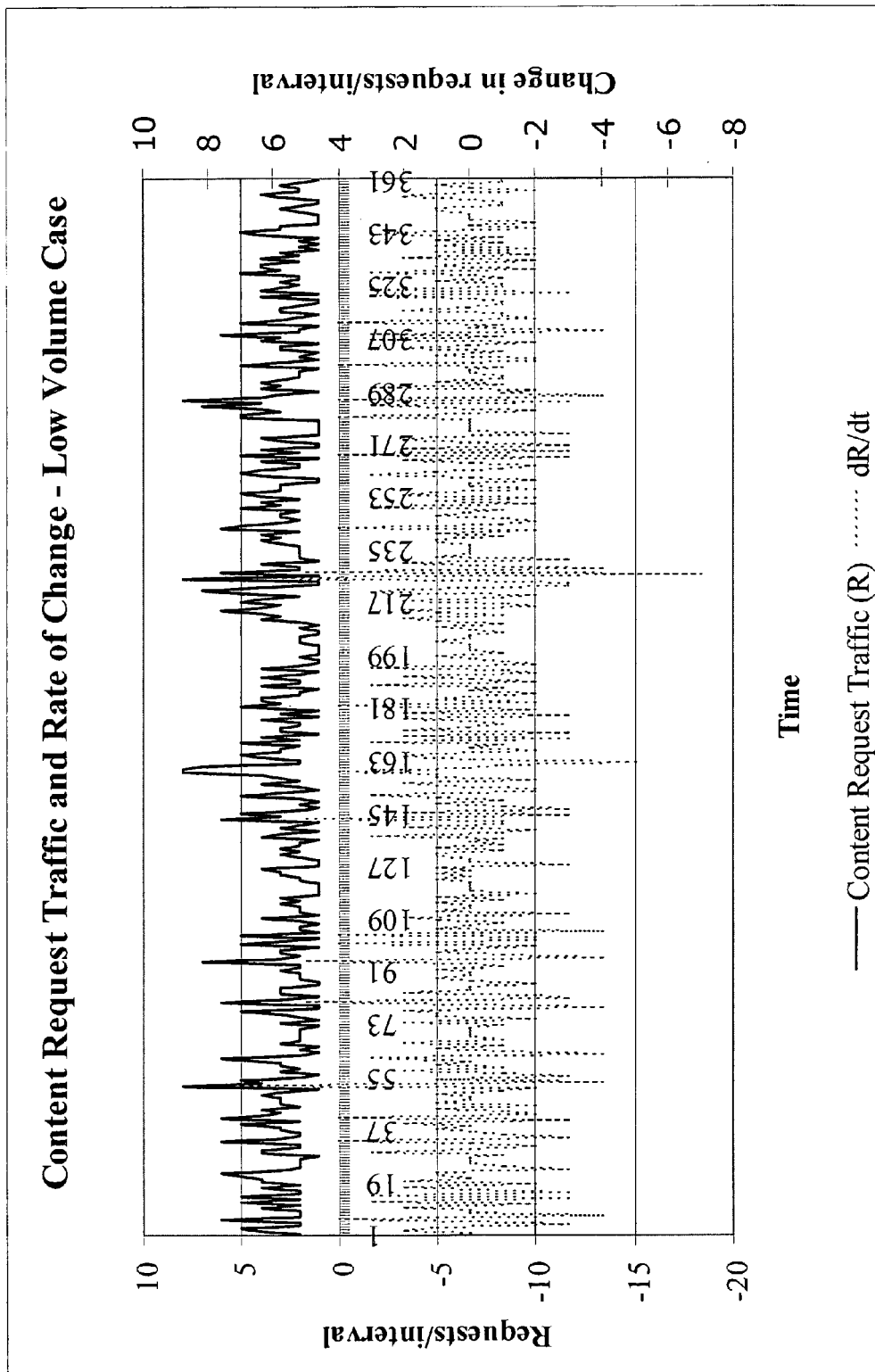

In FIG. 3B, content request traffic R is illustrated for an exemplary content source having a relatively low volume of requests. For example, this case may apply to a personal website such as a blog or personal home page. In this graph, the heavy solid line indicates content request traffic. Read along the left axis, content request traffic falls between 1 and 8 requests during any given interval. The first derivative of content request traffic, shown by the dotted line and read along the right axis, falls within a range of +7 to −7 requests per unit of time.

Figure 3C:
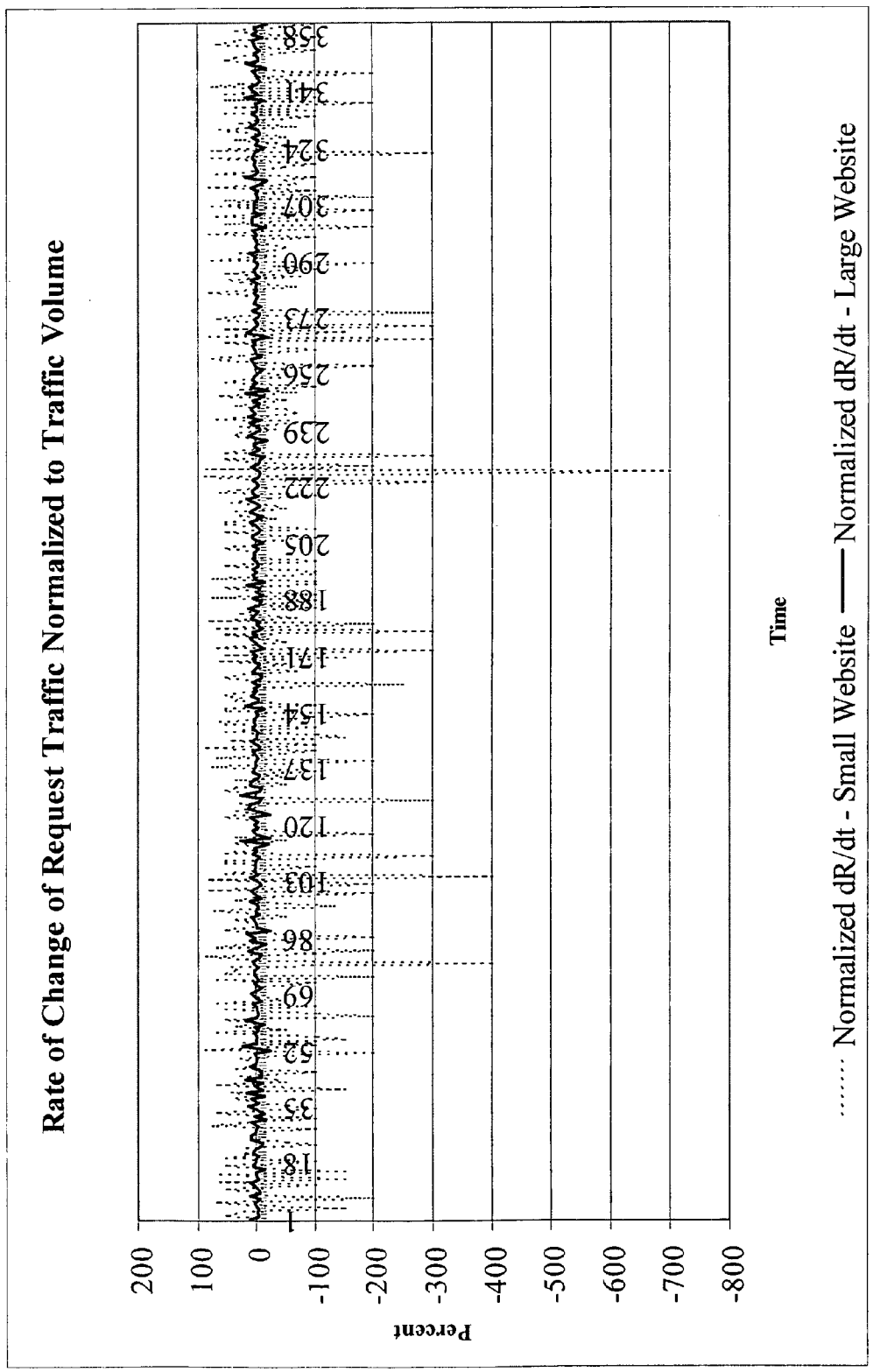

It is noted that in the low-volume case, the rate of change of content request traffic is much larger relative to overall traffic than in the high-volume case. This is explicitly illustrated in FIG. 3C, where the ratio of the first derivative of content request traffic to overall content request traffic and multiplied by 100 is shown for both the low- and high-volume cases. As shown in FIG. 3C, the normalized rate of change of traffic of the high-volume source illustrated by the solid line falls within a fairly narrow range of approximately +/−25% of traffic volume, whereas for the low-volume source illustrated by the dotted line, the normalized rate of change ranges from approximately +100% to −700% of traffic volume. Thus, in this example, even though the high-volume source experiences orders of magnitude more traffic than the low-volume source, the variability of traffic for the low-volume source is orders of magnitude larger than the high-volume case. In some circumstances, this variability may be indicative of changes in interest with respect to the low-volume content source that may be more significant than changes in interest for the high-volume content source.

Figure 4:
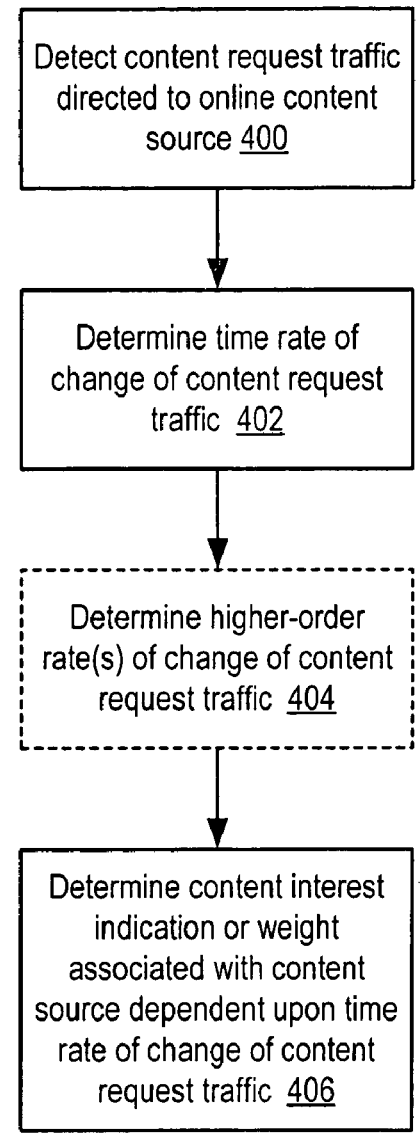
FIG. 4 is a flow diagram illustrating one embodiment of a method of determining an interest weight of a content source according to a rate of change of content request traffic directed to the content source.

In one embodiment, traffic analysis engine 150 of IA system 130 may be configured to perform a time rate of change analysis of content request traffic data and to determine the interest of content dependent upon such an analysis. One embodiment of a method of operation of TA engine 150 is illustrated in FIG. 4. Referring collectively to FIGS. 1-4, operation begins in block 400 where content request traffic directed to a content source is detected. It is noted that in one embodiment, detection of content request traffic may be considered to occur when a report of content request traffic is received for analysis by IA system 130. For example, such a detection may occur when IA system 130 receives a report of content request traffic to a URL hosted by a host 100, such as via WS interface 140 as described above. In other embodiments, detection of content request traffic may be considered to occur when host 100 detects a content request or when host 100 submits a report of a request to IA system 130. While in some embodiments, operation of the method of FIG. 4 may be triggered by the receipt of an individual content request traffic report by IA system 130, in other embodiments the illustrated method may operate in response some other condition or event. For example, the method may be configured to operate at periodic intervals, such as once per second or with some other frequency. Alternatively, the method may operate when a certain number of reports have been received, possibly without dependence on time. For example, after ten or some other number of reports have been received the method may operate to process the received reports in an aggregate fashion.

A first-order time rate of change of content request traffic may then be determined (block 402). For example, TA engine 150 may be configured to numerically compute the first derivative or first-order difference function with respect to time of the time series of data representative of the content request traffic data. In embodiments in which traffic data is modeled using analytic curve-fitting techniques, determination of the time rate of change of request traffic may be performed using analytic differentiation of the continuous or discrete analytic functions comprising the data model. In some embodiments, the time rate of change of content request traffic may be determined only with respect to newly received traffic data, which may then be appended to historical time rate of change data that may be stored in a manner similar to the content request traffic data itself. It is noted that in various embodiments, time rate of change information may be determined whenever content request traffic is detected, at points in time independent of traffic detection (e.g., according to a schedule), or in response to other events.

In addition to or instead of determining a first-order rate of change as in block 402, higher-order rates of change may be determined with respect to content request traffic data (block 404). For example, a second-order derivative or difference function, indicative of the time rate of change of the first-order time rate of change computed in the previous step, may also be determined in a similar manner. This process may be extended to generate an arbitrary number of higher-order derivatives or difference functions with respect to content request traffic data. Generally speaking, any rate of change of content request traffic determined with respect to time may be considered a time rate of change, regardless of the mathematical order of the rate of change with respect to content request traffic.

Subsequently, an indication of content interest associated with the content source may be determined, where the indication is dependent upon the time rate of change of content request traffic directed to the content source (block 406). The indication of content interest associated with a given content source may also be referred to herein as a weight or interest weight associated with the given content source. As described in greater detail below, in different embodiments, a weight associated with a content source may be determined dependent upon a time rate of change of content request traffic directed to that source in a number of different ways, employing techniques such as normalization, damping, hysteresis, or other types of transformations influenced by the time rate of change of content request traffic. In some embodiments, multiple different weights may be determined that may be associated with different interest contexts, as described below. Additionally, it is noted that IA system 130 may be configured to perform the method of FIG. 4 for the respective content request traffic corresponding to numerous different content sources. For example, IA system 130 may implement multiple processing threads configured to concurrently process traffic data for different content sources, or may process such data sequentially or in a time-multiplexed fashion.

In one embodiment, the first-order time rate of change of content request traffic associated with a content source may be used directly as the weight of the content source. Thus, for example, when traffic to a content source is increasing at a rate of 1 request per second or decreasing at a rate of 0.5 requests per second, its weight may be 1.0 or −0.5, respectively. In variations of such an embodiment, the rate of change may be normalized to fall within a particular range (e.g., between −1 and 1) according to a fixed standard of normalization or relative to rates of traffic change exhibited by other content sources. In some instances, distinguishing positive rates of change may be considered more significant than distinguishing negative rates of change. For example, if a limited number of content sources are selected to be highlighted or displayed in some fashion on the basis of rate-of-change-related weighting, as described in greater detail below, few if any sources with negative rates of change may typically be selected. In some such cases, rates of change that are less than zero may be represented with a weight of zero rather than a negative weight.

As described above with respect to FIG. 3C, in some embodiments, a rate of change of content request traffic may be normalized relative to the request traffic volume from which the rate of change was determined, for example by computing a ratio of the rate of change of request traffic to request traffic volume. The resulting ratio or normalized rate of change may then be used as the interest weight associated with the content source. In circumstances where there is a substantial disparity between content request traffic volume for two different content sources, such as illustrated in FIGS. 3A-B, such a ratio may more effectively highlight the magnitude of a rate of change in content request traffic relative to the volume of traffic. For example, as discussed above, ordinary fluctuation of traffic directed to a high-volume content source may be larger in absolute terms than an unusual spike in traffic directed to a low-volume content source. However, relative to underlying traffic volume, the ordinary traffic fluctuation of the high-volume source may represent only a small fraction of its total volume, whereas the spike in traffic directed to the low-volume source may represent a large multiple of its total volume, signaling a possibly interesting change in the content interest of the low-volume source.

Figure 5:
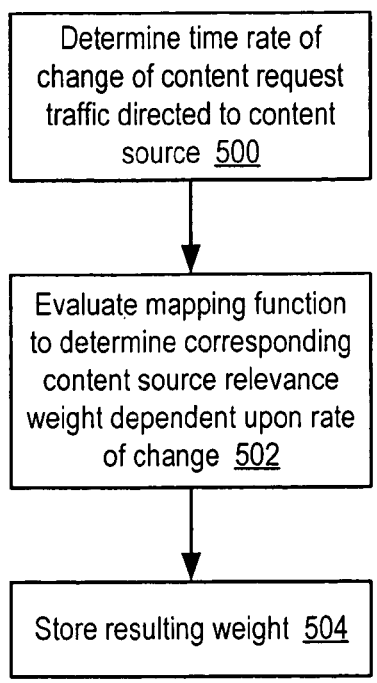
FIG. 5 is a flow diagram illustrating one embodiment of a method of applying a mapping function to map a rate of change of content request traffic to an interest weight of a content source.

The rate of change of content traffic, either in absolute terms or normalized relative to traffic volume, may be mapped to an interest weight using any desired function, such as a linear, polynomial, sigmoidal or other type of function. (A direct mapping of the rate of change or normalized rate of change to the interest weight may be viewed as a mapping using the identity function.) In some embodiments, this mapping may be a stateless mapping that does not take into account a previous value of the rate of change or another variable, such that a change in value of the rate of change yields some corresponding change in the corresponding weight. One embodiment of a general method of such a mapping is illustrated in FIG. 5. Beginning in block 500, a time rate of change of content request traffic directed to a content source is determined, for example as described above. A mapping function may then be evaluated to determine an indication of interest, or weight, corresponding to the content source, dependent upon the rate of change of content request traffic (block 502). For example, the mapping function may be the identity function or a more complex function. The resulting weight may then be stored (block 504). For example, a weight corresponding to a given URL may be stored in a table, record or other data structure associated with that URL.

In stateless embodiments where positive and negative rates of change directly and immediately influence weights of content sources, the resulting weights may reflect changes in request traffic to content sources in near-real time. That is, the weights may nearly simultaneously reflect actual changes in request traffic as they occur, subject to delays in request traffic being reported from hosts 100 to IA system 130 and then processed. Depending on communication latencies across network 120, in some embodiments weights indicative of request traffic rates of change may lag actual request traffic events by times on the order of seconds or fractions of seconds. Thus, weights may be highly responsive to the state of request traffic.

In other embodiments, a content source weight may be determined on the basis of a rate of change of content request traffic in a manner that preserves some degree of state or history associated with the weight. For example, a host 100 may exhibit a one-time change in content request traffic from a lower constant level to a substantially higher constant level over a brief period of time. Before and after the transition between the initial and final levels in this example, the rate of change of content request traffic may be zero, while during the transition it may be a positive, large quantity. In a stateless implementation, a corresponding interest weight might change (e.g., to zero) following completion of the transition, tracking the rate of change. However, the transition in traffic may hold significance for users for some time after the transition has occurred. For example, the transition may be indicative of an interesting change or development in the information available at the content source, such as breaking news, a new product announcement, etc., and this development may continue to be interesting for some time after it commences.

Generally speaking, a rate of change analysis of content request traffic may detect edges or transitions in such traffic that may be indicative of events that impact content interest. It may be desirable to preserve such events with some degree of persistence beyond the transitions themselves, for example in order to communicate or display the events to other interested parties. For example, a transition in content request traffic may signal a change in content interest that is still pertinent to an observer some time after the change occurs.

Correspondingly, in one embodiment traffic analysis engine 150 may be configured to determine an interest weight of a content source using the current state of the weight in addition to a rate of change of content request traffic. For example, in response to detecting a positive rate of change of content request traffic directed to a content source, TA engine 150 may be configured to correspondingly increase a weight of the content source as a function of the rate of change, as described above. However, if the rate of change should become zero or negative, TA engine 150 may be configured to apply a negative gain or decay function such as a linear, polynomial, exponential or other function to the weight, such that the weight decreases over time by the decay function of the current weight rather than the rate of change of content request traffic.

Figure 6:
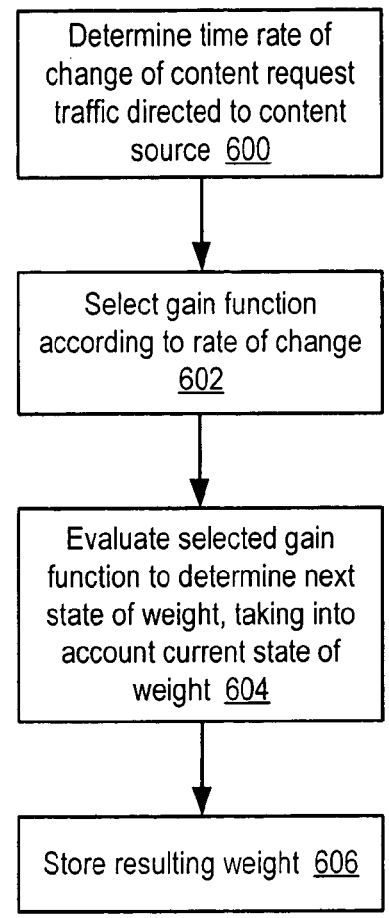
FIG. 6 is a flow diagram illustrating one embodiment of a method of determining an interest weight of a content source using a gain function that takes into account a current state of the interest weight.

One embodiment of a method of determining interest weights for a content source dependent upon a time rate of change of content request traffic data as well as a gain function is illustrated in FIG. 6. Beginning in block 600, a time rate of change of content request traffic directed to a content source is determined, for example as described above. A gain function that takes into account the current state of an interest weight associated with the content source is then selected according to the rate of change (block 602). In some embodiments, TA engine 150 may implement different gain functions according to whether the rate of change is positive, zero, or negative, or whether the rate of change assumes certain specific values. For example, a linear or identity function may be selected if the rate of change is positive, while an exponential or a different linear function may be selected if the rate of change is zero or negative. It is noted that in general, a gain function may operate to either increase or decrease the interest weight to which it is applied, taking into account the current state of the weight.

The selected gain function is then evaluated to determine the next state of the weight (block 604). In some embodiments, the next state of the weight may be selected from either the result of the gain function or the actual value of the content request traffic rate of change. For example, whichever value minimizes the change to the weight may be selected in one embodiment. The resulting weight may then be stored, for example in a table, database, etc. such as described above (block 606).

Figure 3D:
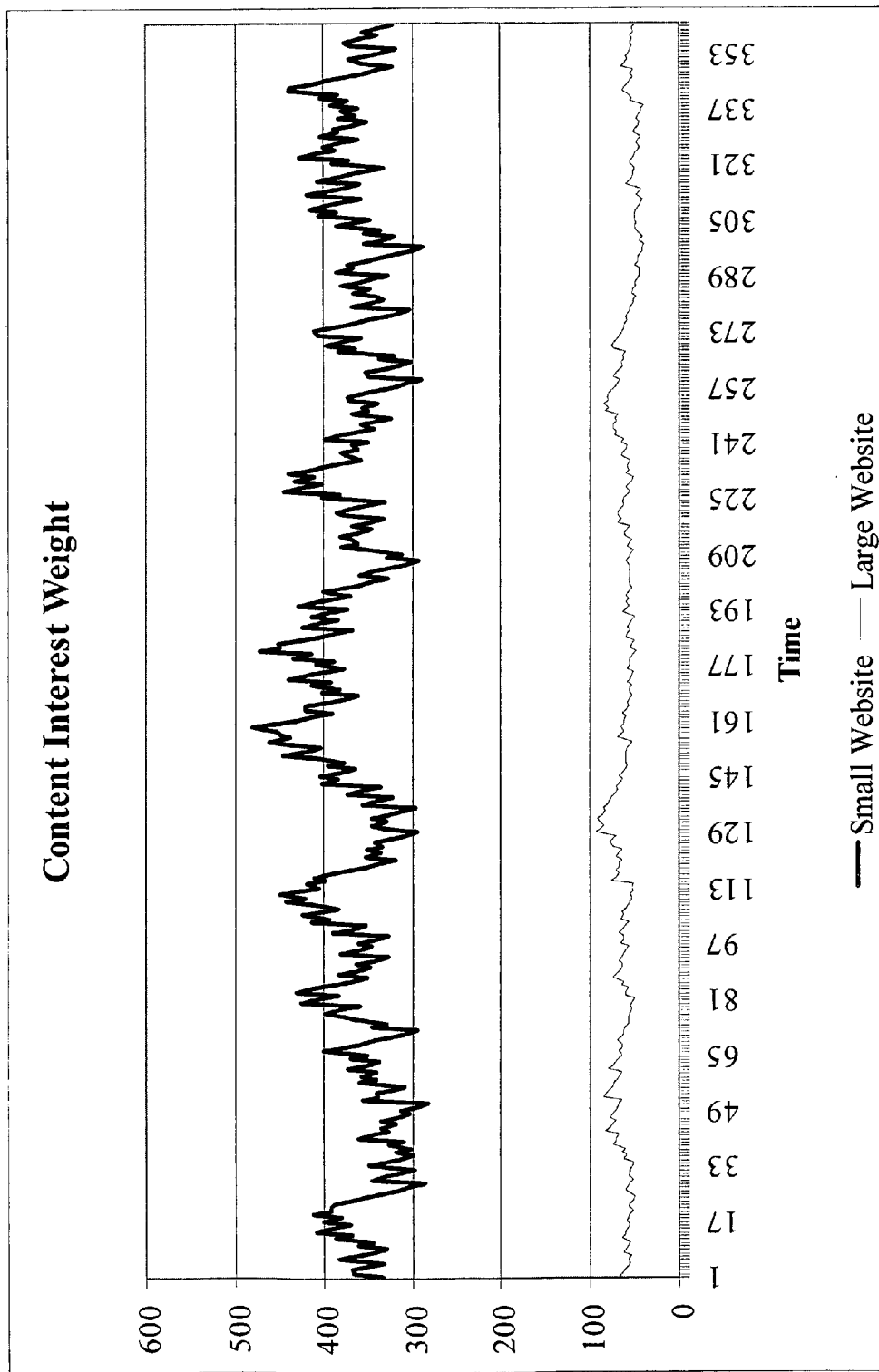

A particular example showing content interest weights derived using a gain function applied to historical content request traffic rate of change data is illustrated in the data plotted in FIG. 3D. In the illustration, the normalized rate of change data shown in FIG. 3C for the high-volume and low-volume content sources has been transformed into content interest weight data through the application of the function:

$$\text{weight}(t) = \max\left(0, 100 \cdot \frac{dR/dt}{R}\right) + 0.95 \cdot \text{weight}(t-1).$$

That is, at any given time t, a corresponding content interest weight for a content source is determined as the normalized rate of change as of time t (which is constrained to be greater than or equal to zero in this case) plus a portion of the content interest weight determined for the immediate prior point in time t−1. In this particular case, the influence of previous weights on the current weight decays according to a ratio, resulting in weights decaying exponentially over time with a decay constant of 0.95. However, as mentioned above, different decay models and parameters may be employed in other embodiments.

It is noted that by applying different gain functions and parameters to rising and falling edges detected in content request traffic (e.g., as indicated by first-order or higher-order rates of change of content request traffic), the responsiveness of an interest weight to different types of fluctuations in request traffic may be selectively tuned to be reactive or "twitchy" in some cases and damped or delayed in others. For example, a weight may be tuned to respond very quickly to increases (e.g., positive edges) in request traffic, but to have a much more gradual decay in response to decreases (e.g., negative edges) in traffic, or vice versa. In particular, it is noted that regardless of how the weight is tuned, it may generally respond to actual fluctuations in content request traffic as they occur, with minimal reporting and processing delays. This behavior stands in contrast to conventional approaches to indexing online content, which generally function independently of actual request traffic (e.g., using web-crawling mechanisms) and thus do not reflect the information implicit in that traffic. That is, conventional indexing approaches may be generally characterized as "pull" models, in which content to be indexed is identified and retrieved, regardless of whether the content is actually interesting as measured by user behavior. As a consequence, conventional approaches may gather and index uninteresting content and overlook potentially interesting content. By contrast, the rate-of-change based content interest model described herein may be generally characterized as a "push" or "demand-driven" model, in which the interest level of a given content source need not be determined if in fact there is no interest in the given source, as indicated by, e.g., an absence of content request traffic data. That is, rather than unconditionally gathering an arbitrary set of data and subsequently determining what part of the gathered data may be interesting, as in the "pull" model, the "push" model may first determine a level of content interest and then perform other functions (such as those described below) for content that is interesting.

Although the interest weight of a content source has been described above as being determined on the basis of a rate of change of content request traffic, optionally also depending on the current weight through a gain function, in some embodiments other factors may also contribute to the interest weight of the content source. For example, a weight determined on the basis of rate of change information as described above may be combined (e.g., in a weighted average) with other measures of interest or relevance such as the volume of request traffic directed to the content source, the number of static links or references to the content source from other sources, or other suitable factors.

Additionally, it is contemplated that other types of time-based analysis of content request traffic data may be performed in some embodiments instead of or in addition to a differential analysis of a rate or rates of change of content request traffic. For example, content request traffic may be integrated over a period of time to determine the basis for normalizing rates of change of content request traffic. Other techniques, such as time-frequency transform techniques (e.g., using an appropriate version of a fast Fourier transform algorithm or discrete Fourier transform algorithm), may also be applied to time-series content request traffic data to transform such time-series data into a frequency domain and thus facilitate extraction of frequency components of the data. Such frequency components may be amplified, filtered or otherwise transformed using frequency-domain techniques. The results may be used to influence the determination of interest weights for the corresponding content source.

Although the foregoing discussion describes embodiments in which interest weights may be determined with respect to individual content sources, it is contemplated that similar techniques may be used to determine interest weights with respect to navigation paths among various content sources. For example, one requestor 110 may generate content access requests directed to a set of content sources A, B and C in that order, while another requestor 110 may generate content access requests to these sources in the order B, A, C. In some embodiments, such navigation paths may be detected through an analysis of the referral and destination information submitted to IA system 130 in a report of a content access request. For example, considering the exemplary AddPheromone web services call discussed above, when the first requestor 110 navigates from content source B to content source C, the AddPheromone call may reflect that the first referrer is content source B and the second referrer is content source A, allowing the path to be reconstructed. In one embodiment, IA system 130 may be configured to detect longer paths by examining reported traffic for instances in which a destination-first referrer combination of one report matches a first referrer-second referrer combination of another report, or vice versa.

In some embodiments, once a navigation path is identified, it may be treated as a locus of interest weight analysis in a manner analogous to that of individual content sources. For example, a navigation path may be treated as a content source in itself, in that request traffic volume along the path as well as rates of change in that traffic volume may be identified. Correspondingly, interest weights may be generated for paths dependent upon determined rates of change of traffic volume along those paths.

Context-Specific Interest Analysis

A rate-of-change-based interest weight of a particular content source, determined as described above, may be generally indicative of the interest of that content source in the context of all content sources for which weights have been obtained. That is, the computed weight may be considered a global indication of interest or a global weight. However, in some embodiments it may be useful to determine more than one weight for a given content source, where the different weights are normalized relative to different contexts. For example, a global weight of a given URL that reflects all request traffic to that URL may be useful in ranking the interest of the given URL in the broad context of all known URLs. However, the interest of the given URL may also be considered within a narrower context, such as those URLs falling within the same top-level domain (e.g., www.domainname.com) or those URLs belonging to some community of interest as described below.

In some instances, a content source that has one weight reflecting interest within a global context may have a considerably different weight reflecting interest within a local context. For example, rate of change data for a given URL may not be particularly noteworthy on a global scale, but might be maximal relative to other URLs within the same domain or other local context. Thus, in some embodiments, TA engine 150 may be configured to determine both a global weight and one or more local weights for a given content source.

Figure 7:
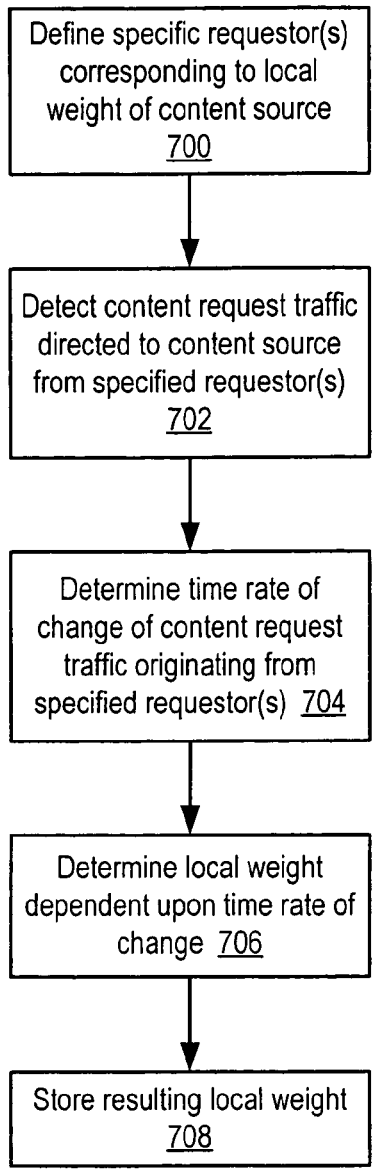
FIG. 7 is a flow diagram illustrating one embodiment of a method of determining a local weight of a content source relative to traffic from one or more content requestors.

Local weights may be determined in different ways according to different embodiments. In the method embodiment illustrated in FIG. 7, a local weight of a content source may be determined relative to a specific requestor or a set of requestors 110. That is, the local weight may reflect a rate of change of content request traffic originating from one or several particular requestors 110, rather than considering traffic from all requestors 110 in the aggregate. In block 700, a specific requestor or set of requestors corresponding to the local weight of the content source is defined. For example, a particular originating URL or domain may be specified. Subsequently, content request traffic directed to the content source from the specified requestor(s) is detected (block 702), for example by TA engine 150 via traffic reporting received via WS interface 140, as described above.

A time rate of change of content request traffic originating from the specified requestor(s) is then determined (block 704) and a local weight may be determined based on the rate of change of content request traffic (block 706). Both rate of change and weight determination may be performed by TA engine 150 in a fashion similar to that of global weights, described above. For example, local weights may track the rate of change in content request traffic in a stateless fashion, or one or more gain functions may be used to shape the response of the local weight to changes in the request traffic behavior. In particular, it is noted that different gain functions may be applied to local weights versus global weights. For example, a global weight of a content source may decay at a different rate than a local weight of that source. Subsequently, the local weight may be stored (block 708), for example as part of a record or table along with a global weight for the content source.

As just described, a local weight of a content source may be determined on the basis of a subset of content request traffic data restricted to specified requestors. In an alternative embodiment, a local weight may also be determined by normalizing global weight information relative to a specified subset of content sources. For example, the global weight of a given content source may be only a fraction of the maximum global weight when all content sources are considered in the aggregate. However, within a particular subset of content sources, such as local context or community of interest comprising a selected number of content sources, the given content source's global weight might be maximal. For example, a global weight of a particular blog may fall well below the median or average global weight of all content sources for which global weights have been determined (e.g., including news sources, retail web sites, etc.). However, considered within a subset of all content sources that includes all blogs, or perhaps all blogs on a particular theme (e.g., politics, parenting, technology, law, etc.) the global weight of the particular blog may rank within the top few content sources of the subset. Deliberately normalizing weights within a specified context may simplify the comparison or ranking of content sources within that context.

Figure 8:
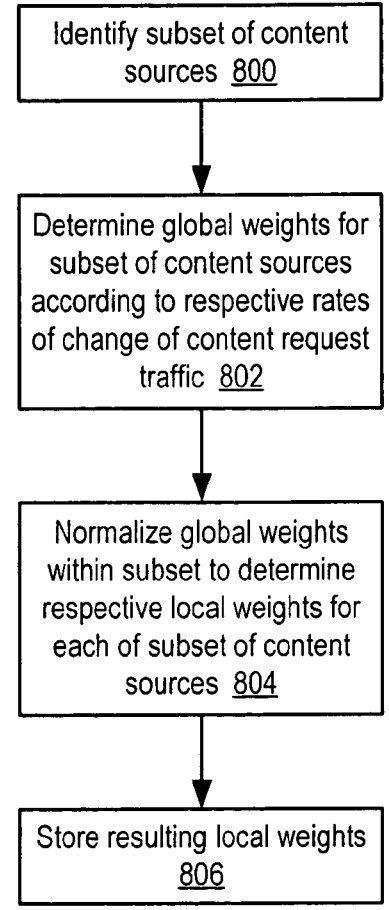
FIG. 8 is a flow diagram illustrating one embodiment of a method of determining a local weight of a content source through normalization relative to a set of content sources.

One embodiment of a method of determining local weights by normalizing global weights relative to a subset of content sources is illustrated in FIG. 8. Beginning in block 800, the subset of content sources is identified. For example, the subset may be defined to TA engine 150 to include all or a portion of the URLs included within a single domain, or a number of URLs across different domains that fall within a community of interest. Subsequently, global weights are determined for each content source according to respective rates of change of content request traffic data (block 802). For example, content request traffic reports may be collected and analyzed to determine global weight information using any of the techniques or methods described above.

Global weight information is then normalized within the specified subset of content sources to determine respective local weights for each source (block 804). For example, the global weights of the subset of content sources may be normalized relative to the maximum global weight or weights within the subset. While such normalization may be linear, in some embodiments the relationships among the resulting local weights may be nonlinear with respect to the original global weights. Subsequently, the resulting local weights may be stored (block 806), as described above.

Different considerations may serve to interrelate different content sources within a particular local context or community of interest for which local weights may be defined. As mentioned above, in one embodiment a local context may correspond to a particular domain, and some or all URLs residing within that domain may be members of the local context with corresponding local weights. In other embodiments, a local context may be defined more generally in terms of content source topography. For example, two URLs may reside within the same local context if they are related by a link or explicit reference from one to the other. More loosely, two URLs may reside within the same local context if their domains are related at any level by a link from one to the other. A local context may be defined more broadly by extending membership to content sources that are related by intermediate links or references, as opposed to direct links.

In other embodiments, membership by content sources in a local context may be determined on the basis of content relationships among the content sources, as opposed to topological relationships. For example, the information content of a given textual content source may be characterized in some embodiments by performing a statistical analysis of words or phrases included within the source and to identify so-called statistically improbable phrases that may be indicative of salient information content. For example, a phrase that occurs frequently in one content source in comparison to others may be indicative of some significant or unique aspect of that content source, as opposed to a generic phrase that may be common to many sources. That is, it may be statistically likely to find common phrases in many content sources, but statistically improbable to find phrases unique to a particular source in many content sources. In one embodiment, two different content sources may be determined to be members of the same local context if their content overlaps to a specified degree, even if they do not explicitly reference or link to one another. For example, two content sources that have a specified absolute number or fraction of statistically improbable phrases in common may have related content, and may consequently be identified as members of a common local context or community of interest.

Other suitable techniques or algorithms may be employed to determine content relationships among content sources, including other types of content such as image data, audio data, metadata or embedded tags, etc., and to identify related content sources as members of a community of interest. For example, metadata tags descriptive of the type and content of different content sources may be compared to determine whether the sources are of similar types (e.g., text, images, etc.) and have similar content, where a measure of similarity between two sources may be proportional to the number of tags those sources have in common, for example. In other embodiments, hashing or other reductive techniques may be used to generate content-dependent signatures of content sources. Depending on the properties of the algorithm used to create the signature, signatures of different content sources may be compared to determine a qualitative or quantitative indication of similarity among the sources.

Additionally, in some embodiments the extent of a local context with respect to content sources may be defined manually. In one embodiment, a user may be provided with a graphical user interface configured to display a topology of interests. For example, the topology may reflect different interests by keywords or phrases and may illustrate relationships among such interests such as hierarchical or set membership relationships, degrees of similarity, etc. Alternatively, the topology may reflect different content sources, illustrating similar relationships. The user may then interact with the interface to specify the categories of interest or the particular content sources to be treated as a local context with respect to content interest weight determination. For example, a user may select individual entities within the topology or may specify groups based on particular relationships (e.g., all entities hierarchically beneath a given entity, all entities removed from a given entity by degree N, etc.). Content sources related to the user's selections may then be associated with a local context for content weight determination as described above. Regardless of the technique used to define a community of interest among content sources (e.g., topological or content-based techniques), a hypothetical content seeker having interest in one content source generally may have a better than random chance of having interest in another content source within the same community of interest.

It is contemplated that in some embodiments, an arbitrary number of local weights may be determined for a given content source using combinations of the techniques described above. For example, a given content source may be a member of multiple different local contexts, with a respective local weight associated with each one.

Content Interest Data Usage and Display

Using the various techniques described above, interest analysis system 130 may operate to generate a wealth of interest information (e.g., interest weights and related data) for various content sources based on content request traffic directed to those sources from requestors 110 and reported by hosts 100. Interest weight information corresponding to content sources may be used in a number of different ways. For example, in some embodiments a conventional search engine may be configured to use a global or local interest weight of a content source to rank the position of that content source in a listing of search results, either instead of or in addition to other methods of ranking search results (e.g., according to the number of static links or references to a given content source, as determined by an indexing process). Specifically, in one embodiment a search operation may be performed over a number of content sources for which corresponding content interest weights have been determined, e.g., by evaluating a set of keywords or a formal query against the content sources. Such a search operation may be performed by a search engine application that is integrated into IA system 130 or separate from it. Those content sources that satisfy the search criteria specified by the search operation may then be ranked according to their respective content interest weights, for example in ascending or descending order according to the values of the weights. However, as described above, in some embodiments interest weight information may be indicative of near-real-time content request traffic activity and may be frequently updated to reflect changes in such activity. Correspondingly, in some embodiments the use or display of interest weights may be configured to take advantage of their near-real-time properties.

Generally speaking, content interest data may be retrieved from IA system 130 by an application for any suitable purpose. For example, an application may seek to retrieve raw content traffic reports submitted to IA system 130 in order to perform its own analysis. Other applications may request content interest data derived by IA system 130, such as content interest weights or information on navigation paths or aggregate paths, as described below. For example, as discussed below in conjunction with the descriptions of FIGS. 10 and 11, content interest information may be displayed to a user via a web page, browser plugin or badge.

Generated content source interest data may be retrieved from IA system 130 according to any suitable technique. For example, in embodiments where IA system 130 is configured to store records, tables or other data structures including interest data, various applications may query IA system 130 via WS interface 140 to retrieve interest data for a particular content source or a number of sources. Such data may include, for example and without limitation, the URLs or other identifiers of the content sources having the highest ranking by global interest weights, the highest ranking requestors 110 submitting requests to the host 100, the highest ranking content sources as destinations for navigation away from host 100, or the highest ranking content sources, ranked by local weights, within any local context or community of interest that may be defined as described above. Lowest-ranking or intermediate ranking content sources in any of these categories may also be the subjects of interest data queries. In various embodiments, the number of content sources for which interest data is returned in response to a request may be fixed or user-selectable. In one embodiment, WS interface 140 may support a limited number of predefined types of interest data queries, while in another embodiment a general-purpose query interface may be provided for processing any desired, well-formed query of interest data.

While in some embodiments, retrieval of interest data may be performed by applications or processes that are independent of requestors 110 and hosts 100, in other embodiments such retrieval may occur by a host 100 as part of the process of reporting content request traffic data. In some cases, retrieving current content source interest data in response to submitting a report of content request traffic data may enable a host 100 to refresh a set of locally pertinent interest data without issuing a separate web services call. For example, in one embodiment a host 100 may be configured to submit a report of a content access request by invoking a web services call, such as the AddPheromone call described above. Depending on the configuration of the web services call (e.g., the argument provided to the ResponseType parameter of the AddPheromone call shown above), when a host 100 submits a report of a content request, WS interface 140 may be configured to return different types of content source interest data.

Figure 9:
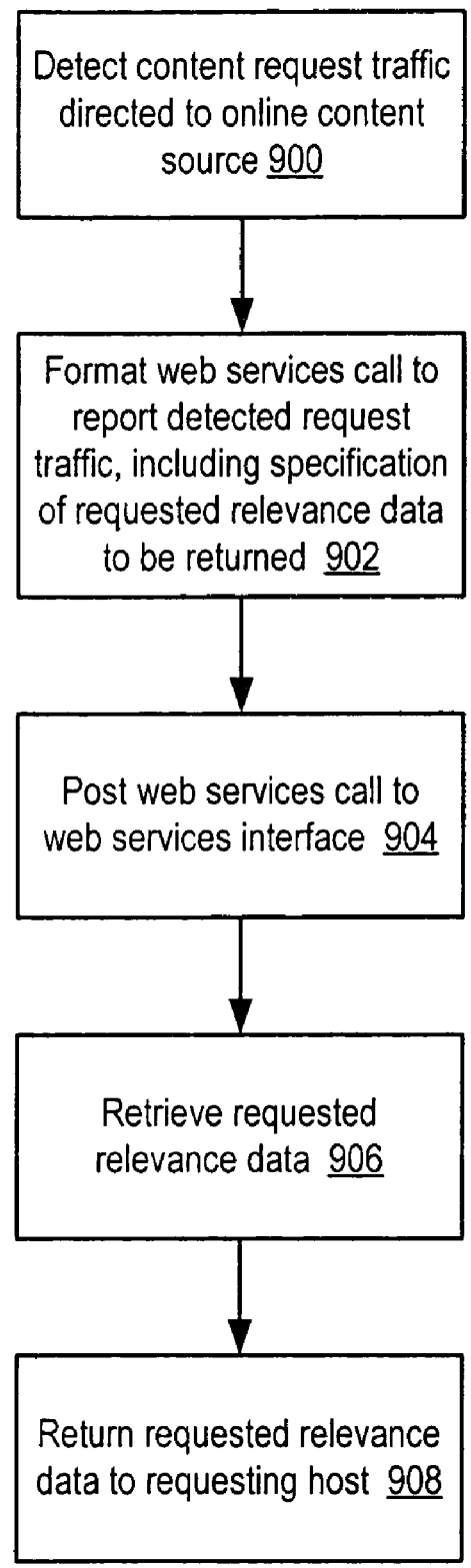
FIG. 9 is a flow diagram illustrating one embodiment of a method of using a single web services call to report content request traffic and retrieve content source interest data.

One embodiment of a general method of using a single web services call to report content request traffic and retrieve content source interest data is illustrated in FIG. 9. Operation begins in block 900 where content request traffic is detected. For example, a host 100 may detect an HTTP GET or other type of content request from a requestor 110. Subsequently, a web services call to report the content request traffic is formatted (block 902). For example, in a REST-style web services architecture, parameters needed to report the traffic may be specified in the form of parameters of an HTTP request to WS interface 140 may be specified, whereas in a document-based web services architecture, a text, document including the parameters may be assembled. In this step, the desired content source interest data to be retrieved may be specified. For example, one of a number of arguments to a parameter (e.g., the ResponseType parameter shown above) may be specified in order to identify a particular predefined set of interest data to be returned (e.g., a fixed number of top-ranked content sources according to global weights). In other embodiments, a free-form query for selecting the desired set of interest data may be specified.

The web services call may then be posted to WS interface 140 (block 904) and recorded and analyzed by TA engine 150 as described above. In response, IA system 130 may be configured to retrieve the requested interest data (block 906), performing any necessary query processing or other data selection or filtering specified by the web services call. For example, IA system 130 may select records of content source interest data according to global weights or local weights for a particular local context. Subsequently, the requested interest data may be returned as a result of the web services call (block 908). For example, a formatted document or stream of text containing the requested interest data may be returned to host 100.

Figure 10:
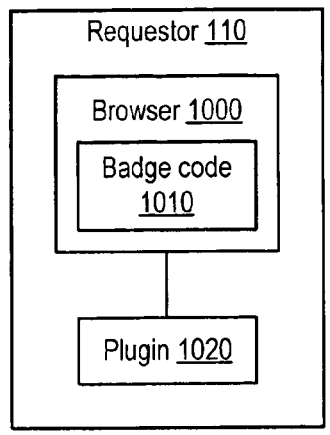
FIG. 10 is a block diagram illustrating one embodiment of a requestor configured to display content source interest data.

Regardless of whether interest data is returned to a host 100 in response to a content request reporting web services call, or returned to a requesting third-party application that is wholly independent of hosts 100 and/or requestors 110, the interest data may be used or displayed in a number of fashions. In one embodiment, as illustrated in FIG. 10, a requestor 110 may be configured to display retrieved interest data to users via a web browser or client. In the illustrated embodiment, requestor 110 is shown to include a web browser 1000 as well as a plugin 1020 configured to interact with browser 1000. Generally speaking, browser 1000 and plugin 1020 may be respective code modules or collections of code modules executable by requestor 110 to provide various functions. In one embodiment, browser 1000 may be any suitable type of browser software capable of retrieving and displaying online content, such as web pages or other content retrieve form a host 100 via a web-based protocol. For example, as mentioned above, browser 1000 may correspond to an instance of Internet Explorer or another specific type of browser.

Plugin 1020 may be a software module that is configured to integrate with and augment the functionality of browser 1000. For example, plugin 1020 may interface with an application programming interface (API) provided by browser 1000 such that plugin 1020 operates as an extension of browser 1000. In some embodiments, plugin 1020 may be selectively downloaded and installed within browser 1000 by a user in order to obtain functionality that may not be natively supported by browser 1000. For example, plugin 1020 may be downloaded by a user from a host 100, from IA system 130, or from another source. As described in greater detail below, in some embodiments plugin 1020 may be executable to display a toolbar or other type of user interface within a display environment managed by browser 1000.

In the illustrated embodiment, browser 1000 additionally includes badge code 1010. As described in greater detail below, badge code 1010 may be executable to display aspects of content interest data within a display environment managed by browser 1000, and/or to perform other functions. In various embodiments, badge code 1010 may be implemented as a JavaScript module, as another type of executable code or script-based module, or as a static image (e.g., represented in Hypertext Markup Language (HTML) or another type of markup language).

Figure 11:
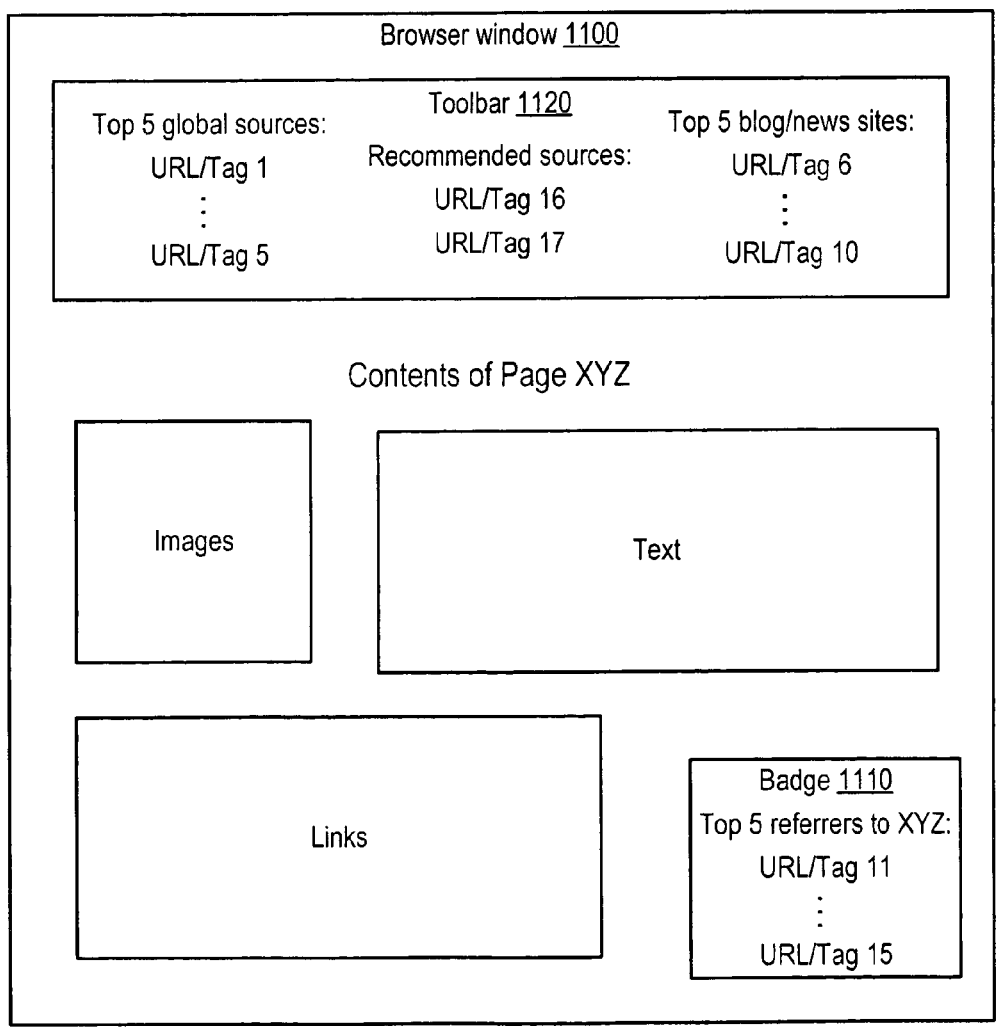
FIG. 11 is a block diagram illustrating several embodiments of browser display objects configured to display content source interest data.

As mentioned above, browser 1000 may be generally executable or operable to generate a display or interface with which a user may interact to request, view and perform other operations with respect to online content. Likewise, badge code 1010 and plugin 1020 may be executable to generate specific displays or interfaces of their own, or to implement other functions not directly associated with the display of content interest data. One example of a collection of displays that may be presented to a user through the collective operation of browser 1000, badge code 1010 and plugin 1020 is illustrated in FIG. 11. In the illustrated embodiment, a browser window 1100 that may be generated and managed by browser 1000 is shown displaying a variety of content that may include text, images, links to other content sources, or any other suitable content arranged in any fashion within window 1100. Additionally, a content interest data display or "badge" 1110 is illustrated within the display area of window 1100. Badge 1110 may be generated through the operation of badge code 1010. Similarly, window 1100 includes a toolbar 1120, which may be generated through the operation of plugin 1020. In the following discussion, a general correspondence between the executable components shown in FIG. 10 and respective display elements shown in FIG. 11 is assumed. However, as noted below, in some embodiments plugin 1020 may partially or completely subsume the functionality of badge code 1010 or vice versa, and in some embodiments the functionality of either or both of plugin 1020 or badge code 1010 may be implemented separately from and without dependence on browser 1000.

Generally speaking, individual instances of badge code 1010 may be associated with respective hosts 100, or content served by hosts 100, and may be displayed in some fashion whenever a user accesses a host 100 for which badge code 1010 has been implemented. Badge code 1010 may be integrated within the code or content of a particular web page served by a host 100 or implemented such that it is downloaded, activated and displayed whenever a user requests any content served by a host 100. In some embodiments, it is contemplated that badge code 1010 may be configured to implement the functions of traffic reporting logic 160 described above, while in other embodiments traffic reporting logic 160 may be implemented as a module distinct from badge code 1010.

Additionally, in some embodiments badge code 1010 may be configured to implement functions for locating or recruiting new sources of content for potential instrumentation with traffic reporting logic 160 and inclusion in content request traffic data collection. In one embodiment, badge code 1010 may be configured to provide a user-selectable interface option, such as a menu item, a clickable link or banner, or another suitable interface through which a user may obtain, install and configure those components (e.g., traffic reporting logic 160 and/or badge code 1010) needed to begin participating in content request traffic reporting. For example, badge 1010 code may be configured to present, e.g., via badge 1110, a selectable banner or menu item displaying a message to the effect of, "click here to install me on your site!" Upon selecting this item, a user may be directed to a site offering instructions and downloadable software that may be used to instrument a host 100.

In another embodiment, badge code 1010 may be configured to examine content request traffic arriving at and departing from its respective host 100 in order to identify a host or domain associated with such traffic. In response to detecting arriving or departing traffic, badge code 1010 may be configured to notify an administrator of the source or destination of such traffic to solicit participation in content request traffic reporting. For example, badge code 1010 may extract a domain name (e.g., domainname.com) from a content access request and may then send an email notification to "webmaster@domainname.com", "admin@domainname.com", or any other typical or well-known administrative address that may be included in a default list of such addresses, where the notification may include instructions regarding how to participate in content request traffic reporting and/or links directing the recipient to a content source including such information. In other embodiments, badge code 1010 may identify candidate content sources for recruitment using other techniques. For example, badge code 1010 may create lists of potential content sources derived from content request traffic directed to its respective host 100. Subsequently, badge code 1010 or other software may be configured to examine or mine prospective content sources to determine administrative contact information (e.g., a preferred contact listed on a web page), the type of content available from the content source, whether the content source is already instrumented with an instance of badge code 1010 and/or traffic reporting logic 160, or other relevant information regarding the prospective source.

In the illustrated embodiment, badge code 1010 is configured to display, via badge 1110, interest weight information and related data associated with its respective host 100 that may be retrieved from IA system 130 as described above. In one embodiment, badge code 1010 may be executable to simply display an ordered list of content sources ranked according to the request that yielded the interest weight information. For example, if the interest data for the most popular global content sources or local content sources within some local context was requested, badge code 1010 may be executable to display all or a given number of those sources ranked from highest to lowest. In badge 1110, a given content source may be identified by a display of its URL, an icon, or a tag, alias or other source name that may be assigned by the content source or specified by the user viewing the display. In some embodiments, badge code 1010 may be executable to provide a user interface that allows a user to customize aspects of the display, for example by specifying the type of query used to retrieve the interest data to display, the amount of data to display (such as the number of content sources), the frequency with which the display data is updated, or other display characteristics such as fonts, colors, styles, etc.

In one embodiment, badge code 1010 may be executable to retrieve and display content interest weight information that is relevant to content request traffic associated with a respective host 100, without taking into account user-specific information, such as navigation history or content preferences of a user interacting with browser window 1100 on a requestor 110. For example, badge code 1010 associated with a given host 100 may be executable to indicate the top content sources among all hosts 100 according to global weight, the top content sources hosted by given host 100 in particular (e.g., specific URLs hosted by given host 100), the top referrers to given host 100, or the top content sources navigated to from given host 100. In some embodiments, it may be desirable to keep the functionality of badge code 1010 relatively lightweight and host-specific. For example, the functionality of badge code 1010 may be confined to a limited feature set of display and analysis options centered on content interest data that is pertinent to a given associated host 100. In some such embodiments, limiting the features and scope of analysis in this way may reduce the code size of badge code 1010 (and consequently, the time required to load content from given host 100) as well as dependence on client-specific aspects of the browser 1000. For example, minimizing the complexity and user interface requirements of badge code 1010 may facilitate the display of badge 1110 within the display environments generated by different types and versions of browsers 1000 and underlying platforms.

In contrast to one embodiment of badge code 1010, plugin 1020 may be configured to perform user-specific personalization of content interest information. In one embodiment, plugin 1020 may be configured as a software module that may be obtained by a user and persistently integrated within browser 1000 or as a standalone software module. As described above and shown in FIG. 11, plugin 1020 may be executable to generate a toolbar 1120 that may be displayed within browser window 1100, for example in a reserved portion of the display area within a browser window or via a browser tab. Alternatively, toolbar 1120 may be displayed separately from window 1100 as a detachable or standalone window. Plugin 1020 may be invoked as an extension to browser 1000. Alternatively, the functionality of plugin 1020 may be implemented as a separate, standalone application that may execute independently of browser 1000 and may generate any suitable type of user interface, including interfaces other than toolbars. In one embodiment, once installed, plugin 1020 may remain active throughout a user's session with a browser 1000. By contrast, in one embodiment, badge code 1010 may remain active only so long as a user is viewing content associated with its respective host 100 via browser window 1100, and may be deactivated if the user navigates away from that host.

Plugin 1020 may be configured to perform a variety of functions related to content interest data on behalf of a user. In one embodiment, plugin 1020 may provide an interface through which a user may specify arbitrarily complex queries of content interest data generated by IA system 130. Such queries may allow a user to track the relative interest of content sources ranked within global or local contexts. As a non-limiting example, plugin 1020 may allow a user to receive visual or textual feedback, e.g., via toolbar 1120, that is indicative of the top five globally-ranked content sources as well as the top five news media stories (e.g., stories from any media site) and the top five sources having any relation to a specified topic, e.g., patent law. As described above, a user may also track relative interest of paths among sources, ranked within either global or local contexts. Plugin 1020 may be executable to provide an interface that enables a user to specify how a given local context is defined, for example by entering various types of metadata or keywords indicative of the local context.

As noted above, interest data may be collected and updated by IA system 130 in near-real time as changes in content request traffic occur among various hosts 100. For example, plugin 1020 may cause the data displayed via toolbar 1120 to be refreshed at regular intervals, e.g., at intervals of five or ten seconds, or upon the request of a user. In some embodiments, plugin 1020 may be configured to highlight the evolution of interest data over time. For example, rather than simply display an ordered list of content sources according to interest data, plugin 1020 may be configured to cause the content sources to be displayed in display formats that are directly influenced by interest data. In one embodiment, the size or color of the text or icon used to display a particular content source within toolbar 1120 may vary as its corresponding interest data changes. For example, if the global weight of a displayed content source increases or decreases over time, the size of the font used to display the name of the content source may correspondingly increase or decrease. In some embodiments, different display characteristics may be used to simultaneously display different aspects of interest data for a given content source. For example, font size may correlate to changes in global interest weights, while font color may correlate to changes in local interest weights. Other uses of display characteristics to convey evolving content source interest data are possible and contemplated. Further detail regarding such uses may be found in co-pending U.S. patent application Ser. No. 11/186,357, filed Jul. 21, 2005 and entitled "Displaying Links at Varying Levels of Prominence to Reveal Emergent Paths Based on User Interaction."

One example of a type of content interest data display and its evolution over time is illustrated in FIGS. 12A-D. Such a display may variously be generated by plugin 1020 or badge code 1010 and displayed via toolbar 1120 or badge 1110, respectively. In other embodiments, such a display may be generated and displayed by other components. For example, content interest data may be dynamically displayed by a host 100 as a web page directly accessible by a user via browser 1000, without need of badge code 1010 or plugin 1020.

In one embodiment, the components and techniques described hereinabove may be implemented within a large enterprise that creates and manages a substantial degree of online content in to track content interest weight information, for example as part of an enterprise resource management or knowledge management process. FIGS. 12A-C illustrate the top destinations within the enterprise, ranked according to interest weights determined as described above, at three points in time separated by several minutes. For example, the top-ranked content source varies over this relatively short period of time between several phone directory entries and the "Wiki:Wiki Home" content source (which may correspond to, e.g., an online repository of documentation that may be collaboratively maintained by users.) As shown, the display may include an indication of the interest weight of a particular content source as well as a link or URL associated with the content source. In some embodiments, each link may be an active link, such that a user selecting the link may thereby navigate to the indicated content source. In the illustrated embodiment, two weights are illustrated for each URL. The first weight indicates a total weight, which may be determined as a function of a most recently calculated rate of change of content access request traffic as well as earlier calculated rates of change (e.g., using a decay model as described above with respect to FIG. 3D). The second weight indicates a weight during a most recent interval of time, such as may be determined from a most recently calculated rate of change without accounting for earlier calculated rates of change. In the illustrated embodiment, URLs are ranked according to the total weight. In other embodiments, however, content interest weights may be determined according to different functions of rates of change of content request traffic, and more or fewer weights may be displayed. Further, URLs may be ranked differently (e.g., according to most recent weight instead of total weight).

Additionally, in the illustrated embodiment, each indicated content source includes a "drilldown" link that a user may select to obtain more information regarding the content request traffic associated with a particular content source. One embodiment of a display of such traffic data is illustrated in FIG. 12D. In the illustrated embodiment, content request traffic information is shown for the content source "Wiki: Wiki Home" that appears as the top-ranked destination in the display of FIG. 12C. The drilldown display shows content source and corresponding interest weight information for those content sources that are destinations from the "Wiki: Wiki Home" content source and those content sources that are referrers to the "Wiki:Wiki Home" content source. As shown, users may arrive at this content source from a number of different referral paths, and may proceed to a number of distinct destinations from this content source.

In addition to or instead of generating a graphical or textual display that responds to events relating to content interest data, plugin 1020 may also be configured to support various other types of user notification in response to such events. For example, a user may specify one or more notification criteria, such as a threshold weight of a content source with respect to a global or local context, or some other criteria. If a content source satisfies the notification criteria, plugin 1020 may be configured to notify a user by displaying an alert on a display device (e.g., displaying a dialog box or other type of interface on a computer monitor or other graphical interface that displays browser window 1100), or sending an electronic mail (email) or an instant message (IM) to an email or IM address specified by the user. In other embodiments, plugin 1020 may be configured to place a telephone call or send a text message or numeric page to a device specified by the user. Plugin 1020 may also be configured to generate notifications using a publish-subscribe or syndication protocol such as a version of the RSS (Really Simple Syndication or Rich Site Summary) and to convey such notifications to a browser, news aggregator or other RSS application, which may generally include any application capable of receiving such RSS notifications and acting in response to them, e.g., to display content or convey its own notifications to users.

Plugin 1020 may support other types of user personalization or customization with respect to content interest data. In one embodiment, plugin 1020 may be configured to provide notifications or recommendations of potentially interesting content on the basis of a user's expressed interests, the user's navigation history among content sources, or extrapolation of interest from content sources themselves. For example, a user may provide a list of keywords (e.g., by manually entering keywords, by selecting keywords from a predefined list, etc.) indicative of content types or topics in which the user is particularly interested. Plugin 1020 may use such keywords as a basis for creating local contexts or otherwise filtering content interest data in ways that are likely to detect content of specific interest to the user. Plugin 1020 may also be configured to analyze a navigation path among content sources traversed by a user and, as described above, to identify other possibly interesting content sources that may fall in or along such a path, according to collected content request traffic data. Additionally, plugin 1020 may be configured to extract content-identifying information, such as keywords, content metadata, statistically improbable phrases, or other such information from a content source a user has previously requested (e.g., a web page currently or previously viewed by the user). Plugin 1020 may use such extracted information, or any other information gathered from user navigation or otherwise collected from a user, in conjunction with content interest data to identify and suggest content sources of potential interest to a user. Plugin 1020 may be further configured to display notifications or recommendations regarding potentially interesting content via toolbar 1120 or via any of the notification techniques described above.

As noted above, in some embodiments content interest data may be available for use or display by badge code 1010, plugin 1020 or other software or hardware with minimal delay following content request traffic events that may influence content interest data. That is, content interest data may be available for processing in near-real time relative to the actual occurrence of content request traffic. However, in some embodiments, historical content interest data may also be processed and/or displayed. For example, a user may not be able to view near-real time content interest data for a period of time (e.g., hours or days) owing to other activities. When the user is once again available to view content interest data, he or she may be interested in learning not only what content is currently of possible interest, but what changes in content interest may have transpired during the previous period of time.

In one embodiment, plugin 1020 may include an interface that allows a user to access historical content interest data in various ways. For example, a user may interact with plugin 1020, e.g., via toolbar 1120, to query historical content interest data (e.g., as stored by IA system 130) for any content sources that would have satisfied interest notification criteria over a period of time. In other words, a user may effective apply a set of current notification criteria, intended to notify the user in near-real time as described above should a content source satisfy the criteria, against historical content interest data. In applying such criteria against historical data, plugin 1020 may generate a highlighted display of interesting content for which notification would have occurred, had the user been available to receive it. In another embodiment, rather than retrieve and retroactively analyze historical content interest data from IA system 130, plugin 1020 may be configured to store a history of content interest data, notifications, etc. as they occur over a period of time. For example, in addition to or instead of conveying a notification to a user, plugin 1020 may store a notification (and possibly other data, such as timestamp information) for later review by the user. Plugin 1020 may implement various interface options through which a user may interact with historical content interest data. For example, via toolbar 1120, plugin 1020 may enable a user to scroll the contents of a graphical display (e.g., a plot of a content interest weight) backwards and forwards through historical time to illustrate changes in the data over time. Plugin 1020 may alternatively store a list of content sources (e.g., URLs) identified as interesting, which may be displayed in historical order, in ranked order according to relative level of interest, alphabetically, etc.

It is also contemplated that historical analysis of content interest data may be employed over longer timeframes. In one embodiment, plugin 1020 or other software or hardware may be configured to analyze content interest data over arbitrary periods of days, weeks, months, etc. in order to detect patterns or trends in the data. For example, content interest data may be mined for correlations between changes in interest of a given content source and other factors, such as the type of content of the content source, access behavior of similar or competing content sources, or other emergent trends.

Although embodiments of plugin 1020 and badge code 1010 have been described as having distinct functionality, it is contemplated that in some embodiments badge code 1010 may be configured to implement some or all of the features of plugin 1020, or vice versa. It is further contemplated that functionality for processing and display of content interest data may be implemented using a different partitioning or architecture. For example, various display and notification functions may be divided among different components rather than implemented as a single plugin or badge. In one embodiment, processing and display functionality for content interest data may be built into a website for direct viewing and interaction via browser 1000 without need of plugin 1020 or badge code 1010.

Some applications may process content interest data independently of browser 1000. For example, some of the data mining or other post-processing activities mentioned above may be implemented by one or more standalone applications configured to directly retrieve content interest data from IA system 130 using appropriate web services calls, database queries, or other interface approaches. In one embodiment a search engine may be configured to employ content interest data to rank search results, analogous to the manner in which conventional indications of relevance may be used. For example, a content source having a higher global or local weight may be ranked higher within a set of search results than another content source having a lower global or local weight. As mentioned above, it is contemplated that in some embodiments, content interest data may be used in conjunction with other data, e.g., relevance data, to perform such a ranking.

In one embodiment, an application may be configured to place advertisements within online content dependent upon content interest data. For example, conventional placement of an advertisement within online content may depend upon whether the content matches a keyword profile associated with the advertisement. However, like a conventional measure of relevance described above, such a conventional placement does not take into account rates of change of content request traffic associated with the content in which the advertisement is placed. By contrast, in a system configured to determine content interest weights as described hereinabove, more sophisticated advertising placement may be possible. For example, rather than being statically bound to a given content source, an advertisement may be selectively associated with different content sources as their relative interest changes, such that the advertisement is persistently associated with a content source having at least a threshold level of interest. Additionally, the cost charged for advertising placement may be associated with the desired interest level of the content sources targeted for placement. For example, the highest rates may be charged for placement on content sources having the highest interest weights, either globally or in a local context.

In embodiments where content interest data is computed for navigation paths among content sources (instead of or in addition to traffic directed to a single content source), advertising placement may also be performed dependent upon the interest level of a path navigated by a user. For example, as described above, user navigation among sources may be used to suggest or recommend other content sources of potential interest to the user. Similarly, such navigation path information may be used to determine advertisements that may be particularly compatible with a user's interests. In some embodiments, it is contemplated that content interest data may be used in conjunction with keywords or other content data or metadata to perform advertising placement.

Content Topologies and Optimal Content Navigation Paths

As described in detail above, in some embodiments request traffic activity directed to a given online content source may be used as the basis for deriving metrics indicative of the relative interest of the given online content source to users, as reflected by actual user activity. Frequently, a given content source may exist within a network of relationships defined by user-navigable references or links to other online content sources. For example, a content source may encompass a web page that includes links (e.g., encoded as HTML links or other navigable link types) to other web pages, or to images, audio content, executable files, application data files or any other suitable type of content source. When a given link is selected or otherwise activated by a user (e.g., through the user clicking on or hovering over the link), the user may be presented with the requested content associated with the referenced link. For example, a new web page may appear in a user's existing browser or within a new browser window, a download may commence, a suitable application for processing data referenced by the link may be activated (e.g., a reader application for a particular data format, such as the Portable Document Format (PDF)), or any other suitable activity related to the presentation of requested content.

It is noted that references among content sources need not be limited to links among web pages. In some embodiments, a user may generate a reference between two content sources by virtue of some action or activity within the context of one content source that targets the other content source. For example, a user may interact with a web page content source to select portions of the page's content (e.g., phrases or keywords). Subsequently, the user may copy the selected portions into a search function of toolbar 1120, or into a browser 1100 displaying an interface of a web page, and may perform a search based on the copied content portions. In one embodiment, if a user selects a content source resulting from the search operation, a reference may be generated between the original content source (from which search terms were retrieved) and the selected content source resulting from the search, even though no direct navigation link may exist between these two content sources, and even though the reference may have been mediated by another application or entity (e.g., a search engine). For example, plugin 1020 may be configured to retain state information (e.g., a URL) regarding the content source from which the user has selected search terms, and may use such state information to generate references to selected content sources resulting from a search operation.

References among content sources may also include references to RSS content syndication feeds, web services feed sources, or other sources of structured data (e.g., XML) or other content sources that may be rendered, processed or displayed using tools or applications other than web browsers. References may also exist between dissimilar types of content sources accessible via different types of client applications. For example, a user may navigate a reference from an email content source, which may be displayed via an email client, to a web page content source displayed via a browser 1000 distinct from the email client. It is contemplated that references arising through indirect types of content usage or navigation, e.g., as described in the previous paragraph, as well as navigation relationships among heterogeneous content source types and applications are encompassed in the discussion that follows.

Figure 13:
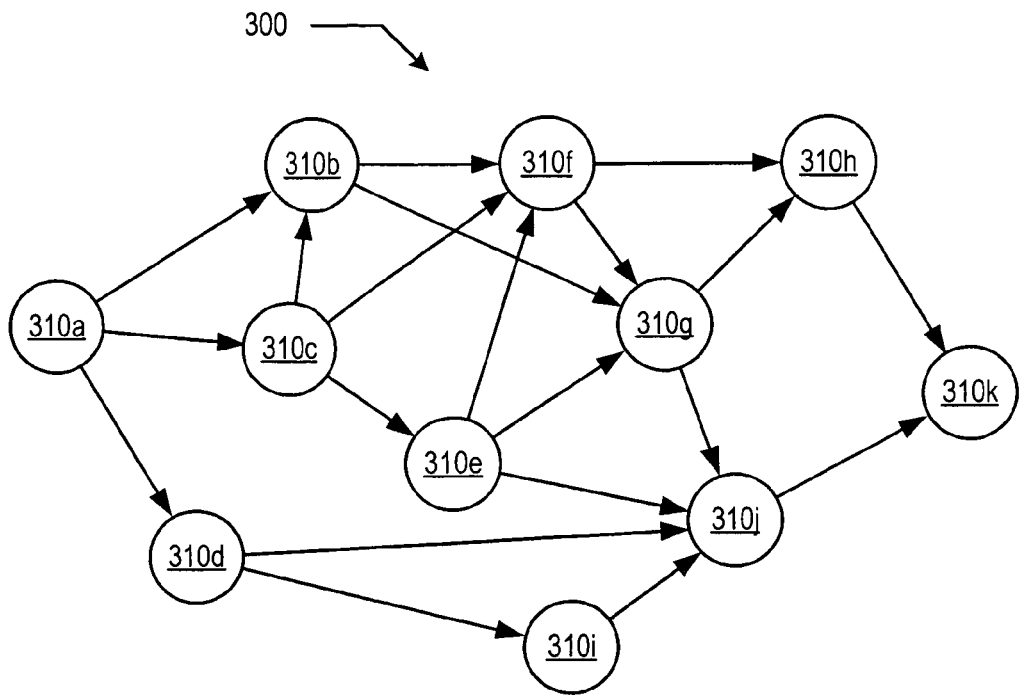
FIG. 13 illustrates one embodiment of a network diagram representing relationships among content sources.

A user's selection or activation of a reference to a destination content source and consequent presentation of the destination content source to the user in response to the selection may be referred to as user navigation to the destination content source. Similarly, the user's act of selecting or activating the reference may be referred to as traversal of the reference. If a navigable reference directly relates two content sources, a navigation path or simply a path may be said to exist between the related content sources. A sequence of paths in which the destination of one path functions as the origin of another path may be referred to as an aggregate path. A collection of content sources may present a variety of navigation paths and aggregate paths for a user to navigate from one content source to another. For example, a first content source may link to a second, which in turn links to a third, and so forth. These relationships among content sources may be represented as a network or graph, of which one embodiment is illustrated in FIG. 13.

In the illustrated embodiment, network 300 is shown to include a number of content sources 310*a-k*. Content sources 310 may encompass, for example, any of the various types or configurations of online content sources discussed previously. Paths relating different content sources 310 are shown as directional arrows between the related sources. Thus, for example, paths exist between content source 310*a* and content sources 310*b-d*. By contrast, no direct path exists between content source 310*a* and content source 310*e*, although a user might navigate between these content sources via content source 310*c*. In some instances, where one path exists from a first source 310 to a second (e.g., a destination) source 310, another path or paths may also exist that lead from the second content source 310 back to the first content source 310, either directly or via some other content source 310. Consequently, it is possible that cycles may exist within network 300, although for simplicity of exposition these are not shown in the illustrated embodiment.

It is noted that network 300 may represent relationships between content sources 310 at the level of content navigation. The paths shown in network 300 may or may not correspond to communication network relationships among systems that may be configured to host content sources 310. For example, two content sources 310 may be adjacent in network 300 if one refers to the other via a navigation path. However, the systems hosting the adjacent content sources 310 may in fact be quite distant in terms of geography or communication network topology. Conversely, systems that are close in terms of geography or communication network topology may be distant in terms of the content navigation topology of network 300. Thus, in some embodiments, the navigation path topology represented by network 300 may differ or diverge from the topology of the underlying communication software and/or hardware entities through which content sources 310 may be implemented.

It is further noted that in some embodiments, the relationships represented within network 300 need not be constrained to explicit navigation links (e.g., HTML links) encoded within content sources. That is, as described previously, a reference between two content sources 310 may be generated on the basis of usage patterns that may not involve the traversal of explicit links. As in the example mentioned previously, in some instances a reference may be generated indirectly or obliquely by virtue of using one content source as a source of search terms through which another content source may be selected. Generally speaking, the relationships represented within network 300 may reflect any of the various ways in which users may navigate among content sources 310, irrespective of whether explicit navigation links are employed. Correspondingly, in some embodiments, the topology of content source navigation relationships represented by network 300 may differ from the topology of explicit navigation links included within content sources 310 themselves, in addition to differing from the topology of lower levels of resource implementation.

A representation of network 300 may be constructed in a variety of ways. In one embodiment, the structure of network 300 may be derived through analysis of content sources 310 to identify references to other content sources 310. For example, a given web page may be identified as a particular content source 310, and each of its links identified as paths to other content sources 310. In turn, web pages targeted by these paths may be analyzed to identify their links to other content sources 310. The structure of network 300 may thus be mapped through iteration or "crawling" through a collection of content sources 310.

Crawling through content sources 310 may identify the various possible paths within network 300 irrespective of whether any user has actually navigated those possible paths. That is, it may offer a representation of network 300 that is driven by syntax rather than usage. In other embodiments, the structure of network 300 may be identified through an analysis of actual user requests for content. For example, as described above, content access requests including referral information may be reported to IA system 130. Such requests may arise in a number of ways, such as a user selecting a link explicitly represented in another content source 310, entering a URL directly into a browser window 1100, or in any other suitable fashion. If the reported content access request targets a valid content source, it may be indicative of a path from the referring content source 310 to the requested content source 310. Correspondingly, records of reported content access requests may be analyzed to identify such paths and to construct a corresponding representation of network 300. Such a usage-driven representation of network 300 may not represent every possible navigation path that exists among content sources 310. Rather, it may represent only those paths for which an actual traversal by a user has been reported. This effective filtering by usage may result in a more compact representation of network 300, and as described below, may facilitate various types of analysis that may be performed on network 300. However, it is contemplated that either of these approaches or any other suitable technique may be employed to generate a representation of network 300.

Generally speaking, a representation of network 300 may encompass any suitable data structure, such as a table, tree, etc. In some embodiments, the representation may be generated and stored by code executable on IA system 130. However, in other embodiments, a representation of network 300 may be generated and stored by code executing on one or more of hosts 100 or requestors 110, for example as a component of traffic reporting logic 160, plugin 1020, badge code 1010, or as a distinct code module or element. It is contemplated that any use of or operation on a representation of network 300, such as any of the various types of analysis or use described below, may also be implemented by code configured to generate and store the representation, and may be executable by various systems as just described. Alternatively, such application code may be implemented by a distinct code module or element that may be configured for execution on a system distinct from the system that generates the representation. For example, in one embodiment IA system 130 may be configured to generate a representation of network 300 and to convey the representation to a requestor 110, which may be configured to independently execute code implementing algorithms to analyze or process the representation on behalf of a particular user. In some embodiments, it is contemplated that IA system 130 may be configured to generate the representation of network 300 from content request traffic generated by requestors 110 and processed as described above with respect to FIGS. 1-9. For example, a content request traffic report including a destination content source and a referrer may be indicative of a user navigation path between the indicated referrer and destination. In one embodiment, IA system 130 may be configured to analyze such relationships in order to infer the structure of network 300 from content request traffic.

As mentioned above and shown in FIG. 13, numerous paths may exist within network 300. However, different paths may vary, sometimes substantially, with respect to various measures of path usage. In some embodiments, a representation of network 300 may include indications of weights along the paths between content sources 310, where the weights may reflect any suitable measure of usage or activity of the corresponding path. For example, paths between certain content sources 310 may be traversed by a high volume of different users relative to paths between other content sources 310. In one embodiment, a measure of navigation volume of a path, such as a number of path traversals per unit of time, may be assigned as a weight of that path. Alternatively, some paths through network 300 may exhibit a substantial rate of change relative to other paths. Correspondingly, in one embodiment a time rate of change of the number of traversals of a given path may be assigned as a weight of that path.

It is contemplated that in some embodiments, path weights may be determined as functions of various factors. In some embodiments, path weights may be determined according to corresponding path navigation traffic. In some particular embodiments, path weights may be determined according to a time rate of change of traffic along the corresponding paths, although a time rate of change need not necessarily be employed. It is noted that all of the foregoing discussion regarding generation and behavior of content source interest weights may apply analogously to navigation path weights. In some embodiments, navigation path traffic volume and a rate of change of navigation path traffic volume may each contribute to a portion of a given path weight, in a linear or nonlinear fashion. Also, like interest weights of content sources described above, path weights between content sources may exhibit decay over time, such that in the absence of navigation activity along a path, the path's weight may approach or achieve a minimum value. It is noted that like content source interest weights, path weights may have an arbitrarily complex functional definition. However, without loss of generality, simple integer weights generally indicative of path navigation traffic will be used to simplify the following discussion. That is, larger numbers may be indicative of a greater degree of traffic, weighted rate of change of traffic, etc., while smaller numbers may be indicative of lesser degrees of traffic. As an example, the network of FIG. 13 is reproduced in FIG. 14 with path weights.

For users of a given content source 310, path weight information may be used in generating navigation recommendations from the set of content sources 310 immediately referenced by the given content source 310. For example, referring to FIG. 14, path weights may be used to rank the paths from content source 310*a* in decreasing order, such that content source 310*b* ranks highest, followed by content sources 310*d* and 310*c*. Thus, a user of content source 310*a* may be offered such a ranked list as a set of recommendations, e.g., via toolbar 1120 or badge 1110 as described above. It is noted that a ranking of content sources according to path weights from a particular content source may differ from the ranking of content sources according to global interest weights as described above. For example, a global interest weight of a content source may take into account request traffic to that content source without regard for its origin, while path-oriented weights take into account origins and destinations of request traffic.

While ranking path weights of immediately referenced content sources 310 relative to a given content source 310 may offer valuable feedback to users regarding their navigation options, additional recommendations regarding potentially interesting content sources 310 may be derived by extending path ranking and evaluation to aggregate paths of network 300. Typically, a user interacting with a given content source 310 may have little visibility into that portion of network 300 that extends beyond the content sources immediately referenced by the given content source 310. For example, if content sources 310 of FIG. 14 correspond to web pages, a user interacting with content source 310*a* may see only links to content sources 310*b-d*. As network 300 shows, other potentially interesting web pages may lie beyond these immediate pages, but they are effectively hidden from the perspective of the user.

In some embodiments, aggregate paths through network 300 may be identified and ranked according to aggregate path weights. Such a ranking may be used, for example, to provide feedback to users regarding potentially interesting content sources 310 that are topologically distant from content sources 310 with which such users may be currently interacting (e.g., more than one navigation path removed from a currently-used content source 310). Further, in some circumstances it may be the case that the interest or value to a user of a particular set of content sources 310 may be enhanced if those sources are traversed in a particular order, via a particular aggregate path. That is, in some cases, interest associated with a group of content sources 310 may be state-dependent. For example, a user seeking to visit web pages to learn about a novel subject may benefit more from visiting more general, introductory pages first, followed by pages that address the subject in greater detail. This type of state dependence may be reflected in path weight information. For example, an aggregate path between two content sources 310 in one direction may have a higher aggregate weight than a corresponding aggregate path in the reverse direction.

Generally speaking, an aggregate path weight may be determined according to any suitable function of the individual weights corresponding to the navigation paths comprising the aggregate path. For example, an aggregate path weight may be determined by simply summing the weights of the aggregate path's components. However, more sophisticated functions may be employed. In one embodiment, the influence of individual path weights in an aggregate path weight may decay as navigation paths become more topologically distant from the origin of the aggregate path. For example, decay may be defined according to a step function, where only the first N navigation paths weights are included in the aggregate path weight, a linear decay function, an exponential decay function, or any other suitable function or combination thereof. (It is noted that the decay of path weight influence according to topological distance may be orthogonal to the decay of path weights themselves over time. Either technique may be employed independently or in combination.) Generally speaking, like navigation path weights, aggregate path weights may also correspond to time rates of change of navigation traffic volume in a manner similar to the time-rate-of-change-based content interest weights described previously.

Multiple aggregate paths may exist between any two content sources 310 within network 300. For example, in the embodiment shown in FIG. 14, there are fifteen distinct aggregate paths between content sources 300a and 300k. In the following discussion, an aggregate path may be denoted by concatenating the suffix letters of the content sources 310 traversed by the path. Thus, for example, the aggregate path traversing content sources 310a, b, f, h and k may be referred to as path ABFHK.

As mentioned previously, some aggregate paths may have greater potential interest or utility to a user than other aggregate paths, as indicated by corresponding aggregate path weights. In one embodiment, a particular aggregate path between two content sources 310 may be selected such that its aggregate path weight satisfies an optimization criterion. That is, the selected aggregate path may be distinguished from other aggregate paths on the basis of some aspect of its aggregate path weight. In various embodiments, different types of optimization criteria may be employed, taking account the format in which weights are represented as well as the overall goal of the selection. For example, an optimization criterion may specify that the selected aggregate path should have a weight that is maximal relative to other aggregate path weights. However, in other embodiments an optimization criterion may alternatively specify, for example, that the weight of the selected aggregate path should be minimized relative to other aggregate path weights, or should have a weight that is closest among other aggregate path weights, in absolute terms, to some target weight value, or which equals the target weight value within an absolute or relative threshold of equality (e.g., an absolute weight value or a percentage of the target weight value).

Thus, for example, in an embodiment where higher aggregate path weights indicate greater overall user traffic, rate of change of user traffic, or another metric of content interest, a "best" aggregate path among a group of aggregate paths in terms of potential content interest may correspond to the aggregate path having the highest aggregate path weight, while the "worst" aggregate path may have the lowest aggregate path weight among the group. For simplicity of reference, an aggregate path selected such that it satisfies an optimization criterion may be referred to as an optimal aggregate path, or simply an optimal path, regardless of the "good or bad" valence of the optimization criterion. Further, it is noted that the notion of a path being "best," "worst" or optimal in some other regard may be a context-dependent, relative consideration rather than an absolute, global determination. For example, what constitutes a best or worst path may vary depending on the metrics that form the basis for path weighting and the desired goal resulting from selection on the basis of an optimization criterion. Additionally, in some instances, multiple aggregate paths may satisfy a given optimization criterion. For example, a threshold aggregate path weight may be employed, such that any aggregate path having a weight exceeding the threshold may be considered optimal. Alternatively, aggregate paths may be ranked by weight, with a given number of top paths being considered optimal. In other embodiments, if multiple aggregate paths are deemed optimal according to the optimization criterion in use, further filtering or optimization of these aggregate paths may be performed on the basis of secondary optimization criteria, such as path length, secondary measures of traffic volume, or other criteria that may be relevant in distinguishing levels of content interest.

Determining which aggregate path or paths between two content sources 310 satisfy a given optimization criterion relative to a set of possible aggregate paths within network 300 may be a computationally nontrivial task. In some instances, an optimal aggregate path may not include a given (or even any) locally optimal navigation path between a given pair of content sources 310. For example, according to one embodiment, path ACEJK of FIG. 14 has an aggregate path weight of 15 and is the optimal path between content sources 300a and 300k within network 300. However, it is noted that even though path ACEJK is optimal in this context, the navigation path between content sources 310a and 310b has a higher weight than the navigation path between content sources 310a and 310c, which is included in the optimal path. Thus, determining an optimal aggregate path may not simply be a function of choosing the optimal individual navigation path at each level within network 300.

Figure 15:
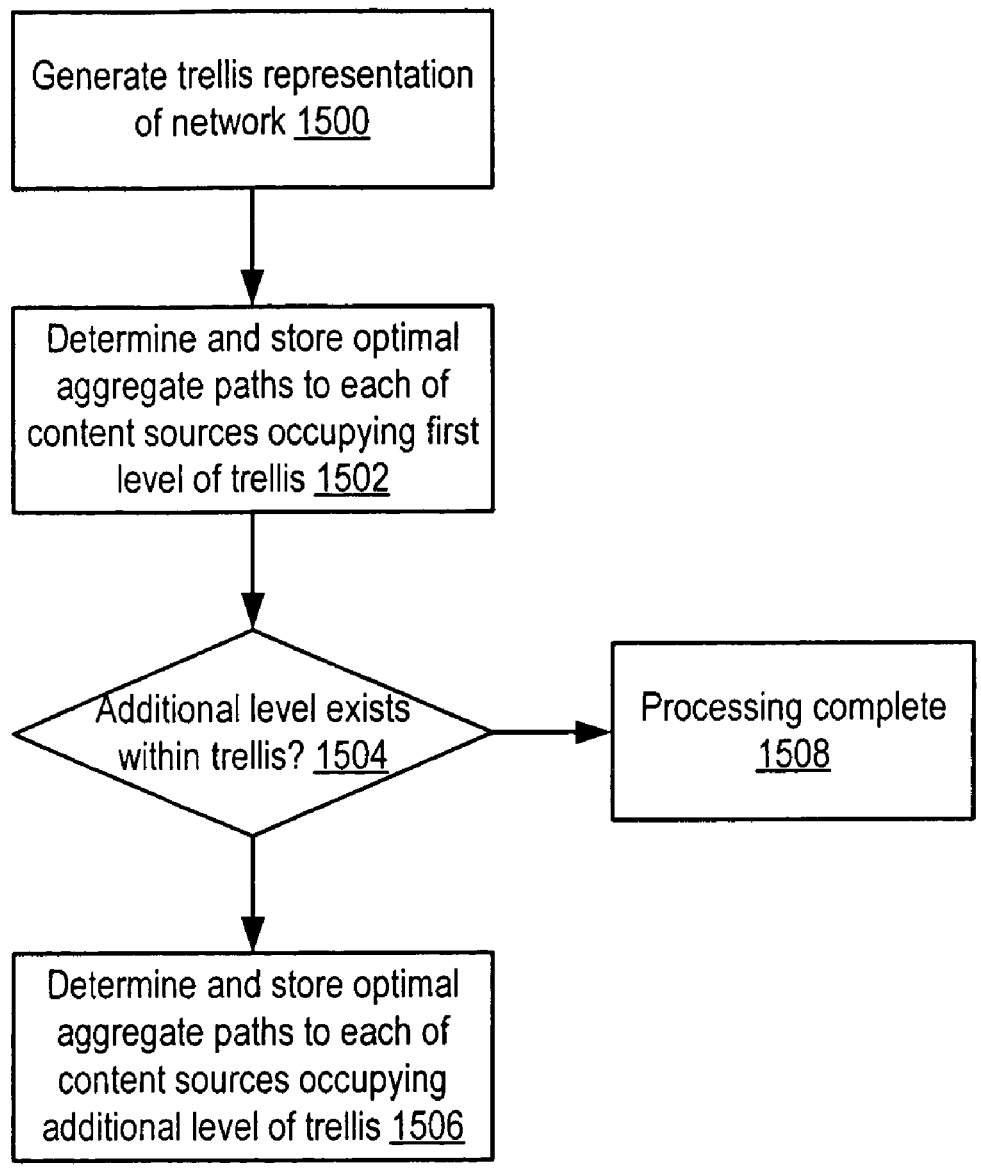
FIG. 15 is a flow diagram illustrating one embodiment of a method of determining optimal aggregate paths between content sources.

In some embodiments, an optimal aggregate path may be identified by exhaustively computing the aggregate path weights for each possible aggregate path and then ranking the resulting weights according to an optimization criterion. However, the total number of aggregate paths may grow exponentially as the number of content sources 310 within a network 300 increases. Thus, an exhaustive search may be computationally expensive for large networks 300. Alternatively, any suitable algorithm for determining an optimal path through a weighted network, such as a Viterbi algorithm, for example, may be employed. One embodiment of a method of determining an optimal aggregate path between two content sources 310 is illustrated in FIG. 15. In some embodiments, such a method may be implemented by IA system 130 and performed on a representation of a network 300 derived from reported content request traffic, as described above. In the illustrated embodiment, operation begins in block 1500 where a trellis representation of network 300 is generated. Generally speaking, a trellis representation of a network 300 may be include multiple levels indicative of the number of navigation paths required to reach a content source 310 according to a particular aggregate path. Content sources 310 that are accessible via multiple aggregate paths of differing lengths may appear in multiple levels of the trellis.

Figure 14:
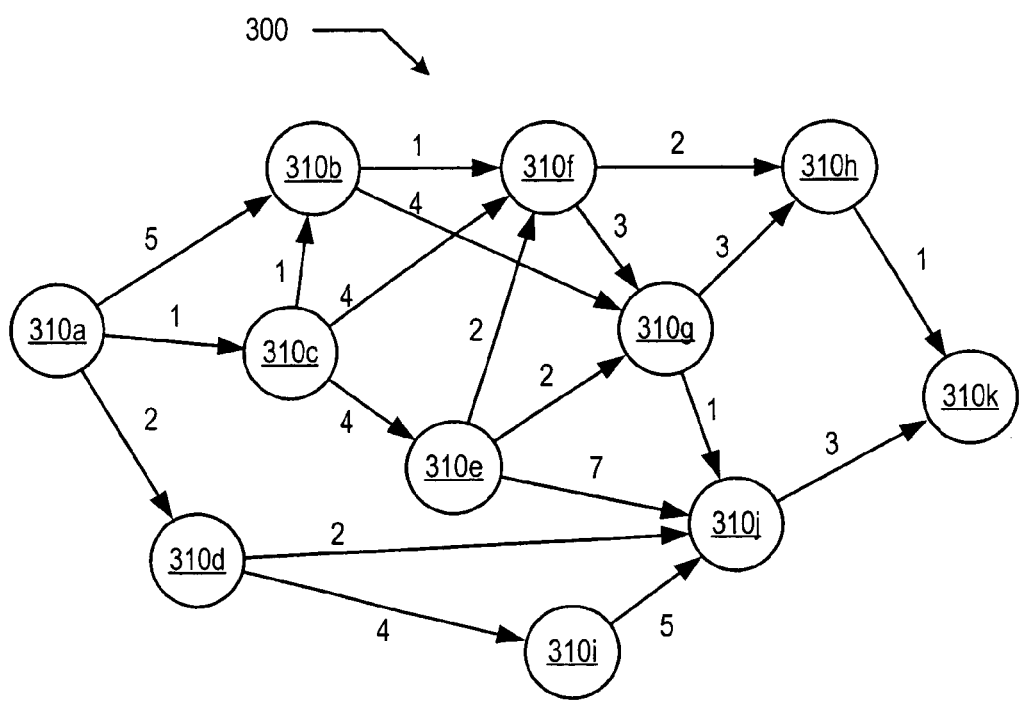
FIG. 14 illustrates another embodiment of a network diagram including navigation path weights between content sources.
Figure 16:
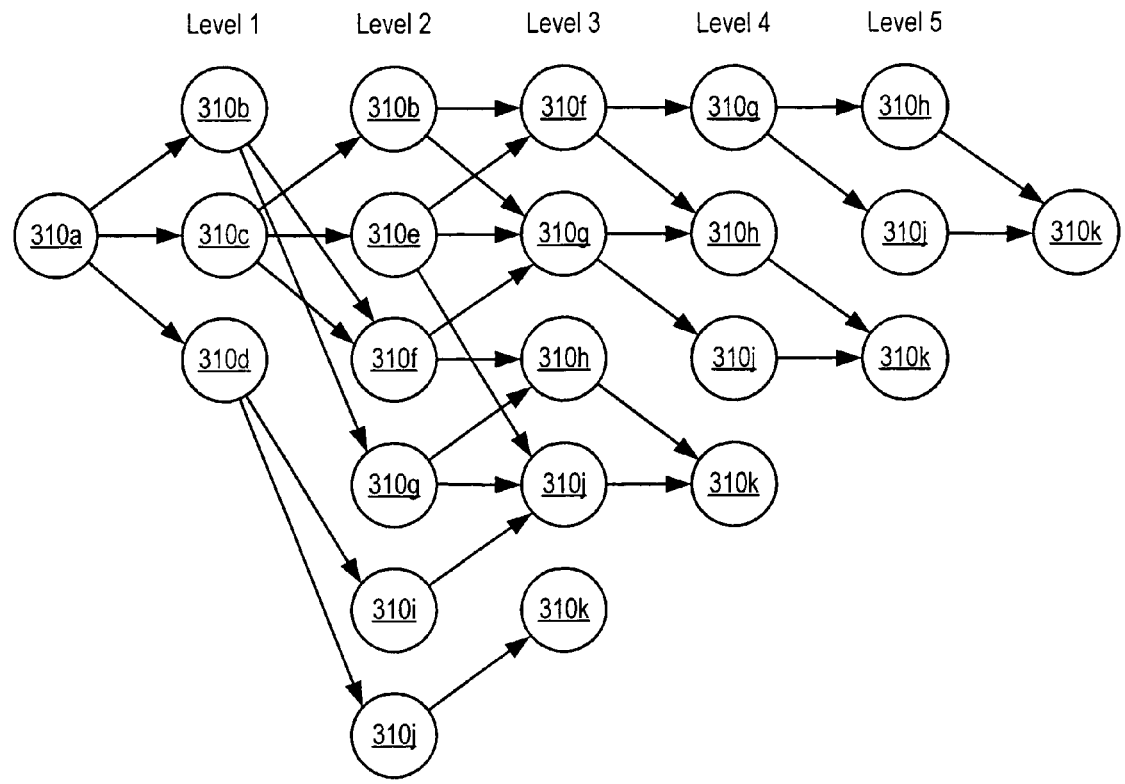
FIG. 16 illustrates one example of a trellis representation of a network of relationships among content sources.

One example of a trellis representation of network 300 of FIG. 14, with respect to aggregate paths between content sources 310a and 310k, is shown in FIG. 16. In the illustrated embodiment, level 1 includes those content sources accessible via aggregate paths including one navigation path from content source 300a, level 2 includes those content sources accessible via aggregate paths including two navigation paths, and so forth. For example, content source 310b appears in both level 1 and level 2 because according to network 300, it is accessible from content source 310a both directly and via content source 310c. For clarity, the navigation path weights shown in FIG. 15 are not shown in the trellis of FIG. 16, but may be encoded within a data structure representative of the trellis.

Referring again to FIG. 15, following generation of a trellis representation, operation continues in block 1502, where the optimal aggregate path to each of the content sources 310 occupying the first level of the trellis are determined and stored. By definition, there exists only one respective path from the origin content source (content source 310a in FIG.

16) to each of the content sources 310 occupying the first level of the trellis, so this respective path is the optimal path to the corresponding first-level content source 310.

If another level exists within the trellis (block 1504), then an optimal aggregate path is determined and stored for each content source 310 within that level (block 1506), and processing may continue from block 1504. If no additional levels exist within the trellis, processing is complete, with the optimal aggregate paths to each content source 310 at each level of the trellis having been determined and stored (block 1508). In some instances, network 300 may include cyclic paths in which a given content source 310 appears multiple times. In some embodiments, the method of FIG. 15 may be modified to detect and exclude cycles from the optimal aggregate path analysis. For example, if a path is determined to be cyclic, processing of the path may halt and it may be eliminated from the trellis. Alternatively, cyclic paths may be excluded from trellis generation prior to the determination of optimal aggregate paths. Also, in some embodiments, processing of optimal aggregate path information for a given path may terminate before the final level of the trellis has been reached. For example, a path may be considered terminated if a navigation path weight along the path falls below a particular threshold value.

In determining the optimal aggregate path for a given content source 310 within a given level, one or more content sources 310 in the previous level may have paths to the given content source 310. However, only the previously determined optimal aggregate path for each of these content sources 310 in the previous level needs to be taken into account. That is, for any given content source 310 in some level of the trellis, one or more content sources 310 in the previous level may have a path to the given content source 310. In turn, each of these content sources in the previous level may have multiple different paths from the origin content source 310. However, only some of these multiple paths may be optimal, and the optimal aggregate path to a content source 310 in a succeeding level will be an extension of an optimal aggregate path to some content source 310 in a previous level.

As an example, consider FIG. 16. In level 1 of the trellis, the optimal paths for content sources 310$b$-$d$ are simply the paths from content source 310$a$, having weights of 5, 1 and 2, respectively. In level 2 of the trellis, only content source 310$f$ has two possible paths from level 1: path BF and path CF. Since paths BF and CF have respective weights 1 and 4, in one embodiment the aggregate path weights for aggregate paths ABF and ACF, taken as the sum of the component navigation paths, are 6 and 5, respectively. Since aggregate path ABF has the higher weight, it may be considered the optimal aggregate path to content source 310$f$ in level 2 and stored as such.

Considering level 3 of the trellis, content source 310$g$ has three possible paths from level 2: paths BG, EG and FG. In the illustrated embodiment, only one aggregate path exists through each of content sources 310$b$ and 310$e$ in level 2: paths ACB and ACE, respectively. While two aggregate paths exist to content source 310$f$, path ABF was previously determined to be the optimal one of the two. Thus, path ACF may be disregarded in considering the optimal path to content source 310$g$ in level 3, reducing the overall computation requirement relative to the exhaustive path evaluation approach mentioned above. Based on these considerations, the candidate aggregate paths to content source 310$g$ are paths ACBG, ACEG and ABFG having aggregate path weights 6, 7 and 9, respectively. Since aggregate path ABFG has the highest weight of the three, it is stored as the optimal path to content source 310$g$ in level 3.

It is noted that in some embodiments, thresholds, decay or other functions may be applied to aggregate paths and their associated weights during the operation of the method of FIG. 15. For example, aggregate path lengths may be explicitly limited to a certain number of navigation paths, which may be implemented by limiting the number of levels of the trellis that may be considered. Alternatively, a minimum path length requirement may be enforced. Additionally, decay functions may be applied to individual navigation path weights within the trellis as a function of the level of the trellis where the weight occurs, or according to any other suitable function. Any combination of these techniques may also be employed.

Once complete, application of the method of FIG. 15 may result in a data structure that reflects the optimal aggregate paths from an origin content source 310 to each content source 310 at each level within the trellis. If a given content source 310 appears in more than one level (e.g., content source 310$b$ appears within levels 1 and 2 of FIG. 16), the overall optimal aggregate path to that content source may be determined from among the several computed entries. For example, the most heavily weighted, longest, or shortest path to the given content source 310 may be selected, or another selection criterion may be employed. In some embodiments, the optimal aggregate path from the origin content source 310 to any content source 310 within network 300 may also be explicitly identified. That is, rather than identifying an origin content source 310, a particular destination content source 310, and using the optimal aggregate path results to determine the optimal aggregate path between them, the optimal aggregate path results may be used to determine which destination content source or sources 310 have an optimal aggregate path from the origin, relative to all the content sources within network 300.

Optimal aggregate path information may have several applications. It is noted that in general, individual and aggregate path weight information may be derived from actual user navigation behavior with respect to content sources 310. Aggregate path information that takes user-driven behavior into account may serve as an indication of interest in the content sources 310 referenced by the path. Thus, instead of or in addition to recommending specific content sources to users, in some embodiments plugin 1020, badge code 1010 or both may be configured to identify and display optimal aggregate path information via toolbar 1120 and/or badge 1110.

For example, in one embodiment plugin 1020 may be configured to identify a content source 310 that a user is currently viewing or otherwise interacting with via browser window 1100. Plugin 1020 may then query optimal aggregate path information, which may be determined by and/or stored on IA system 130, one of hosts 100, or one of requestor 110. For example, plugin 1020 may query for a URL or other identifier of the current content source 310, and may specifically request optimal aggregate path information relative to the current content source 310. Such information may include a request for aggregate paths within an interest space (described in greater detail below) defined by user preferences, user session information, or other user-specific state information. In response, plugin 1020 may receive information identifying one or more aggregate paths that satisfy the request, which may include URL, tag or other information identifying the content sources 310 included in the paths as well as the ordered relationship among them. Plugin 1020 may then be configured to display the received path information via toolbar 1120, for example as a list of "recommended paths" in addition to or instead of the "recommended sources" shown in FIG. 11. Similarly, in some embodiments badge code 1010 may be configured to perform similar aggregate path information requesting and display, e.g., for paths that refer to or from the host 100 that may be associated with badge 1110.

As mentioned above, in some circumstances an ordered traversal of an aggregate path may be significant to a user's deriving maximum utility from the content sources 310 along the path. In other circumstances, a user may be more interested in navigating directly to a content source 310 that is at or near the end of an optimal aggregate path, or somewhere along the path, bypassing some intervening sources 310 along the way. For example, a user may begin a general search for information at a particular content source 310 with a specific goal in mind. The various aggregate paths originating at the particular content source 310 may be projections towards content sources 310 that might satisfy the user's goal. That is, those aggregate paths might constitute predictive information regarding destination content sources 310 that might be useful to the user. Correspondingly, in some embodiments plugin 1020 or badge code 1010 may be configured to employ aggregate path information to make specific content source 310 recommendations, for example within toolbar 1120 or badge 1010.

It is noted that in some embodiments, path weight information, and consequently optimal aggregate path information, may evolve over time, for example as user traffic patterns change, weights decay, etc. It is also noted that dynamically exposing path information derived from user traffic information may facilitate self-organization of an otherwise chaotic or disorganized collection of content sources 310. For example, users presented with dynamic indications of potentially interesting paths may be more likely to select content sources 310 along those paths, which may reinforce the weighting of those paths still further. By contrast, paths or content sources 310 that become less interesting or relevant may correspondingly see their weights decline over time, becoming less likely to be selected by users presented with dynamic path information. In particular, it is noted that such organization of content may in some instances be entirely driven by user behavior, and may be performed, e.g., by software executable by IA system 130 or another system without need of manual intervention to rate or rank content sources or paths.

Figure 17A:
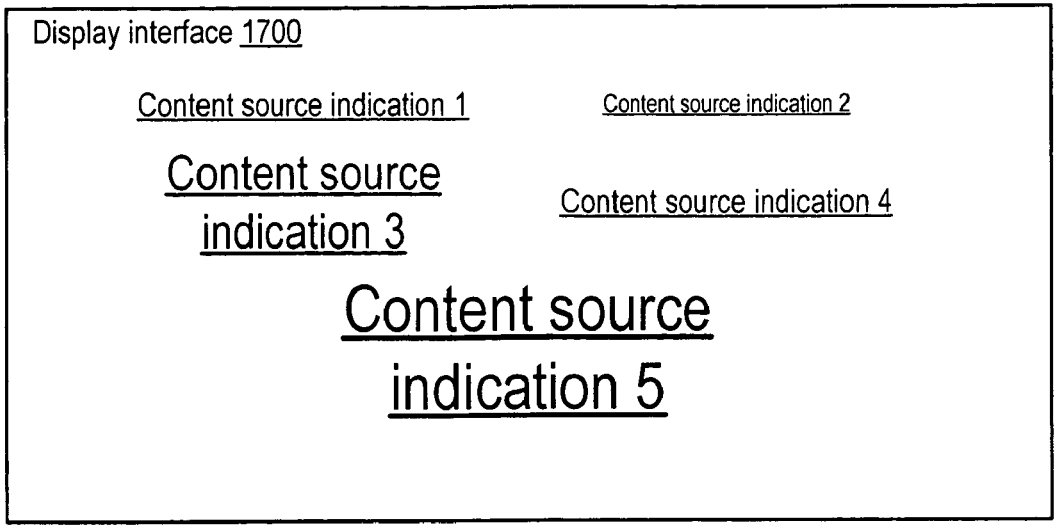
FIGS. 17A-B illustrate one embodiment of a user interface through which a user may interact with content interest data.
Figure 17B:
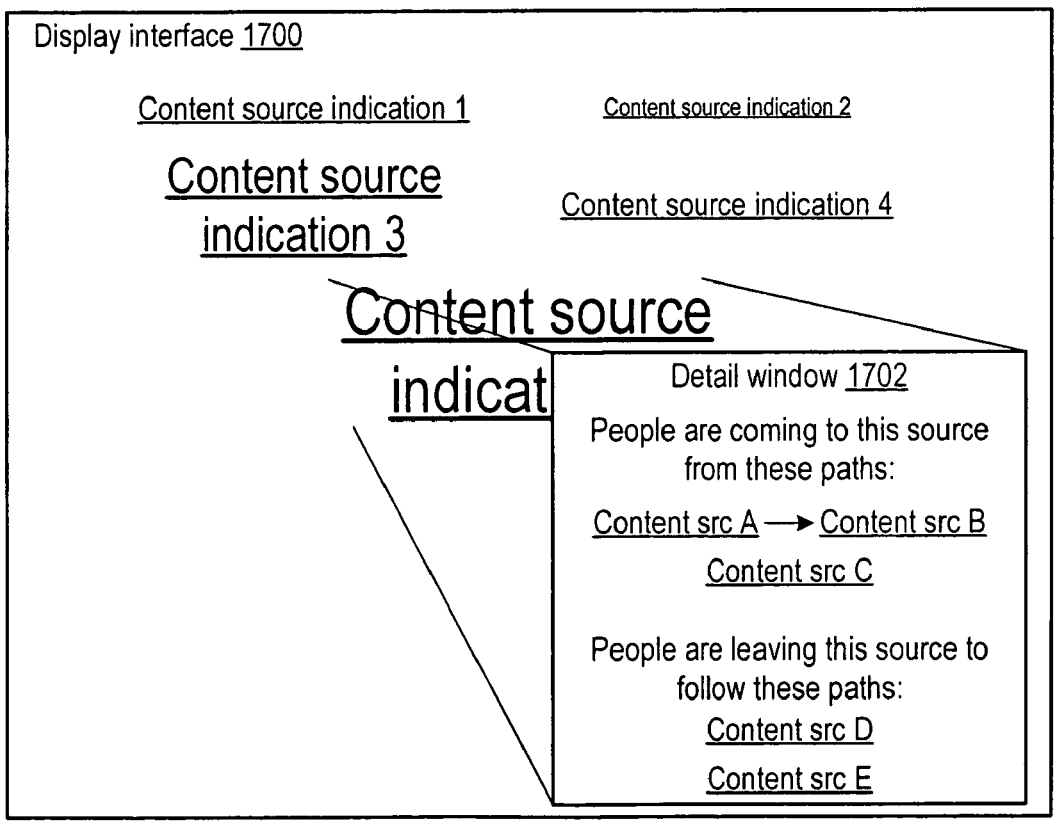

One embodiment of a user interface through which a user may interact with content source interest information, path information, or both is illustrated in FIGS. 17A-B. In various embodiments, the illustrated interface may be implemented as a web page viewable within a browser window such as browser window 1100, or as content presented to the user via badge 1110 or toolbar 1120, or through any other suitable display interface.

In the embodiment of FIG. 17A, display interface 1700 includes indications of five different content sources. In one embodiment, each of the indicated content sources may correspond to an online content source accessible through a URL, path name or other suitable descriptor. In such an embodiment, the displayed indications corresponding to the content sources may be configured as hyperlinks, such that a user's selection of a particular hyperlink may cause the user to navigate to the corresponding content source, for example by displaying the selected content source within an existing browser window, opening a new browser window to display the selected content source, etc. In an alternative embodiment, each of the indicated content sources may correspond to a path, such as a navigation path or an aggregate path as described above. In some such embodiments, the displayed content source indications may be comprised of multiple distinct hyperlinks corresponding to the elements of the displayed path.

In some cases, a content source indication as displayed may be textually equivalent to the link or path the indication represents, while in other cases, a tag, title, or symbol may be displayed in lieu of a link or path corresponding to a content source. For example, a content source accessible through the URL "http://www.domainname.com/webpage" may include metadata that defines the name of the content source as "Home Page." In one embodiment, the URL "http://www.domainname.com/webpage" may be displayed within display window 1700 as the content source indication, while in another embodiment, the page name "Home Page" may be displayed within display window 1700 as the content source indication.

Display characteristics of the content source indications shown within display interface 1700 may vary, in some embodiments, according to content interest data associated with the content sources. For example, content interest weights or path weights may be determined according to any of the techniques discussed above. In various embodiments, the weight of a content source may be reflected in its corresponding indication within display interface 1700 through variations in the font size, display color, display position or any other suitable display characteristic. For example, content sources having larger weights may be displayed using a larger font size or in a brighter hue, while content sources having smaller weights may be displayed using a smaller font size or in a darker hue. Combinations of display characteristics may also be used, for example to display a single aspect of content interest data or multiple distinct aspects of such data. For example, as described above, a content source may have multiple different content interest weights. In one embodiment, a different display characteristic may correspond respectively to a particular one of the different content interest weights.

In some embodiments, display window 1700 may be configured to provide additional information about a particular indicated content source in response to a user's selection of the particular source. In the embodiment shown in FIG. 17B, display window 1700 may be configured to generate a detail window 1702 in response to a user's selecting a content source indication. For example, display window 1700 may detect such selection by detecting a mouse-over event in which the position of a mouse cursor is determined to be in the vicinity of a content source indication. Any other suitable indication of selection may also be detected.

Detail window 1702 may be configured to present any suitable additional information regarding a content source. In the illustrated embodiment, detail window 1702 is configured to display path information corresponding to the indicated content source. The displayed information for a given path may include indications of those content sources included in the path, arranged according to the path relationship. For example, detail window 1702 indicates that according to collected content request traffic data (e.g., as determined by IA system 130), popular user navigation paths leading to indicated content source 5 include a path that includes a content source A and a content source B as well as a path including content source C. Further, detail window 1702 indicates that popular destination paths for users leaving indicated content source 5 include a path including a content source D as well as a path including a content source E. Each of the indicated content sources A-E shown within the indicated paths may, in one embodiment, correspond to a navigable URL or other selectable indication through which a user may access the corresponding content source. In some embodiments, it is contemplated that detail window 1702 may be configured to display content source details other than or in addition to path details. For example, detail window 1702 may display content interest statistics or other data, such as the weight(s) associated with a particular content source at various points in time.

Figures 18A, 18B:
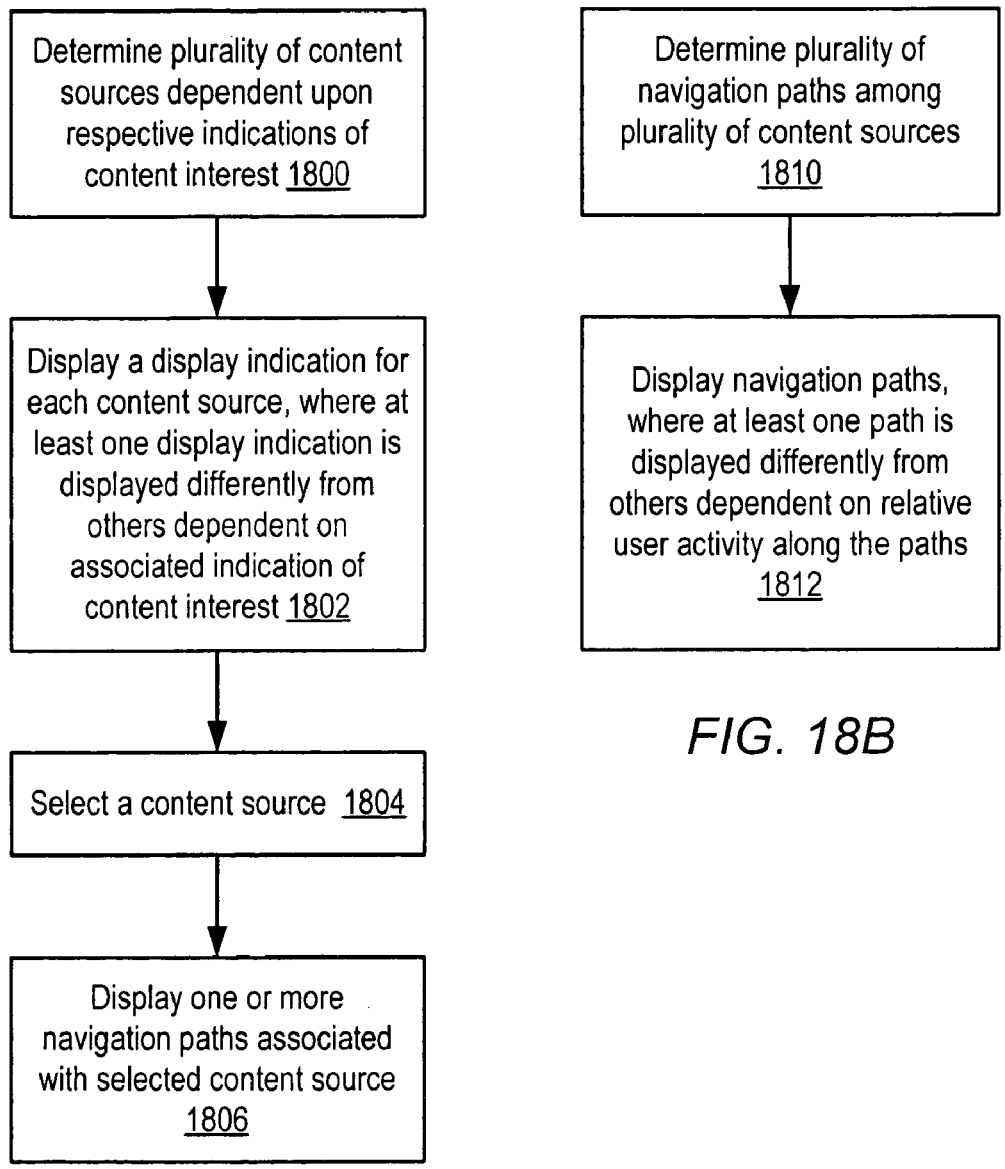
FIGS. 18A-B are flow diagrams illustrating embodiments of methods of displaying content interest data.

One embodiment of a method of displaying content interest data associated with individual online content sources is illustrated in FIG. 18A. In the illustrated embodiment, operation begins in block 1800 where a plurality of content sources is determined. In one embodiment, determining the plurality of content sources may be dependent upon a respective indication of content interest associated with each of the content sources, where the respective indication for a given content source is dependent upon a time rate of change of content request traffic directed to that content source. For example, the indication may correspond to a content interest weight as described in detail above.

Subsequently, a display indication for each of the content sources is displayed, where at least a given one of the display indications is displayed differently from other display indications dependent upon the indication of content interest associated with the given display indication relative to other display indications (block 1802).

For example, the display indication may correspond to a hyperlink, tag, or other textual or symbolic display. As noted above, in various embodiments the display indication may vary in some display characteristic such as font size, color, position, etc., according to an associated content interest indication.

One of the content sources may then be selected (block 1804). For example, a user may select a content source by clicking or simply rolling over the display indication of the content source using a mouse icon. In other embodiments, a content source may be selected according to any suitable technique or gesture. One or more navigation paths corresponding to the selected content source may then be displayed (block 1806). For example, a box or window such as detail window 1702 may be displayed for the selected content source, where the details include navigation paths leading to and/or from the selected content source, as described above with respect to FIG. 17B.

One embodiment of a method of displaying content interest data associated with navigation paths among online content sources is illustrated in FIG. 18B. In the illustrated embodiment, operation begins in block 1810 where a plurality of navigation paths among a plurality of online content sources is determined. For example, in one embodiment IA system 130 may be configured to determine navigation paths and/or aggregate paths including navigation paths from content request traffic reports as described above with respect to FIGS. 1-16.

Subsequently, the navigation paths may be displayed, where at least one given one of the navigation paths is displayed differently from other navigation paths dependent upon relative user activity along the various navigation paths (block 1812). For example, display characteristics such as font size, color, position, etc. associated with the given navigation path may vary dependent upon an indication of relative user activity associated with the given path, such as a path weight.

It is noted that in some embodiments, the display of content interest data according to the methods of FIGS. 18A-B may occur under the direct or indirect control of IA system 130. For example, IA system 130 may be configured to collect, generate and maintain the content interest data that forms the basis for display. In one embodiment, IA system 130 may respond to queries or requests for content interest data generated, for example, by browser 1000, badge code 1010 or plugin 1020. In responding with the requested data, IA system 130 may directly or indirectly cause the data to be displayed via an appropriate interface.

Content interest data, such as weight and path information, may evolve over time as content request traffic patterns change. Correspondingly, in some embodiments a display of content interest data such as that shown in FIG. 17 may be configured to periodically refresh. For example, the functionality associated with display window 1700 may be configured to request content interest data from IA system 130 at regular intervals and to responsively update the displayed indications, such as by adjusting display characteristics or by removing some indications and adding others. In some embodiments, the contents of display window 1700 may be refreshed at frequencies that approximate the real-time behavior of the underlying content sources and navigation paths, such as once every ten seconds, for example.

It is noted that while display indications associated with content sources or paths may be visual or graphic indications, they need not be. In some embodiments, browser 1000, badge code 1010 or plugin 1020 may be configured to support display indications of content interest data other than visual indications. For example, in some embodiments a user may configure one of these modules to generate an audible alert (e.g., a beep) when a particular content interest data event occurs, such as when a weight of a content source or path exceeds a given value. In other embodiments, a display indication may include an alert message conveyed through email, telephone, pager or any other suitable notification medium.

Identifying Content Interest Spaces within Topologies

In some embodiments, network 300 may include many content sources 310 (e.g., tens, hundreds, thousands or more) and correspondingly many distinct paths among content sources. Conceivably, many different aggregate paths within network 300 may have large aggregate path weights and consequently could be ranked as optimal or high-ranking aggregate paths relative to network 300 as a whole. However, in large-scale instances of network 300, users may not be universally interested in every optimal aggregate path. Rather, users may be interested in aggregate paths that correspond to their particular interests. That is, a user may be more likely to be interested in optimal or near-optimal aggregate paths that traverse some portion of network 300 that includes content sources 310 having some common aspect known to be or likely to be interesting to the user. Such portions of network 300 may be referred to as interest regions or interest spaces.

Figure 19:
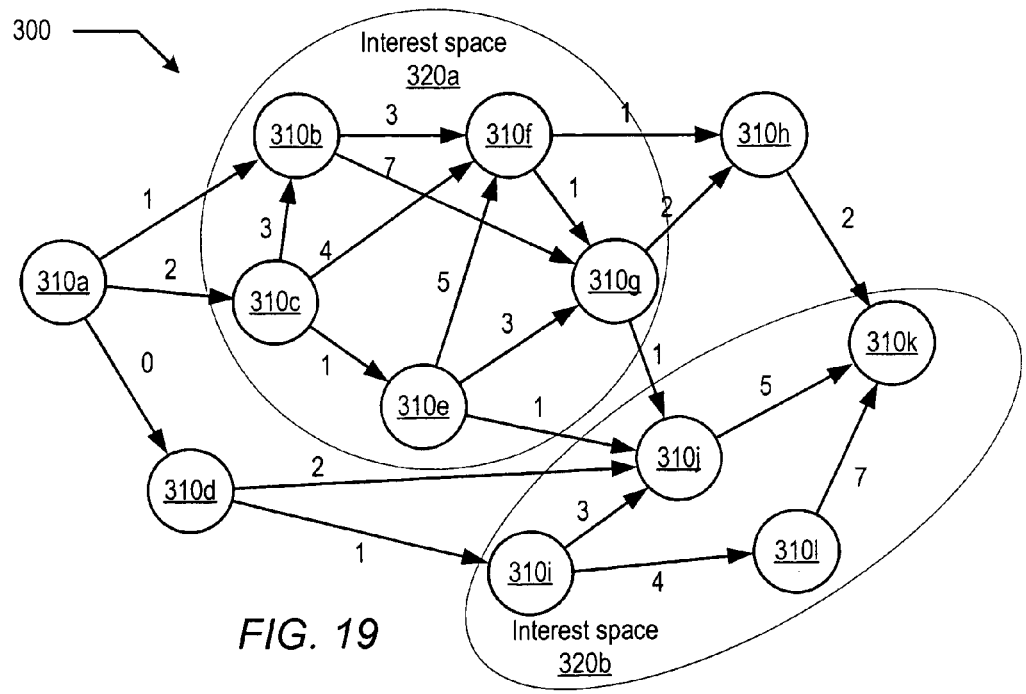
FIG. 19 illustrates one embodiment of a network diagram of content sources that includes interest spaces.

Interest spaces within network 300 may be defined according to any of a number of criteria. In one embodiment, membership of content sources 310 within a given interest space may be defined according to the navigation path weights between various content sources 310 as reflected in network 300. Consider, for example, the embodiment of network 300 shown in FIG. 19. In the illustrated embodiment, content sources 310*a*-1 are shown as interconnected via a number of navigation paths and aggregate paths, with the navigation path weights explicitly shown adjacent to their corresponding paths. As shown in FIG. 19, a substantial fraction of navigation paths have minimal path weights (e.g., 0, 1, or 2) where 0 signifies the minimum possible weight in this example). Additionally, the remaining higher-weighted paths appear to be clustered around several particular groups of content sources 310.

This example suggests one possible definition that may be employed to organize a network 300 into one or more interest spaces. Specifically, according to one embodiment, a given interest group within a network 300 may be generated such that each content source 310 that is a member of the given interest group is connected to at least one other content source 310 within the given interest group, either as an origin or destination, by a navigation path having a corresponding path weight that satisfies a selection criterion. For example, the selection criterion may be implemented as a threshold value, such that a path weight may be required to be greater than or less than the threshold value to satisfy the selection criterion. However, in other embodiments, more complex selection criteria may also be used. For example, a threshold value may be adjusted as an interest group increases in population, which may cause the interest group to be more or less selective with respect to including additional content sources 310 as members.

Suppose a selection criterion for interest space membership includes a path weight threshold of 2, such that navigation path weights must be strictly greater than 2 to satisfy the selection criterion. Applying this criterion to the embodiment of FIG. 19 may result in the formation of two distinct interest spaces, also shown in FIG. 19. Interest space 320a includes content sources 310b, c, e, f and g, while interest space 320b includes content sources 310i, j l and k. It is noted that content sources 310a, d, and h, having no navigation paths that satisfy the selection criterion, do not belong to either of interest spaces 320a-b. Also, interest spaces 320a-b are disjoint, in that there exists no navigation path connecting the two spaces that satisfies the selection criterion. By contrast, if the weight of either of paths EI or GJ had been greater than 2, a single interest space 320 including the content sources 310 of both interest spaces 320a-b might have been generated. It is noted that while in this example, interest spaces 320a-b form closed regions including multiple aggregate paths among content sources 310 within each interest space 320, in some instances, an interest space 320 may not correspond to a closed region within network 300. For example, a single aggregate path between two content sources 310 may constitute an interest space 320, regardless of whether the aggregate path is optimal.

Figure 20:
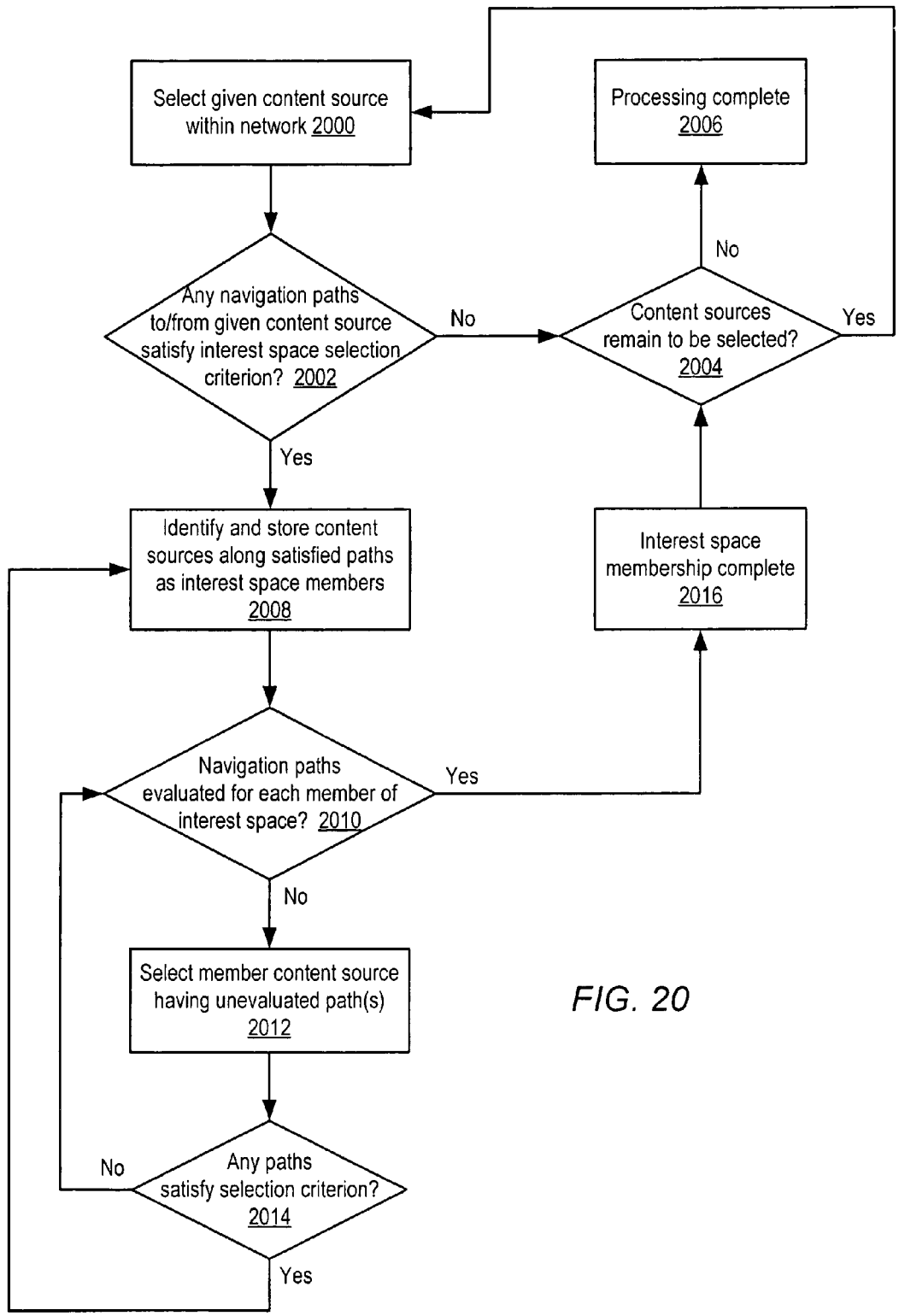
FIG. 20 is a flow diagram illustrating one embodiment of a method of generating interest spaces within a network of content sources.

One embodiment of a method of generating interest spaces 320 within a network 300 is shown in FIG. 20. In some embodiments, such a method may be implemented by IA system 130 and performed on a representation of a network 300 derived from reported content request traffic, as described above. In the illustrated embodiment, operation begins in block 2000 where a given content source 310 within a network 300 is selected. For example, content source 310a of FIG. 17 may be selected. Navigation paths to and from the given content source 310 are then examined to determine whether any of the paths satisfy the interest space selection criterion (block 2002). If none of the navigation paths leading to or from the given content source 310 satisfy the selection criterion, then if any unselected content sources 310 remain to be processed (block 2004), operation may proceed from block 2000 where another given content source 310 is selected. Otherwise, operation may be complete (block 2006). For example, for a selection criterion specifying a threshold navigation path weight of 2 as in the above discussion, none of the paths from content source 310a satisfy the threshold. Correspondingly, content source 310b or another content source may be selected. Selection of the next content source 310 to process may occur systematically, e.g., by considering the paths of previously processed sources.

If any of the navigation paths to or from the given content source 310 satisfy the interest space selection criterion, the given content source 310 and those content sources 310 along navigation paths to or from the given content source 310 that do satisfy the criterion are identified as members of a new interest space 320 and stored for further consideration (block 2008). Thus, for example, it may be determined that content source 310b has destination navigation paths leading to content sources 310f and 310g, and is a destination for a navigation path originating from content source 310c, each of which satisfies the threshold value of 2. Correspondingly, each of content sources 310b, c, f, and g may be identified as members of interest space 320a. If a content source 310 has previously been identified as a member of the interest space 320 (e.g., via a different path), it may be disregarded from further processing.

It is then determined whether navigation paths have been evaluated for each content source 310 that is a member of interest space 320 (block 2010). If there exists one or more member content sources 310 having unevaluated navigation paths, one of these content sources may be selected (block 2012) and its paths may be evaluated with respect to the interest space selection criterion (block 2014), as described above with respect to block 2002. If the selected content source 310 has one or more navigation paths that do satisfy the selection criterion, processing may proceed from block 2008. Otherwise, processing may proceed from block 2010. Referring to the above example, after content source 310b is considered, content source 310c may be selected. Content source 310c has a navigation path to content source 310f that does satisfy the selection criterion, but since content source 310f was previously added to interest space 320a, it may be disregarded. Subsequently, content source 310f may be evaluated. As the navigation path to content source 310f from content source 310e satisfies the selection criterion, content source 310e may be added to interest space 320a.

If navigation paths have been evaluated for all current members of interest space 320, the membership of interest space 320 may be complete (block 2016). Operation may then proceed to block 2004, from which the remainder of network 300 may be processed to generate other interest spaces 320, if possible. For example, following processing of content sources 310b, c and f, content sources 310e and 310g may be evaluated. As these sources only have navigation paths to other content sources 310 that are already members of interest space 320a, the definition of interest space 320a may be complete. Operation may continue to generate the membership of interest space 320b in a similar fashion. It is noted that while a particular approach is shown in FIG. 20, any other suitable technique may also be employed to generate interest spaces 320 within a network 300.

Once interest spaces 320 have been generated within a network 300, in some embodiments they may form the basis for the optimal aggregate path analysis techniques described above. For example, rather than analyze all aggregate paths within an entire network 300, in some embodiments plugin 1020, badge code 1010 or another code module or element may be configured to constrain aggregate path analysis to a particular interest space 320 that has some association with a user. Such an association may include, for example, including a content source 310 with which the user of browser window 1100 is currently interacting. In such embodiments, this particular interest space 320 may function in the place of network 300 for the purpose of applying the previously-discussed techniques of optimal aggregate path analysis. For example, an interest space 320 may form the basis for generating a trellis and performing a path optimization algorithm to identify optimal aggregate paths, such as shown in FIG. 15.

It is also contemplated that in some embodiments, a representation of an interest space 320 may be presented directly to a user. For example, plugin 1020 may be configured to generate a static or dynamic representation of an interest space 320 related to a content source 310 with which a user is currently interacting, or to a recommended content source 310 or path. Such a representation may be graphically displayed within toolbar 1120 or elsewhere within browser window 1100 or another window, and may include various types of information about the included content sources 310, such as URLs, page titles, abstracts, images or other information. In some embodiments, a representation of interest space 320 may be navigable, such that a user may be able to navigate to and/or receive more detailed information about a particular content source 310 by selecting it within the graphical interest space representation (e.g., by clicking or rolling over an indication of the particular content source 310 with a mouse icon).

It is noted that navigation path weight need not be the sole criterion for identifying interest spaces 320 within a network 300. In some embodiments, interest spaces 320 may be further organized according to other aspects of content or navigation. For example, interest spaces 320 may be organized according to degree of similarity in the content or metadata of content sources 310, or common factors relating the users navigating among content sources 310 (e.g., portions of IP addresses). Additionally, in some embodiments statistically improbable phrases (as mentioned above), Bayesian filters, or other suitable techniques for detecting relatedness of content may be employed in identifying interest spaces 320.

Associative Keyword Search Model

As described in detail above, techniques such as optimal aggregate path determination and interest space analysis may be employed to generate suggestions or recommendations to users regarding potentially interesting content sources 310, as a function of the behavior of a community of users relative to a network of content sources 310. That is, the activity of users in general, when processed according to the techniques discussed above, may facilitate the self-organization of a complex interest topology into structures (e.g., paths and/or interest spaces). These structures may in turn allow users to be informed of those portions of the topology in which they may be interested, and conversely may operate to deemphasize other portions of less potential interest.

In some embodiments, optimal aggregate paths and/or interest spaces may be identified relative to a user's current state with respect to a particular content source 310. For example, a content source 310 that is the current focus of user interaction (e.g., via a browser window 1100 or another application) may serve as the starting point for path or interest space analysis. However, in other embodiments, a user may be actively searching for content sources 310 based on some criteria. For example, a user may perform a keyword search via a search engine to identify content sources 310 that satisfy a query including one or more keywords, according to various default or user-specified rules for combining the keywords. A conventional search engine may construct indexes of content sources 310, e.g., by examining the content of each content source 310 and processing it to identify keyword terms that may then be associated with the content source 310. Keywords determined in this fashion may then be compared against those specified by a user's query, according to any selection rules present in the query (e.g., match all keywords, match any keyword, etc.) to select sources to present to the user.

Generally speaking, a search query may represent some minimum criterion a content source 310 must satisfy to appear in the results of a search. However, not all sources that satisfy the search query may be equally interesting to a user. Correspondingly, search results may be ranked in various ways. In one embodiment, a search engine (e.g., a program, application, or other type of executable module realized in software and/or hardware and configured to perform search functions) may be configured to order a list of content sources 310 representing search results of a search query according to the interest weights associated with the content sources 310, which may be determined according to the methods and systems described above in conjunction with the descriptions of FIGS. 1-9.

In another embodiment, a conventional search engine may be configured to identify optimal aggregate paths associated with content sources 310 that appear in a set of search results, for example according to the methods and techniques described above with respect to FIGS. 13-15. The search engine may then be configured to rank the search results according to the aggregate path weight associated with the optimal aggregate path determined for the content sources 310 in the search result set. It is noted that in these embodiments, the techniques of ranking according to interest weights of content sources or weights of paths related to content sources may be applied to any type of search engine regardless of how the search engine structures or indexes content sources 310, and regardless of the format of the query used to perform a search. For example, these techniques may be applied to simple keyword searches or searches conducted according to a formal query language, such as a version of Structured Query Language (SQL), XML Query language (XQuery), or another suitable query language, in addition to keyword searches that do not employ any formal or structured query language.

While the techniques disclosed herein may be employed in conjunction with conventional search engines that index content sources 310 by exhaustively crawling or "spidering" such content sources, as stated previously, index-based approaches to organizing content may suffer from various limitations. For example, a conventional indexing search engine may take days or weeks to refresh its indexes. Consequently, such a search engine may be relatively insensitive to content sources 310 that change more frequently than the frequency with which they are indexed. In some instances, content sources 310 may conceivably appear and disappear before ever having an opportunity to be indexed by the search engine.

Additionally, the quality of conventional indexing may be dependent upon the algorithms used to extract the keyword information to be associated with a content source 310 from the content source itself. But it may be challenging to determine a representative set of keywords directly from a content source 310. For example, keywords may depend on contextual meaning not captured by a purely lexical analysis. Words that appear within a content source 310, and thus function as candidates for keyword extraction, may not be truly indicative of the information content of the source, for example in cases where content source creators deliberately attempt to obscure the nature of the content source by embedded random or off-topic words within the structure of, e.g., a web page. Also, certain kinds of content sources 310 simply do not readily lend themselves to keyword extraction for indexing. For example, a nontextual content source 310 such as an image, audio data, executable code or other forms of encoded data might include little if any text that could function as a useful keyword for that content source 310.

As discussed above with respect to the techniques of content source interest weighting, aggregate path interest weighting and interest space analysis, considerable information about the interest or utility of various kinds of content may be derived from data indicative of how such content is actually used. For example, content access request information may be indicative of user interest with respect to a particular content source 310, while various types of navigation traffic or other relational data among content sources 310 may be indicative of user interest with respect to various paths or interest spaces within a network of content sources 310. Correspondingly, as an alternative to associating keywords or other search-oriented data with content sources 310 on the basis of conventional content indexing, in some embodiments such associations may be generated on the basis of user-related content source activity, such as request traffic directed to a content source 310 or navigation traffic along a path or within an interest space.

Figure 21:
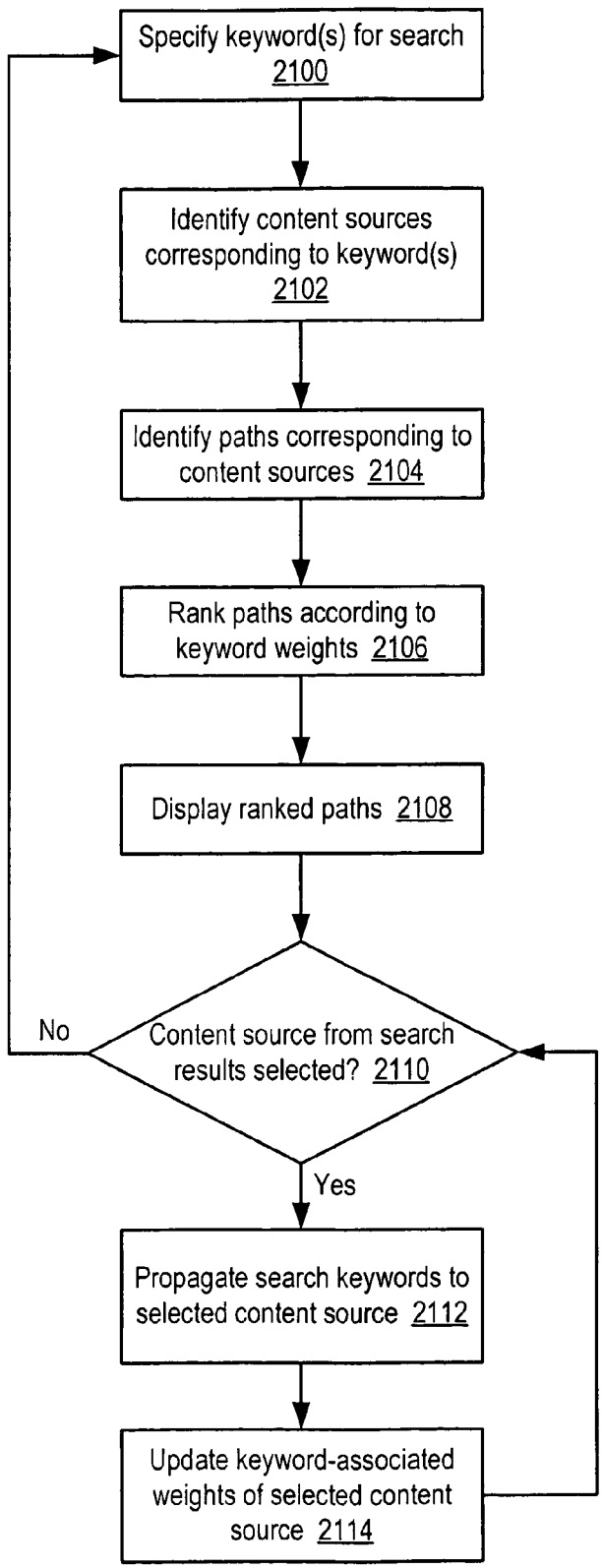
FIG. 21 is a flow diagram illustrating one embodiment of a method of performing a search of content sources using keywords associated with content sources via indications of usage activity.

One embodiment of a method of performing a search of content sources 310 using keywords that may be associated with content sources 310 via indications of user activity (e.g., request or navigation traffic) is illustrated in FIG. 21. As shown in FIG. 20, in one embodiment such a method may be implemented, for example, by a search engine 2000 configured as an executable module or process within IA system 130, although it is contemplated that in other embodiments, search engine 2000 may be implemented via a system distinct from IA system 130.

Operation of the method of FIG. 21 begins in block 2100, where one or more keywords are specified for a search operation. In various embodiments, a user may explicitly specify search keywords in a variety of ways. For example, search engine 2000 may implement a web-based interface accessible via browser window 1100 through which a search query including keywords and/or other terms may be specified. In some embodiments, toolbar 1120 may be configured to provide a field in which a user may specify a query without having to navigate away from a particular content source 310 to a page presented by search engine 2000. It is contemplated that search keywords may also be specified in other ways. For example, as an alternative to a user explicitly entering keywords, in some embodiments plugin 1020 or some other code module or entity may be configured to derive keywords from the user's context. For example, plugin 1020 may be configured to examine content of a content source with which a user is currently interacting or had previously interacted (e.g., within a usage session or over a particular period of time), and may derive keywords for possible searches from the examined content. In deriving keywords for possible searches, plugin 1020 may also be configured to take other user state information into account, such as user preferences, user transaction history (e.g., purchase transactions), user profile or self-identification data, or any other relevant user state information. For example, if a user expresses interest in certain topics within a profile or in preference information, those topics may influence suggested keyword selection.

Figure 22:
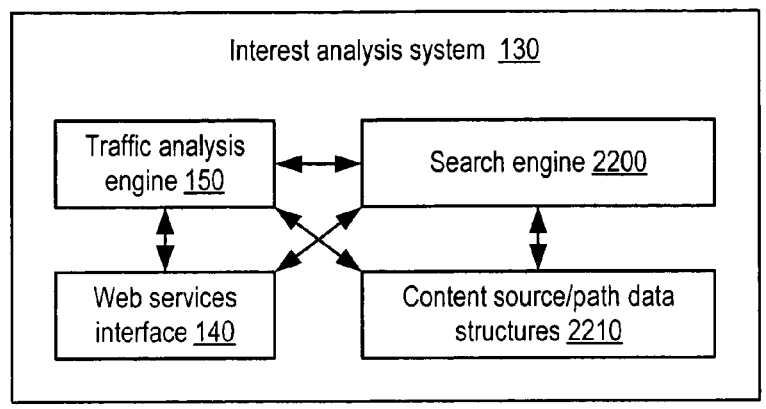
FIG. 22 is a block diagram illustrating one embodiment of an interest analysis system including a search engine.
Figure 23:
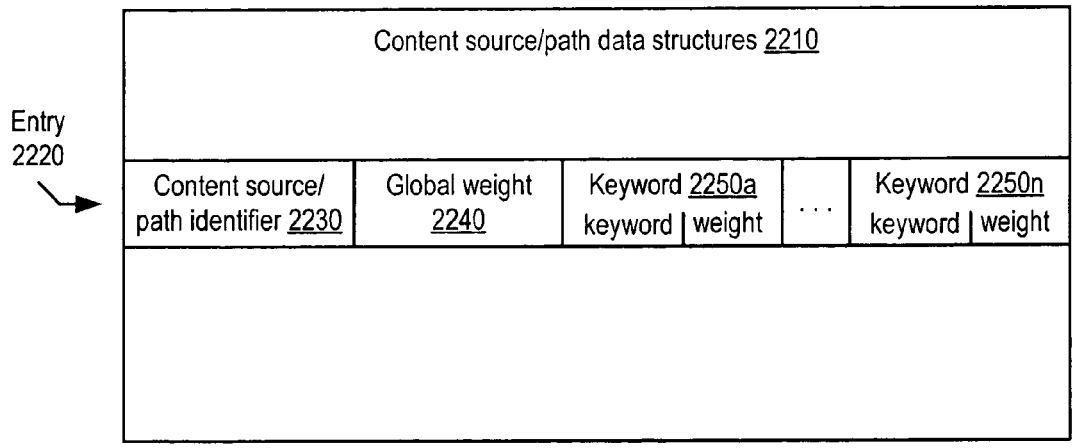
FIG. 23 is a block diagram illustrating one embodiment of a data structure through which keywords may be associated with content sources or paths.

Subsequent to keyword specification, content sources 310 that correspond to the search keywords are identified (block 2102). For example, as shown in FIGS. 22 and 23, search engine 2200 may be configured to maintain trees, tables or other data structures, shown in FIG. 22 as content source/path data structures 2210, that reflect the association of keywords and content sources 310. (As described in greater detail below, in some embodiments keywords may be associated with aggregate paths in addition to or instead of content sources 310.) Search engine 2200 may be configured to evaluate data structures 2210 to identify content sources 310 that correspond to the specified search keywords. In some embodiments, search engine 2200 may be configured to enforce various search rules specified along with the keywords. For example, a search query may specify that a content source 310 should be returned only if that source corresponds to all specified keywords, the keywords as specified in a given order or within a certain degree of proximity to one another, or other types of constraints.

One embodiment of data structures 2210 is shown in FIG. 23 to include a number of entries 2220, each of which may include a content source/path identifier 2230, an indication of a global weight 2240, and an arbitrary number of keyword entries 2250 each including a keyword and a weight. In some embodiments, identifier 2230 may correspond to a URL of a content source 310 or another suitable type of identifier, such as a signature or hash. Global weight 2240 may correspond to the global weight determined for the content source 310 as described above with respect to FIGS. 5-6, although it is contemplated that in some embodiments, global weight 2240 may be stored in a data structure distinct from data structures 2210 (e.g., a data structure internal to TA engine 150, or a distinct data structure within IA system 130). In the illustrated embodiment, an arbitrary number of keyword entries 2250 may be associated with a content source 310 via their inclusion in a data structure entry 2220. The functional relationship of keyword entries 2250 to content sources 310 is described in greater detail below with respect to blocks 2110-2114 of FIG. 21. Generally speaking, weights associated with keyword entries 2250 may indicate the strength of association of a corresponding keyword with a content source 310 or path. For example, as described below, by virtue of selecting a content source 310 or path presented on the basis of a set of search keywords, a user may establish or strengthen an association or relationship between the search keywords and the selected content source 310.

Once content sources 310 corresponding to the specified keywords (also referred to herein as a result set of content sources) have been identified, paths corresponding to the identified content sources 310 may also be identified (block 2104). These paths may also be referred to as a result set of paths. For example, as described above with respect to FIGS. 13-16, in one embodiment one or more optimal aggregate paths associated with each of the result set of content sources 310 may be identified. It is noted that in some embodiments, aggregate path analysis may be performed in response to identifying the members of the result set, while in other embodiments, aggregate path information may be generated and maintained for a network 300 independent of search activity. For example, search engine 2200 may be configured to consult a data structure maintained by another process or facility to obtain aggregate path information relevant to members of a particular result set. It is noted that in some embodiments, only those aggregate paths originating from members of the result set may be considered, while in other embodiments, any optimal aggregate path intersecting a content source 310 that is a member of the result set may be deemed a corresponding path for search purposes.

Members of the result set of paths corresponding to the result set of content sources 310 may then be ranked (block 2106). In some embodiments, the ranking of paths may be a function of the weights of keyword entries 2250 associated with content sources 310 within the identified paths. Specifically, in one embodiment the search rank weight of a given content source 310 in the result set of content sources may be determined as a function (e.g., a sum) of the weights of each keyword entry 2250 that matches a corresponding keyword specified for the search operation. Then, the search rank weight of a given path in the result set of paths may be determined as a function (e.g., a sum) of the search rank weight of each of the content sources 310 within the path. For example, a given content source 310 may be associated with a number of keyword entries 2250. In the example, two of the keywords may match corresponding keywords of a given search operation, and may have respective weights of 12 and 10. Then, the search rank weight of the given content source 310 may be given as 12+10=22. Further, the given content source 310 may be included within a path along with other content sources 310 having respective search rank weights of 15, 8 and 2. The, the search rank weight of this particular member of the result set of paths may be given as 22+15+8+2=47. Once search rank weights for members of the result set of paths have been determined according to a suitable ranking model, the result set of paths may be ranked (e.g., ordered) according to the search rank weights.

The resulting ranked paths may then be displayed (block 2108). For example, search engine 2200 may be configured to display a ranked list of paths within a browser window 1100 via browser 1000, or within toolbar 1120 via plugin 1020. In other embodiments, the ranked paths may be presented to a user in any suitable fashion, such as within an email, an instant messenger (IM) communication, or using other communication techniques.

Figure 24:
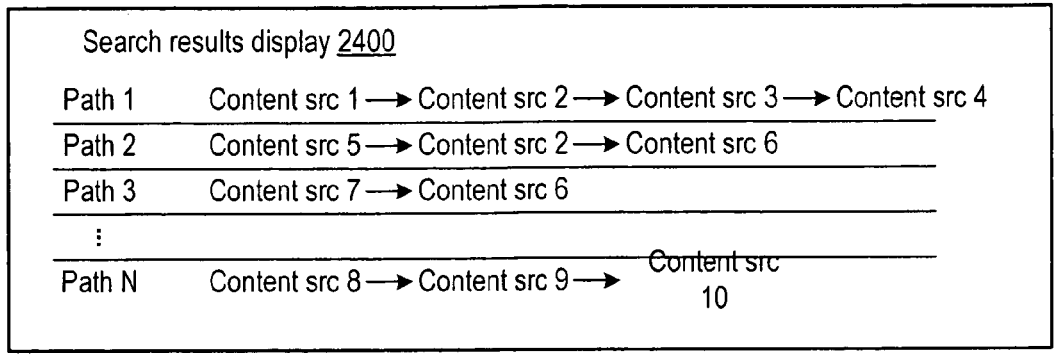
FIG. 24 illustrates one embodiment of a user interface through which search result information may be displayed.

One embodiment of a user interface through which aggregate paths derived from a keyword search may be displayed is shown in FIG. 24. In various embodiments, search engine 2200 may cause search results display 2400 to be displayed via browser window 1100, toolbar 1120 or another suitable application. In the illustrated embodiment, search results display 2400 is configured to display the top N paths for a particular keyword query. As shown, paths 1, 2, 3 and N include indications of 10 distinct content sources related according to different combinations of navigation paths. In some embodiments, each content source indication shown in search results display 2400 may be configured as a hyperlink or other navigable link selectable by a user.

In the illustrated embodiment, some displayed content sources may be members of the search result set selected according to the keyword query, while displayed content sources may be selected according to their path relationships with members of the search result set. For example, in one embodiment, content sources 2, 7 and 9 may satisfy a particular keyword query. At least some of the remaining content sources may not satisfy the particular keyword query, but may instead be selected for display based on the strength of the path relationships they share with content sources 2, 7 and/or 9.

A user may then select a particular content source 310 from the search results, e.g., from a ranked list of paths (block 2110). For example, a user may click on a hyperlink corresponding to a content source as shown in search results display 2400. If the user does select a particular content, source 310, the search keywords that were originally specified in block 2100 may be propagated to the particular content source 310. In one embodiment, propagation of keywords to a content source 310 may include adding keyword entries 2250 to an entry 2220 within data structure 2210 corresponding to the content source 310. Such adding of a keyword entry 2250 may be contingent upon the corresponding entry 2250 not already existing within entry 2220.

The rationale of keyword propagation may be understood as follows. As described above with respect to block 2102, a set of content sources 310 that correspond to the specified search keywords may be identified. This correspondence may be detected on the basis of an existing association of the search keywords and the content sources 310, e.g., as reflected within entries 2220. However, in block 2104, paths are identified on the basis of the content sources identified in block 2102, and these paths may include content sources 310 that do not have a current association with the search keywords. Rather, the paths may be formed on the basis of some other relationship among content sources, such as navigation traffic patterns. By virtue of selecting a content source 310 that was presented on the basis of the search keywords, a user may establish an association or relationship between the search keywords and the selected content source 310. Consequently, the search keywords may be propagated to the selected content source 310.

Following keyword propagation to the selected content source 310, which may involve no operation if the search keywords were already associated with the selected content source 310, the weights included in the keyword entries 2250 that correspond to the search keywords are updated (block 2114). Generally speaking, the weights included in keyword entries 2250 may be defined and manipulated in a manner similar to that of global and local content source weights described above; in some cases, the weights of keyword entries 2250 may be considered instances of local content source weights, although they may be updated on the basis of search-specific traffic rather than general content request traffic. For example, when updated as a result of block 2114, the keyword weights they may be increased by some amount, such as a fixed increment or a function of the number of weights updated. Also, like the global and local content source weights described above, keyword weights may decay over time according to any suitable decay model. Thus, in some embodiments, if ongoing user search activity does not reinforce the associations between keywords and content sources 310, those associations may weaken over time and eventually dissipate. It is noted that a user's selection of content sources 310 on the basis of search results may result in existing paths among content sources being modified, or new paths being created. For example, a user may navigate from a content source 310 along one search result path to a content source 310 along a different search result path, thus creating or reinforcing a path between these sources. Through the operation of optimal aggregate path analysis described above, this activity may ultimately influence the structure of network 300 and may alter future search results correspondingly.

Following update of the keyword-associated weights of the selected content source 310, operation may proceed to block 2110 where another content source from the ranked search results may be selected. For example, the user may continue to navigate the originally chosen path or may select a different path. In some embodiments, user session tracking techniques (e.g., browser cookies) may be employed to facilitate detection of a user's selection of search-result-related content sources 310. From block 2110, the user may also fail to choose any source from the ranked search result paths, either when the search result paths are originally presented (e.g., at block 2108) or after having already selected some content sources 310. In this case, operation may proceed to block 2100 where a new search may begin. Alternatively, a user may navigate away from search functionality entirely and begin a different task. In some embodiments, it is contemplated if none of the result set of content sources 310 is selected following a search, negative feedback may be applied to the weights of corresponding keyword entries 2250. That is, keyword weights may be positively reinforced (e.g., adjusted upwards) upon content source selection (block 2114), thus strengthening the association between the adjusted keywords and the content source 310. Conversely, if a user finds none of the content sources 310 appealing, the keyword associations may be weakened by, e.g., decreasing keyword weights included in keyword entries 2250.

It is noted that in general, a set of content sources 310 may have related content, for example as evidenced by navigation traffic patterns (e.g., paths) among the sources, but may not share keywords in common. Identified path relationships among the content sources 310 may serve as a basis for associating keywords among the source. In particular, it is noted this association may take place without requiring that content sources 310 be indexed, or that their content be accessed by search engine 2200 in any way. In fact, a given content source 310 may be associated with a keyword by virtue of its path-based relationship with another content source 310 even though the keyword may not actually appear anywhere within the given content source 310. Thus, for example, images and other nontextual content sources 310 may be readily associated with tags without the need for deliberate classification of the nontextual content sources 310 by a user or other agent. In general, the technique of associating keywords with content sources on the basis of path relationships grounded in usage behavior may be referred to herein as an associative keyword model.

In some circumstances, it may be the case that no content sources 310 are associated with the keywords of a particular search operation. To facilitate the "seeding" of keywords among content sources 310, in some embodiments other criteria may be employed for presenting content sources 310 in response to a search. For example, content sources 310 that have particularly high global weights 140 or aggregate paths having high path weights may be presented to a user if no keyword-specific content sources 310 can be identified. In some embodiments, these types of content sources 310 and/or paths may also be presented alongside search results derived from keyword associations. Just as individual users may or may not reinforce existing keyword associations among results, they may or may not generate new keyword associations among results. In the aggregate, user behavior over time may result in pertinent keyword associations being generated and maintained, while erroneous, inaccurate or otherwise ill-formed associations may be allowed to weaken and decay.

It is noted that while the associative keyword model just described may obviate the need for content indexing, in some embodiments a limited degree of indexing may be performed to assist in the generation and maintenance of keyword associations with content sources 310. In particular, rather than perform an exhaustive indexing of content sources 310 through conventional crawling or spidering techniques, in some embodiments, content source interest weights or path weights may be used to select a particular subset of content sources 310 on which to perform indexing. For example, content sources 310 or aggregate paths having particularly high weights according to request or navigation traffic may be selected as useful indexing candidates.

Several generalizations of the associative keyword model may be made. It is noted that in some embodiments, keywords may be associated with paths themselves, and not simply content sources. Thus, data structures 2210 may be pertinent to both aggregate paths and content sources 310. For example, upon being identified through the path analysis techniques described above, aggregate paths may be tagged with a unique identifying value that may be stored as content source/path identifier 2230. Subsequently, paths may be selected on the basis of their associated keywords matching a keyword search operation. Keywords may be associated with such paths and positively or negatively reinforced in a manner similar to that described above for content sources 310 in the description of FIG. 21.

It is also noted that in some embodiments, the keyword associations generated through operation of the associative keyword model may serve as the basis for generation of interest spaces 320. For example, rather than identifying members of an interest space 320 on the basis of aggregate path weights derived from navigation traffic, as described above, in one embodiment interest space members may be identified on the basis of commonality of keywords that have been associated with content sources 310 via usage activity.

Exemplary Computer System Embodiment

It is contemplated that in some embodiments, any of the methods, techniques or components described above may be implemented as instructions and data capable of being stored or conveyed via a computer-accessible medium. Such methods or techniques may include, for example and without limitation, the various methods of detecting content request traffic, providing content, reporting traffic requests, analyzing content request traffic data to determine global and/or local interest weights, analyzing navigation and aggregate paths, determining optimal aggregate paths, generating interest spaces, associating keywords with content sources and/or paths dependent upon usage activity, and requesting and displaying interest data, content sources, interest spaces and paths as performed by the elements shown in FIGS. 1, 10, 11 and 22 and the methods illustrated in FIGS. 2, 4-9, 15, 18, 20 and 21 or suitable variations thereof. Such instructions may be executed to perform a particular computational function, such as processing web services traffic, implementing mathematical functions such as integration, differentiation, convolution, etc., as well as higher-order functions such as, operating system functionality, network communications functionality, application functionality, and/or any other suitable functions.

Figure 25:
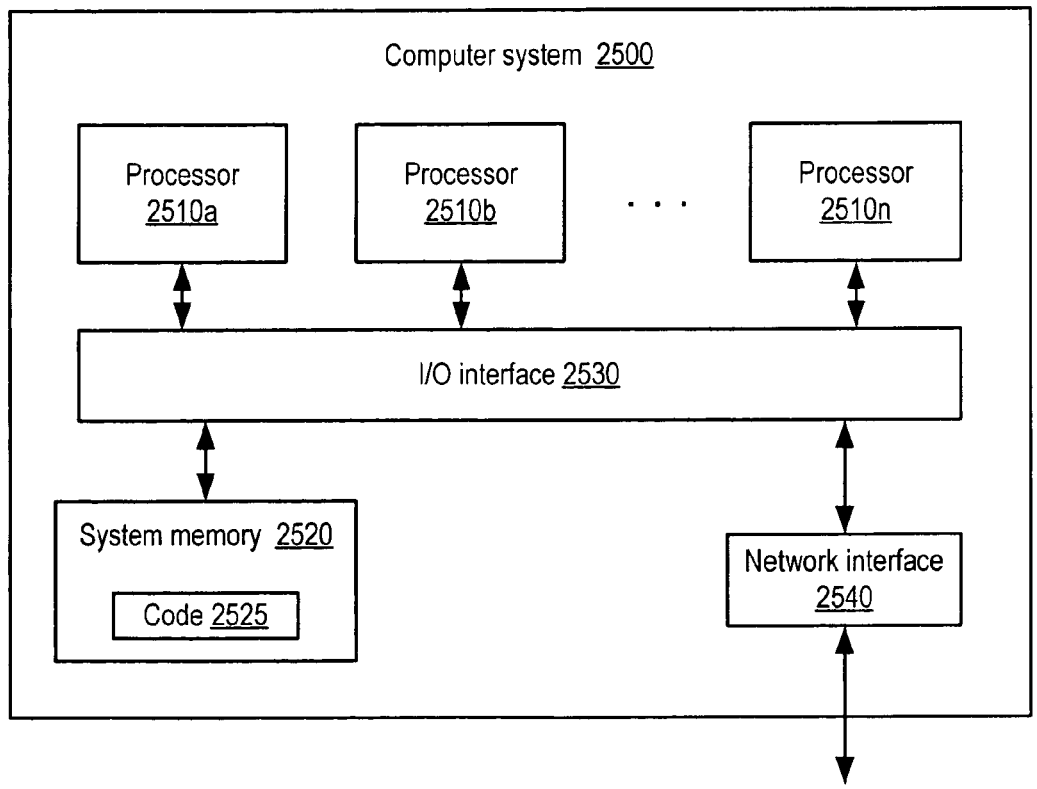
FIG. 25 is a block diagram illustrating an exemplary embodiment of a computer system.

One exemplary embodiment of a computer system including computer-accessible media is illustrated in FIG. 25. In the illustrated embodiment, computer system 2500 includes one or more processors 2510 coupled to a system memory 2520 via an input/output (I/O) interface 2530. Computer system 2500 further includes a network interface 2540 coupled to I/O interface 2530. Computer system 2500 may be illustrative of one embodiment of a host system 100 as well as a system hosting a requestor 110, although the specific configuration of computer system 2500 may vary for different embodiments of these systems. For example, system 2500 may be variously configured as a server system, a desktop or notebook system, an embedded system, a handheld or portable client system, etc.

In various embodiments computer system 2500 may be a uniprocessor system including one processor 2510, or a multiprocessor system including several processors 2510 (e.g., two, four, eight, or another suitable number). Processors 2510 may be any suitable processor capable of executing instructions. For example, in various embodiments processors 2510 may be a general-purpose or embedded processor implementing any of a variety of instruction set architectures (ISAs), such as the x86, PowerPC, SPARC, or MIPS ISAs, or any other suitable ISA. In multiprocessor systems, each of processors 2510 may commonly, but not necessarily, implement the same ISA.

System memory 2520 may be configured to store instructions and data accessible by processor 2510. In various embodiments, system memory 2520 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 2520 as code 2525. It is noted that in some embodiments, code 2525 may include instructions and data implementing desired functions that are not directly executable by processor 2510 but are represented or encoded in an abstract form that is translatable to instructions that are directly executable by processor 2510. For example, code 2525 may include instructions specified in an ISA that may be emulated by processor 2510, or by other code 2525 executable on processor 2510. Alternatively, code 2525 may include instructions, procedures or statements implemented in an abstract programming language that may be compiled or interpreted in the course of execution. As non-limiting examples, code 2525 may include code specified in a procedural or object-oriented programming language such as C or C++, a scripting language such as perl, a markup language such as HTML or XML, or any other suitable language.

In one embodiment, I/O interface 2530 may be configured to coordinate I/O traffic between processor 2510, system memory 2520, and any peripheral devices in the device, including network interface 2540 or other peripheral interfaces. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computer system 2500 and other devices attached to network 120, such as other computer systems, for example. In various embodiments, network interface 2540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 2520 may be one embodiment of a computer-accessible medium configured to store instructions and data as described above. However, in other embodiments, instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 2500 via I/O interface 2530. A computer-accessible medium may also include any volatile or non-volatile media such as RAM (e.g. SDRAM, DDR SDRAM, RDRAM, SRAM, etc.), ROM, etc, that may be included in some embodiments of computer system 2500 as system memory 2520 or another type of memory. A computer-accessible medium may generally be accessible via transmission media or signals such as electrical, electromagnetic, or digital signals, conveyed via a communication medium such as a network and/or a wireless link, such as may be implemented via network interface 2540.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
one or more computer systems, each comprising at least a processor for performing:
determining each of a plurality of navigation paths among a plurality of online content sources;
for each of said plurality of navigation paths, determining a respective corresponding path weight, wherein different values of said corresponding path weights are indicative of different levels of user activity along corresponding ones of said navigation paths and wherein said user activity comprises a plurality of requests generated by a plurality of users to access individual ones of said online content sources; and
identifying a particular one of a plurality of aggregate paths within said plurality of online content sources, wherein said particular aggregate path includes one or more of said navigation paths, wherein an aggregate path weight corresponding to said particular aggregate path is dependent upon said one or more path weights corresponding to said one or more of said navigation paths included in said particular aggregate path, and wherein said aggregate path weight satisfies an optimization criterion relative to aggregate path weights of other ones of said plurality of aggregate paths within said plurality of online content sources, such that said particular aggregate path is selected from other ones of said aggregate paths dependent upon corresponding path weights of said one or more navigation paths included in said particular aggregate path;
wherein a given one of said one or more navigation paths included in said particular aggregate path corresponds to a possible user traversal from a first one of said online content sources to a second one of said online content sources.

2. The method as recited in claim 1, wherein said determining each of a plurality of navigation paths comprises, for said given navigation path, detecting within said first online content source an explicit navigation reference to said second online content source.

3. The method as recited in claim 2, wherein each of said first and said second online content sources corresponds to a respective web page, and wherein said explicit navigation reference corresponds to a navigation link encoded within said first online content source.

4. The method as recited in claim 1, wherein said determining each of a plurality of navigation paths comprises, for said given navigation path, detecting a content access request directed to said second online content source, wherein said content access request indicates that said first online content source is a referrer of said content access request.

5. The method as recited in claim 1, wherein said given path weight corresponds to a rate at which users traverse said corresponding navigation path.

6. The method as recited in claim 1, wherein said given path weight corresponds to a time rate of change of a rate at which users traverse said corresponding navigation path.

7. The method as recited in claim 6, further comprising determining said time rate of change dependent upon numerically computing a first derivative with respect to time of a time series of data points corresponding to said users traversing said corresponding navigation path.

8. The method as recited in claim 1, wherein said identifying a particular aggregate path comprises determining whether said aggregate path weight satisfies said optimization criterion, and wherein said determining whether said aggregate path weight satisfies said optimization criterion comprises determining whether said aggregate path weight is maximal relative to aggregate path weights of said plurality of aggregate paths within said plurality of online content sources.

9. The method as recited in claim 1, wherein said identifying a particular aggregate path comprises determining whether said aggregate path weight satisfies said optimization criterion, and wherein said determining whether said aggregate path weight satisfies said optimization criterion comprises determining whether said aggregate path weight is minimal relative to aggregate path weights of said plurality of aggregate paths within said plurality of online content sources.

10. The method as recited in claim 1, wherein said identifying a particular aggregate path comprises determining whether said aggregate path weight satisfies said optimization criterion, and wherein said determining whether said aggregate path weight satisfies said optimization criterion comprises determining whether said aggregate path weight equals a target path weight, within a threshold of equality.

11. The method as recited in claim 1, wherein said identifying a particular aggregate path includes limiting a number of navigation paths included in said particular aggregate path.

12. The method as recited in claim 1, wherein said aggregate path weight corresponding to said particular aggregate path is determined as a function of path weights corresponding to said navigation paths included in said particular aggregate path.

13. The method as recited in claim 12, wherein said function corresponds to a summation of said path weights.

14. The method as recited in claim 1, wherein a topology of said navigation paths among said plurality of online content sources differs from a topology of explicit navigation links included among said plurality of online content sources.

15. The method as recited in claim 1, wherein a topology of said navigation paths among said plurality of online content sources differs from a topology of communication paths among systems configured to implement said plurality of online content sources.

16. A computer-accessible storage medium storing instructions, wherein the instructions are executable to:
determine each of a plurality of navigation paths among a plurality of online content sources;
for each of said plurality of navigation paths, determine a corresponding path weight, wherein different values of said corresponding path weights are indicative of different levels of user activity along corresponding ones of said navigation paths, and wherein said user activity comprises a plurality of requests generated by a plurality of users to access individual ones of said online content sources; and
identify a particular one of a plurality of aggregate paths within said plurality of online content sources, wherein said particular aggregate path includes one or more of said navigation paths, wherein an aggregate path weight corresponding to said particular aggregate path is dependent upon said one or more path weights corresponding to said one or more of said navigation paths included in said particular aggregate path, and wherein said aggregate path weight satisfies an optimization criterion relative to aggregate path weights of other ones of said plurality of aggregate paths within said plurality of online content sources, such that said particular aggregate path is selected from other ones of said aggregate paths dependent upon corresponding path weights of said one or more navigation paths included in said particular aggregate path;
wherein a given one of said one or more navigation paths included in said particular aggregate path corresponds to a possible user traversal from a first one of said online content sources to a second one of said online content sources.

17. The computer-accessible storage medium as recited in claim 16, wherein said determining each of a plurality of navigation paths comprises, for said given navigation path, detecting within said first online content source an explicit navigation reference to said second online content source.

18. The computer-accessible storage medium as recited in claim 17, wherein each of said first and said second online content sources corresponds to a respective web page, and wherein said explicit navigation reference corresponds to a navigation link encoded within said first online content source.

19. The computer-accessible storage medium as recited in claim 16, wherein said determining each of a plurality of navigation paths comprises, for said given navigation path, detecting a content access request directed to said second online content source, wherein said content access request indicates that said first online content source is a referrer of said content access request.

20. The computer-accessible storage medium as recited in claim 16, wherein said given path weight corresponds to a rate at which users traverse said corresponding navigation path.

21. The computer-accessible storage medium as recited in claim 16, wherein said given path weight corresponds to a time rate of change of a rate at which users traverse said corresponding navigation path.

22. The computer-accessible storage medium as recited in claim 21, wherein the instructions are further executable to determine said time rate of change dependent upon numerically computing a first derivative with respect to time of a time series of data points corresponding to said users traversing said corresponding navigation path.

23. The computer-accessible storage medium as recited in claim 16, wherein said identifying a particular aggregate path comprises determining whether said aggregate path weight satisfies said optimization criterion, and wherein said determining whether said aggregate path weight satisfies said optimization criterion comprises determining whether said aggregate path weight is maximal relative to aggregate path weights of said plurality of aggregate paths within said plurality of online content sources.

24. The computer-accessible storage medium as recited in claim 16, wherein said identifying a particular aggregate path comprises determining whether said aggregate path weight satisfies said optimization criterion, and wherein said determining whether said aggregate path weight satisfies said optimization criterion comprises determining whether said aggregate path weight is minimal relative to aggregate path weights of said plurality of aggregate paths within said plurality of online content sources.

25. The computer-accessible storage medium as recited in claim 16, wherein said identifying a particular aggregate path comprises determining whether said aggregate path weight satisfies said optimization criterion, and wherein said determining whether said aggregate path weight satisfies said optimization criterion comprises determining whether said aggregate path weight equals a target path weight, within a threshold of equality.

26. The computer-accessible storage medium as recited in claim 16, wherein said identifying a particular aggregate path includes limiting a number of navigation paths included in said particular aggregate path.

27. The computer-accessible storage medium as recited in claim 16, wherein said aggregate path weight corresponding to said particular aggregate path is determined as a function of path weights corresponding to said navigation paths included in said particular aggregate path.

28. The computer-accessible storage medium as recited in claim 27, wherein said function corresponds to a summation of said path weights.

29. The computer-accessible storage medium as recited in claim 16, wherein a topology of said navigation paths among said plurality of online content sources differs from a topology of explicit navigation links included among said plurality of online content sources.

30. The computer-accessible storage medium as recited in claim 16, wherein a topology of said navigation paths among said plurality of online content sources differs from a topology of communication paths among systems configured to implement said plurality of online content sources.

31. A system, comprising:
one or more computer systems, each comprising at least a processor and a memory, wherein the one or more computer systems are configured to store and execute instructions that are configured to implement:
a web services interface configured to receive, according to a web services protocol, respective reports from a plurality of content sources of content request traffic directed to said content sources; and
a traffic analysis engine configured to receive said reports from said web services interface and to:
determine each of a plurality of navigation paths among a plurality of online content sources;
for each of said plurality of navigation paths, determine a corresponding path weight, wherein different values of said corresponding path weights are indicative of different levels of user activity along corresponding ones of said navigation paths, and wherein said user activity comprises a plurality of requests generated by a plurality of users to access individual ones of said online content sources; and
identify a particular one of a plurality of aggregate paths within said plurality of online content sources, wherein said particular aggregate path includes one or more of said navigation paths, wherein an aggregate path weight corresponding to said particular aggregate path is dependent upon said one or more path weights corresponding to said one or more of said navigation paths included in said particular aggregate path, and wherein said aggregate path weight satisfies an optimization criterion relative to aggregate path weights of other ones of said plurality of aggregate paths within said plurality of online content sources, such that said particular aggregate path is selected from other ones of said aggregate paths dependent upon corresponding path weights of said one or more navigation paths included in said particular aggregate path;
wherein a given one of said one or more navigation paths included in said particular aggregate path corresponds to a possible user traversal from a first one of said online content sources to a second one of said online content sources.

32. The system as recited in claim 31, wherein to determine said given one of said plurality of navigation paths, the traffic analysis engine is further configured to detect within said first online content source an explicit navigation reference to said second online content source.

33. The system as recited in claim 32, wherein each of said first and said second online content sources corresponds to a respective web page, and wherein said explicit navigation reference corresponds to a navigation link encoded within said first online content source.

34. The system as recited in claim 31, wherein to determine said given one of said plurality of navigation paths, the traffic analysis engine is further configured to detect a content access request directed to said second online content source, wherein said content access request indicates that said first online content source is a referrer of said content access request.

35. The system as recited in claim 31, wherein said given path weight corresponds to a rate at which users traverse said corresponding navigation path.

36. The system as recited in claim 31, wherein said given path weight corresponds to a time rate of change of a rate at which users traverse said corresponding navigation path.

37. The system as recited in claim 36, wherein said traffic analysis engine is further configured to determine said time rate of change dependent upon numerically computing a first derivative with respect to time of a time series of data points corresponding to said users traversing said corresponding navigation path.

38. The system as recited in claim 31, wherein to identify a particular aggregate path, the traffic analysis engine is further configured to determine whether said aggregate path weight satisfies said optimization criterion, and wherein to determine whether said aggregate path weight satisfies said optimization criterion, the traffic analysis engine is further configured to determine whether said aggregate path weight is maximal relative to aggregate path weights of said plurality of aggregate paths within said plurality of online content sources.

39. The system as recited in claim 31, wherein to identify a particular aggregate path, the traffic analysis engine is further configured to determine whether said aggregate path weight satisfies said optimization criterion, and wherein to determine whether said aggregate path weight satisfies said optimization criterion, the traffic analysis engine is further configured to determine whether said aggregate path weight is minimal relative to aggregate path weights of said plurality of aggregate paths within said plurality of online content sources.

40. The system as recited in claim 31, wherein to identify a particular aggregate path, the traffic analysis engine is further configured to determine whether said aggregate path weight satisfies said optimization criterion, and wherein to determine whether said aggregate path weight satisfies said optimization criterion, the traffic analysis engine is further configured to determine whether said aggregate path weight equals a target path weight, within a threshold of equality.

41. The system as recited in claim 31, wherein to identify a particular aggregate path, the traffic analysis engine is further configured to limit a number of navigation paths included in said particular aggregate path.

42. The system as recited in claim 31, wherein said traffic analysis engine is further configured to determine said aggregate path weight corresponding to said particular aggregate path as a function of path weights corresponding to said navigation paths included in said aggregate path.

43. The system as recited in claim 42, wherein said function corresponds to a summation of said path weights.

44. The system as recited in claim 31, wherein a topology of said navigation paths among said plurality of online content sources differs from a topology of explicit navigation links included among said plurality of online content sources.

45. The system as recited in claim 31, wherein a topology of said navigation paths among said plurality of online content sources differs from a topology of communication paths among systems configured to implement said plurality of online content sources.

* * * * *